(12) United States Patent
Tsuruya

(10) Patent No.: US 7,053,505 B2
(45) Date of Patent: May 30, 2006

(54) AMPLIFYING CIRCUIT, NOISE REDUCING APPARATUS AND POWER CONVERTING APPARATUS

(75) Inventor: Mamoru Tsuruya, Saitama (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 10/713,140

(22) Filed: Nov. 13, 2003

(65) Prior Publication Data

US 2005/0083132 A1     Apr. 21, 2005

(30) Foreign Application Priority Data

Oct. 17, 2003    (JP)    ............... 2003-358462

(51) Int. Cl.
*H02J 1/02*    (2006.01)

(52) U.S. Cl. .................................... 307/105

(58) Field of Classification Search ............... 307/105; 323/207; 330/149, 297; 363/39, 44, 45, 363/47

See application file for complete search history.

(56) References Cited

U.S. PATENT DOCUMENTS 6,134,126 A * 10/2000 Ikekame et al. ............... 363/39
6,459,597 B1 * 10/2002 Igarashi et al. ............... 363/39

FOREIGN PATENT DOCUMENTS

| JP | 9-266677 A | 10/1997 |
| JP | 2003-250269 A | 9/2003 |
| JP | 2003-250270 A | 9/2003 |

* cited by examiner

*Primary Examiner*—Steven J. Mottola
(74) *Attorney, Agent, or Firm*—Townsend and Townsend and Crew

(57) ABSTRACT

An amplifying circuit, which generates a compensation current based on a detection result of a leakage current flowing between an AC power source for supplying power and a power converting circuit section, includes a main amplifier having transistors and a correction amplifier connected in parallel to the main amplifier. Capacitors are connected between each base of transistors, forming the main amplifier and the correction amplifier, and a ground line, and between an output terminal of the correction amplifier and the ground line, respectively, and an impedance ratio of these capacitors is adjusted, thereby adjusting an amplification ratio.

5 Claims, 38 Drawing Sheets

WINDING NUMBER OF n11 / WINDING NUMBER OF n21 = 1

$i_1 = i + i*(r41/r42)$    ($i_1$: CURRENT VALUE OF CURRENT $I_1$)

$i_2 = i$    ($i_2$: CURRENT VALUE OF CURRENT $I_2$)

$i_{11} = i$    ($i_{11}$: CURRENT VALUE OF CURRENT $I_{11}$)

$i_{12} = i*(r41/r42)$    ($i_{12}$: CURRENT VALUE OF CURRENT $I_{12}$)

$i_1 = i + i*(r11/r12)$  ($i_1$: CURRENT VALUE OF CURRENT $I_1$)

$i_2 = i$  ($i_2$: CURRENT VALUE OF CURRENT $I_2$)

$i_{11} = i$  ($i_{11}$: CURRENT VALUE OF CURRENT $I_{11}$)

$i_{12} = i*(r11/r12)$  ($i_{12}$: CURRENT VALUE OF CURRENT $I_{12}$)

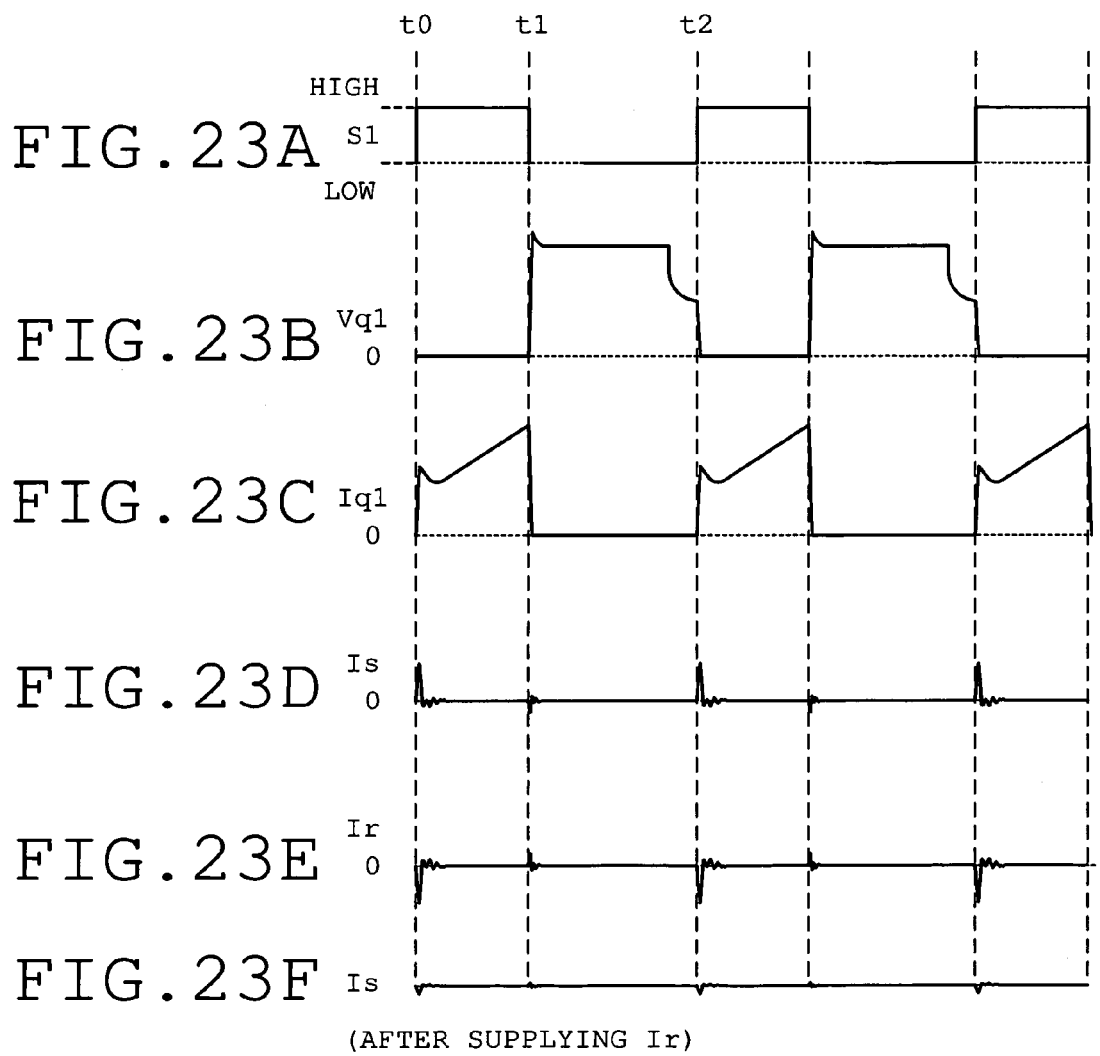
(AFTER SUPPLYING Ir)

AMPLIFYING CIRCUIT, NOISE REDUCING APPARATUS AND POWER CONVERTING APPARATUS

BACKGROUND OF THE INVENTION

1. Field of the Invention

The present invention relates to an amplifying circuit, a noise reducing apparatus, and a power converting apparatus, and particularly relates to a technique enabling to miniaturize them.

2. Description of the Related Art

Power converting apparatuses such as an inverter that supplies power to a motor, a switching regulator that supplies voltage to a computer and the like convert power sent from a predetermined power source into power of a predetermined voltage to supply to a load. In such the power converting apparatuses, since switching element is turned on/off to perform power conversion, switching noise is generated by switching the switching element. For this reason, in such the power converting apparatuses, a noise filter is conventionally provided at an input side to reduce noise. Since the frequency of switching noise is greatly high, a noise filter with large attenuation characteristics in a board band is demanded.

While, in the circuit, an electrostatic capacity containing a stray capacity between the circuit and ground is present, and noise caused by switching the switching element becomes a leakage current with high frequency and flows into a ground line. When the leakage current flows into the ground line, a voltage level of a frame (housing) of the power converting apparatus varies. Particularly, when a motor with a high power capacity is connected to the power converting apparatus via the inverter, the stray capacity between the circuit and the ground increases and the leakage current also increases accordingly. The increase in the leakage current will trip a ground-fault circuit interrupter and cause interference with peripheral electronic devices.

For this reason, a method for supplying a compensation current to a ground line in a direction that cancels a leakage current is used as a method for reducing such noise. This method will be explained based on FIGS. 38A and 38B. In FIGS. 38A and 38B, capacitors C201 and C202 correspond to a load electrostatic capacity and a capacitor for common mode noise, respectively. A diode D201 corresponds to a rectification circuit, and a switch SW corresponds to a switching element. Moreover, leakage currents Is1 and Is2 indicate a leakage current flowing from an alternating current source ACV by switching the switch SW and a leakage current propagating in the power converting apparatus, respectively.

Two methods can be considered as a noise reducing method. A first method is one in which a leakage current Is1 is detected and the detected current is amplified by an amplifier AMP and an amplified compensation current Ir is supplied to a ground line in a direction that cancels the leakage current Is1 via the capacitor C202 as illustrated in FIG. 38A. According to this method, a zero phase current transformer 201 is provided closer to the alternating current source ACV side than an injection point a of the compensation current Ir so as to detect the leakage current Is1.

In the first method, the following equation (1) is established:

$$\{A1 \cdot (is1-ir)\} - is1 \approx 0 \quad (1)$$

(where A1 is an amplification factor of the amplifier AMP when the first method is used, is1 is a current value of the leakage current Is1, and ir is a current value of the compensation current Ir).

Accordingly, the current value ir of the compensation current Ir can be expressed by the following equation (2).

$$ir = \{1-(1/A1)\} \cdot is1 \quad (2)$$

A second method is one in which a leakage current Is2 is detected and a compensation current Ir is supplied to the ground line based on the detected current in the same way as the first method as illustrated in FIG. 38B. According to this method, a zero phase current transformer 201 is provided closer to the switch SW side than the injection point a of the compensation current Ir so as to detect the leakage current Is2.

When the second method is used, the following equation (3) is established:

$$is1 - (A2 \cdot ir) = 0 \quad (3)$$

(where A2 is an amplification factor of the amplifier AMP when the second method is used).

Accordingly, the current value ir of the compensation current Ir can be expressed by the following equation (4).

$$ir = (1/A1) \cdot is1 \quad (4)$$

As shown in the equation (4), in order to cancel the leakage current Is1 by the compensation current Ir using the second method, the amplification factor A2 of the amplifier AMP must be correctly set to 1. In the conventional power converting apparatus, since there is difficulty in that the amplification factor A2 of the amplifier AMP is correctly set to 1, the first method is generally used (Unexamined Japanese Patent Publication 9-266677).

However, when the first method is used, the amplification factor A1 of the amplifier AMP must be increased in order to cancel the leakage current Is1 by the compensation current Ir as shown in the equation (2). For this reason, phase compensation must be correctly performed, and a disadvantage that the amplifier AMP does not easily oscillate is caused.

On the other hand, when the second method is used, the amplification factor A2 of the amplifier AMP does not have to be increased. However, when the second method is used, the amplification factor A2 of the amplifier AMP must be correctly set to 1.

Moreover, it is necessary to cause a secondary winding of the zero phase current transformer 201 to generate an emitter-base voltage of a transistor provided in the amplifier AMP, resulting in an increase in the number of the secondary windings.

Furthermore, in either method, a CT (current transformer) for detection is used as the zero phase current transformer 201 to detect a leakage current flowing into a power line as a current difference. Then, a compensation current is directly detected by the CT for detection and supplied to the power line from a noise compensation current supply current. In this case, in order to operate the amplifier AMP, it is necessary to cause the secondary winding for the CT for detection to generate E-B voltage (0.6 V) of the transistor provided in the amplifier AMP, resulting in an increase in the number of the secondary windings. Particularly, when the second method is used, a turn ratio between the primary winding and secondary winding of the zero phase current transformer 201 must be 1:1.

Moreover, since a large current flows into the power line, a diameter of the primary winding of the zero phase current transformer 201 increases. For this reason, there is a problem in which the zero phase current transformer 201 is increased in size, making it difficult to use the zero phase current transformer 201 in the large current.

Moreover, there was a problem in which a neutral point voltage of the transistor did not reach a neutral point of a supply voltage, so that a noise control range became narrow. Furthermore, since these noise reducing apparatuses needed a greatly large noise filter, they were increased in size and this was one of causes in an increase in cost.

In order to adjust the amplification factor in the aforementioned methods, the winding number of the zero phase current transformer 201 must be increased to perform adjustment and this will cause an increase in size of the zero phase current transformer 201. Moreover, the amplifier AMP with higher accuracy is required, resulting in an increase in cost.

SUMMARY OF THE INVENTION

The present invention has been made in consideration of the aforementioned conventional problems, and an object of the present invention is to provide an amplifying circuit that is allowed to be miniaturized, a noise reducing apparatus, and a power converting apparatus.

Moreover, an object of the present invention is to provide an amplifying circuit enabling to adjust an amplifying factor easily, a noise reducing apparatus, and a power converting apparatus.

In order to attain the above object, an amplifying circuit according to a first aspect of the present invention is connected to a secondary winding of a transformer with a primary winding and the secondary winding. The amplifying circuit includes a current amplifying section that amplifies current flowing into the secondary winding of the transformer to output the amplified current via a first impedance element. The amplifying circuit further includes a buffer amplifying section that generates current determined by voltage applied to the first impedance element by the current amplifying section to apply to a second impedance element, thereby outputting current from the second impedance element. Current corresponding to current obtained by amplifying current flowing into the primary winding of the transformer is output from each of the first impedance element and the second impedance element at a ratio determined by an impedance ratio between the first impedance element and the second impedance element.

The buffer amplifying section may include a voltage amplifying circuit that voltage-amplifies voltage of the first impedance element and applies the voltage to the second impedance element. The current amplifying section may amplify the voltage of the first impedance element to apply to the second impedance element, and serves as at least a part of the buffer amplifying section.

The current amplifying section may include a first NPN-type bipolar transistor having a collector connected to a positive pole of the DC power source, an emitter connected to one end of the secondary winding of the transformer, and a base connected to the other end of the secondary winding of the transformer. The current amplifying section may further include a first PNP-type bipolar transistor having a collector connected to a negative pole of the DC power source, an emitter connected to the emitter of the first NPN-type bipolar transistor, and a base connected to the base of the first NPN-type bipolar transistor. The buffer amplifying section may include a second NPN-type bipolar transistor having a collector connected to a positive pole of the DC power source and the collector of the first NPN-type bipolar transistor, and a base connected to the base of the first NPN-type bipolar transistor. The buffer amplifying section may further include a second PNP-type bipolar transistor having a collector connected to a negative pole of the DC power source and the collector of the first PNP-type bipolar transistor, an emitter connected to the emitter of the second NPN-type bipolar transistor, and a base connected to the base of the first PNP-type bipolar transistor. One end of the first impedance element may be connected to a node between the base of the NPN-type bipolar transistor and the base of the first PNP-type bipolar transistor, and one end of the second impedance element may be connected to a node between the emitter of the second NPN-type bipolar transistor and the emitter of the second PNP-type bipolar transistor. The current amplifying section may includes an NPN-type bipolar transistor having a collector connected to the positive pole of the DC power source, an emitter connected to one end of the secondary winding of the transformer, and a base connected to the other end of the secondary winding of the transformer. The current amplifying section may further includes a PNP-type bipolar transistor having a collector connected to the negative pole of the DC power source, an emitter connected to the emitter of the NPN-type bipolar transistor, and a base connected to the base of the NPN-type bipolar transistor. One end of the first impedance element may be connected to a node between the base of the NPN-type bipolar transistor and the base of the PNP-type bipolar transistor, and one end of the second impedance element may be connected to a node between the emitter of the NPN-type bipolar transistor and the emitter of the PNP-type bipolar transistor. The current amplifying section may include a first N-type field effect transistor having a drain connected to the positive pole of the DC power source, a source connected to one end of the secondary winding of the transformer, and a gate connected to the other end of the secondary winding of the transformer. The current amplifying section may further include a first P-type field effect transistor having a drain connected to the negative pole of the DC power source, a source connected to the source of the first N-type field effect transistor, and a gate connected to the gate of the first N-type field effect transistor. The buffer amplifying section may include a second N-type field effect transistor having a drain connected to the positive pole of the DC power source and the drain of the first N-type field effect transistor, and a gate connected to the gate of the first N-type field effect transistor. The buffer amplifying section may further include a second P-type field effect transistor having a drain connected to the negative pole of the DC power source and the drain of the first P-type field effect transistor, a source connected to the source of the second N-type field effect transistor, and a gate connected to the gate of the first P-type field effect transistor. One end of the first impedance element may be connected to a node between the gate of the first N-type field effect transistor and the gate of the first P-type field effect transistor, and one end of the second impedance element may be connected to a node between the source of the second N-type field effect transistor and the source of the second P-type field effect transistor. The current amplifying section may include an N-type field effect transistor having a drain connected to the positive pole of the DC power source, a source connected to one end of the secondary winding of the transformer, and a gate connected to the other end of the secondary winding of the transformer. The current amplifying section may further include a P-type field effect transistor having a drain connected to the negative pole of the DC power source, a source connected to the source of the N-type field effect transistor, and a gate connected to the gate of the N-type field effect transistor. One end of the first impedance element may be connected to a node between the gate of the N-type field effect transistor and the gate of the P-type field effect transistor. One end of the second impedance element may be connected to a node between the source of the N-type field effect transistor and the source of the P-type field effect transistor. The first impedance element and the second impedance element may be formed of capacitors, respectively.

An amplifying circuit according to a second aspect of the present invention includes an NPN-type bipolar transistor having an emitter connected to one end of a secondary winding of a transformer with a primary winding and the secondary winding, a collector connected to a positive pole of a DC power source, and a first resistor connected between the collector and a base of the NPN-type bipolar transistor. The amplifying circuit further includes a first voltage drop element connected between the base of the NPN-type bipolar transistor and the other end of the secondary winding of the transformer to generate a voltage drop corresponding to a base-emitter voltage of the NPN-type bipolar transistor. The amplifying circuit further includes a PNP-type bipolar transistor having an emitter connected to one end of the secondary winding of the transformer, a collector connected to a negative pole of the DC power source, and a second resistor connected between the collector and the base of the PNP-type bipolar transistor. The amplifying circuit further includes a second voltage drop element connected between the base of the PNP-type bipolar transistor and the other end of the secondary winding of the transformer to generate a voltage drop corresponding to a base-emitter voltage of the PNP-type bipolar transistor. The amplifying circuit further includes a current supply capacitor having one end connected to a node between the first voltage drop element and the second voltage drop element. Current flowing into the primary winding of the transformer is amplified and the amplified current is output via the current supply capacitor. The amplifying circuit may further include a gain correction capacitor having one end connected to a node between the emitter of the NPN-type bipolar transistor and the emitter of the PNP-type bipolar transistor. Current flowing into the primary winding of the transformer is amplified, and the amplified current may be output from each of the current supply capacitor and the gain correction capacitor at a ratio determined by an impedance ratio between the current supply capacitor and the gain correction capacitor.

An amplifying circuit according to a third aspect of the present invention includes a PNP-type bipolar transistor having an emitter connected to one end of a first secondary winding of a transformer with a primary winding and first and second secondary windings, and a first resistor connected between a collector and a base of the PNP-type bipolar transistor. The amplifying circuit further includes a first voltage drop element connected between the base of the PNP-type bipolar transistor and the other end of the first secondary winding of the transformer to generate a voltage drop corresponding to a base-emitter voltage of the PNP-type bipolar transistor. The amplifying circuit further includes an NPN-type bipolar transistor having an emitter connected to one end of a second secondary winding of the transformer, a collector connected to the collector of the PNP-type bipolar transistor, and a second resistor connected between the collector and the base of the NPN-type bipolar transistor. The amplifying may further include a second voltage drop element connected between the base of the NPN-type bipolar transistor and the other end of the second secondary winding of the transformer to generate a voltage drop corresponding to a base-emitter voltage of the NPN-type bipolar transistor. The amplifying circuit further includes a current supply capacitor having one end connected to a node between the collector of the PNP-type bipolar transistor and the collector of the NPN-type bipolar transistor. A positive pole of a DC power source is connected to the other end of the first secondary winding of the transformer. A negative pole of the DC power source is connected to the other end of the second secondary winding, and current flowing into the primary winding of the transformer is amplified and the amplified current is output via the current supply capacitor.

An amplifying circuit according to a fourth aspect of the present invention includes a first NPN-type bipolar transistor having an emitter connected to one end of a first secondary winding of a transformer with a primary winding and first and second secondary windings, a collector connected to a positive pole of a DC power source, and a first resistor connected between the collector and a base of the first NPN-type bipolar transistor. The amplifying circuit further includes a first voltage drop element connected between the base of the first NPN-type bipolar transistor and the other end of the first secondary winding of the transformer to generate a voltage drop corresponding to a base-emitter voltage of the first NPN-type bipolar transistor. The amplifying circuit further includes a second NPN-type bipolar transistor having an emitter connected to one end of the second secondary winding of the transformer, a collector connected to the other end of the first secondary winding of the transformer, and a second resistor connected between the collector and a base of the second NPN-type bipolar transistor. The amplifying circuit further includes a second voltage drop element connected between the base of the second NPN-type bipolar transistor and the other end of the second secondary winding of the transformer to generate a voltage drop corresponding to a base-emitter voltage of the second NPN-type bipolar transistor. The amplifying circuit further includes a current supply capacitor having one end connected to a node between the other end of the first secondary winding of the transformer and the collector of the second NPN-type bipolar transistor. A negative pole of the DC power source is connected to the other end of the second secondary winding of the transformer. Current flowing into the primary winding of the transformer is amplified and the amplified current is output via the current supply capacitor.

An amplifying circuit according to a fifth aspect of the present invention includes a first NPN-type bipolar transistor having an emitter connected to one end of a first secondary winding of a transformer with a primary winding and first and second secondary windings. The amplifying circuit further includes first and second resistors connected in series between a positive pole of a DC power source and a base of the first NPN-type bipolar transistor. The amplifying circuit further includes a first field effect transistor having one end of either a drain or a source connected to the positive pole of the DC power source and one end of the first resistor, the other end of either the drain or the source connected to a collector of the first NPN-type bipolar transistor, and a gate connected to a node between the first resistor and the second resistor. The amplifying circuit further includes a first voltage drop element connected between the base of the first NPN-type bipolar transistor and the other end of the first secondary winding of the transformer to generate a voltage drop corresponding to a base-emitter voltage of the first NPN-type bipolar transistor. The amplifying circuit further includes a second NPN-type bipolar transistor having an emitter connected to one end of the second secondary winding of the transformer. The amplifying circuit further includes third and fourth resistors connected in series between the other end of the first secondary winding of the transformer and a base of the second NPN-type bipolar transistor. The amplifying circuit further includes a second field effect transistor having one end of either a drain or a source connected to the other end of the first secondary winding of the transformer, the other end of either the drain or the source connected to a collector of the second NPN-type bipolar transistor, and a gate connected to a node between the third resistor and the fourth resistor. The amplifying circuit further includes a second voltage drop element connected between the base of the second NPN-type bipolar transistor and the other end of the second secondary winding of the transformer to generate a voltage drop corresponding to a base-emitter voltage of the second NPN-type bipolar transistor. The amplifying circuit further includes a current supply capacitor having one end connected to a node between the other end of the first secondary winding of the transformer and one end of the second field effect transistor. A negative pole of the DC power source is connected to the other end of the second secondary winding of the transformer. Current flowing into the primary winding of the transformer is amplified and the amplified current is output via the current supply capacitor.

An amplifying circuit according to a sixth aspect of the present invention includes a first PNP-type bipolar transistor having an emitter connected to one end of a first secondary winding of a transformer with a primary winding and first and second secondary windings, a collector connected to one end of the second secondary winding of the transformer, and a first resistor connected between the collector and a base of the first PNP-type bipolar transistor. The amplifying circuit further includes a first voltage drop element connected between the base of the first PNP-type bipolar transistor and the other end of the first secondary winding of the transformer to generate a voltage drop corresponding to a base-emitter voltage of the first PNP-type bipolar transistor. The amplifying circuit further includes a second PNP-type bipolar transistor having an emitter connected to the other end of the second secondary winding of the transformer, a collector connected to a negative pole of a DC power source, and a second resistor connected between the collector and a base of the second PNP-type bipolar transistor. The amplifying circuit further includes a second voltage drop element connected between the base of the second PNP-type bipolar transistor and one end of the second secondary winding of the transformer to generate a voltage drop corresponding to a base-emitter voltage of the second PNP-type bipolar transistor. The amplifying circuit further includes a current supply capacitor having one end connected to a node between the collector of the first PNP-type bipolar transistor and one end of the second secondary winding of the transformer. A positive pole of the DC power source is connected to the other end of the first secondary winding of the transformer. Current flowing into the primary winding of the transformer is amplified and the amplified current is output via the current supply capacitor.

The amplifying circuit may further include a capacitor connected in parallel to the first voltage drop element, and a capacitor connected in parallel to the second voltage drop element.

An amplifying circuit according to a seventh aspect of the present invention includes an NPN-type bipolar transistor having an emitter connected to one end of a secondary winding of a transformer with a primary winding and the secondary winding, a collector connected to a positive pole of a DC power source, and a first resistor connected between the collector and a base of the NPN-type bipolar transistor. The amplifying circuit further includes a PNP-type bipolar transistor having an emitter connected to the emitter of the NPN-type bipolar transistor, a collector connected to a negative pole of the DC power source, and a second resistor connected between the collector and a base of the PNP-type bipolar transistor. The amplifying circuit further includes first and second voltage drop elements connected in series between the base of the NPN-type bipolar transistor and the base of the PNP-type bipolar transistor to generate voltage drops corresponding to a base-emitter voltage of the NPN-type bipolar transistor and an emitter-base voltage of the PNP-type bipolar transistor. The amplifying circuit further includes a first capacitor connected between the base of the NPN-type bipolar transistor and the other end of the secondary winding of the transformer. The amplifying circuit further includes a second capacitor connected between the base of the PNP-type bipolar transistor and the other end of the secondary winding of the transformer. The amplifying circuit further includes a current supply capacitor having one end connected to the other end of the secondary winding of the transformer. Current flowing into the primary winding of the transformer is amplified and the amplified current is output via the current supply capacitor.

The amplifying circuit may further include a gain correction capacitor having one end connected to a node between the emitter of the NPN-type bipolar transistor and the emitter of the PNP-type bipolar transistor. Current flowing into the primary winding of the transformer is amplified, and the amplified current may be output from each of the current supply capacitor and the gain correction capacitor at a ratio determined by an impedance ratio between the current supply capacitor and the gain correction capacitor.

The first and second voltage drop elements may be formed of diodes.

The voltage drop elements and bipolar transistors may be arranged close to one another.

The voltage drop elements and the bipolar transistors may be formed on the same substrate of a semiconductor.

An amplifying circuit according to an eighth aspect of the present invention is an amplifying circuit that is connected to a secondary winding of a transformer with a primary winding and the secondary winding. The amplifying circuit includes a control section that has a current path and a control terminal where one end of the secondary winding of the transformer is connected to one end of the current path to control an amount of current flowing into the secondary winding of the transformer based on voltage between one end of the secondary winding and the control terminal. The amplifying circuit further includes a voltage adjusting section that adjusts voltage of the other end of the secondary winding such that voltage between one of the secondary winding of the transformer and the other end thereof is set to zero. Current flowing into the primary winding of the transformer is amplified and the amplified current is output to an external section via an impedance element.

The control section may be comprised of a transistor. One end of the current path may be an emitter of the transistor, the other end may be a collector of the transistor, the control terminal may be a base of the transistor, and one end of the secondary winding of the transformer may be connected to the emitter. The transistor may control the amount of current flowing into the secondary winding of the transformer based on voltage between one end of the secondary winding and the base.

The voltage adjusting section may be formed of diodes connected between the other end of the secondary winding of the transformer and the control terminal of the control section.

A noise reducing apparatus according to a ninth aspect of the present invention is a noise reducing apparatus that reduces noise propagating from a predetermined power source to a pair of power lines for power supply. The noise reducing apparatus includes a transformer that uses the pair of power lines as a primary winding to detect a leakage current leaking into a ground line from the pair of power lines. The noise reducing apparatus further includes the amplifying circuit described in claim 1 that amplifies current flowing into the primary winding of the transformer to output the amplified current from each of a first impedance element and a second impedance element at a ratio determined by a ratio between the first impedance element and the second impedance element such that the amplified current is supplied to a ground line in a direction that cancels the leakage current at a power source side instead of the transformer.

The amplifying circuit may amplify current flowing into the primary winding of the transformer such that a current value of current to be supplied to the ground line becomes equal to a current value of the leakage current detected by the transformer.

A noise reducing apparatus according to a tenth aspect of the present invention is a noise reducing apparatus that reduces noise propagating from a predetermined power source to a pair of power lines for power supply. The noise reducing apparatus includes a transformer that uses the pair of power lines as a primary winding to detect a leakage current leaking into a ground line from the pair of power lines. The noise reducing apparatus further includes the amplifying circuit described in claim 9 that amplifies current flowing into the primary winding of the transformer to supply the amplified current to a ground line in a direction that cancels the leakage current at a power source side instead of the transformer.

The amplifying circuit may amplify current flowing into the primary winding of the transformer such that a current value of current to be supplied to the ground line becomes equal to a current value of the leakage current detected by the transformer.

A noise reducing apparatus according to an eleventh aspect of the present invention is a noise reducing apparatus that reduces noise propagating to a pair of power lines for power supply. The noise reducing apparatus includes a leakage current detecting section that detects current induced by an output winding of a transformer having the output winding passing through a magnetic core with the power lines, thereby detecting a leakage current caused by noise flowing into a ground line from the power lines. The noise reducing apparatus further includes a current supplying section that supplies a compensation current for canceling the leakage current to the injection point which is on the ground line closer to an input of the power lines than a leakage current detecting point, wherein the current supplying section uses the leakage current detected by said leakage current detecting section as the compensation current.

The power lines and the output winding may pass through the magnetic core only one time, respectively.

The magnetic core of the transformer may have a shape dividable into a plurality of portions and the divided portions are combinable, thereby allowing the power lines to be passed through the magnetic core without cutting the power lines.

The transformer may induce current having a current value equal to a zero-phase current of the power lines to the output winding.

The current supplying section may include an amplifying circuit that amplifies the leakage current detected by the leakage current detecting section, wherein the amplifying circuit may amplify current to be supplied to the ground line with an amplitude set to 1, when power is supplied from a predetermined DC power source.

The amplifying circuit may include an NPN transistor, a PNP transistor and a capacitor, a collector of the NPN transistor may be connected to a positive pole of a DC power source. An emitter of the PNP transistor may be connected to an emitter of the NPN transistor. A collector of the PNP transistor may be connected to a negative pole of the DC power source. One output terminal of the leakage current detecting section may be connected to a base of the NPN transistor and a base of the PNP transistor. The other output terminal of the leakage current detecting section may be connected to the emitter of the NPN transistor and the emitter of the PNP transistor. The capacitor may be connected between the ground line and the bases of the NPN transistor and the PNP transistor.

The amplifying circuit may be an amplifying circuit connected to a secondary winding of a transformer with a primary winding and a secondary winding. The amplifying circuit may include a current amplifying section that amplifies current flowing into the secondary winding of the transformer to output via a first impedance element. The amplifying circuit may further include a buffer amplifying section that applies voltage corresponding to voltage applied to the first impedance element by the current amplifying section to a second impedance element to output current from the second impedance element. Current corresponding to current obtained by amplifying current flowing into the primary winding of the transformer may be output from each of the first impedance element and the second impedance element at a ratio determined by an impedance ratio between the first impedance element and the second impedance element.

The amplifying circuit may include an NPN-type bipolar transistor having an emitter connected to one end of a secondary winding of a transformer with a primary winding and the secondary winding, a collector connected to a positive pole of a DC power source, and a first resistor connected between the collector and a base of the NPN-type bipolar transistor. The amplifying circuit may further include a first voltage drop element connected between the base of the NPN-type bipolar transistor and the other end of the secondary winding of the transformer to generate a voltage drop corresponding to a base-emitter voltage of the NPN-type bipolar transistor. The amplifying circuit may further include a PNP-type bipolar transistor having an emitter connected to one end of the secondary winding of the transformer, a collector connected to a negative pole of the DC power source. The amplifying circuit may further include a second resistor connected between the collector and the base of the PNP-type bipolar transistor. The amplifying circuit may further include a second voltage drop element connected between the base of the PNP-type bipolar transistor and the other end of the secondary winding of the transformer to generate a voltage drop corresponding to a base-emitter voltage of the PNP-type bipolar transistor. The amplifying circuit may further include a current supply capacitor having one end connected to a node between the first voltage drop element and the second voltage drop element. Current flowing into the primary winding of the transformer is amplified and the amplified current may be output via the current supply capacitor.

A power converting apparatus according to a twelfth aspect of the present invention include a power converting section that converts power supplied from a power source into power with a predetermined voltage to supply to a load. The power converting apparatus further includes the noise reducing apparatus according to the above ninth aspect that reduces noise propagating to a pair of power lines for power supply from the power source to the power converting section.

A power converting apparatus according to a thirteenth aspect of the present invention includes a power converting section that converts power supplied from a power source into power with a predetermined voltage to supply to a load. The power converting apparatus further includes the noise reducing apparatus according to the above tenth aspect that reduces noise propagating to a pair of power lines for power supply from the power source to the power converting section.

A power converting apparatus according to a fourteenth aspect of the present invention includes a power converting section that converts power supplied from a power source into power with a predetermined voltage to supply to a load. The power converting apparatus further includes the noise reducing apparatus according to the above eleventh aspect that reduces noise propagating to a pair of power lines for power supply from the power source to the power converting section.

The power converting section may include a transformer, and the transformer may further include an auxiliary winding that forms a DC power source for supplying power to the current supplying section that the noise reducing apparatus includes.

The power converting section may include an inverter circuit and a control circuit that controls the inverter circuit, and an operating power source for the control circuit, and the operating power source may be used as a DC power source for supplying power to the current supplying section that the noise reducing apparatus includes.

BRIEF DESCRIPTION OF THE DRAWINGS

These objects and other objects and advantages of the present invention will become more apparent upon reading of the following detailed description and the accompanying drawings in which:

FIG. 23A to FIG. 23F are timing charts each illustrating an operation of the power converting apparatus of FIG. 20;

FIG. 24A to FIG. 24F are timing charts each illustrating an operation of a noise reducing section;

DETAILED DESCRIPTION OF THE PREFERRED EMBODIMENTS

Embodiments of the present invention will be explained with reference to the drawings.

First Embodiment

Figure 1:
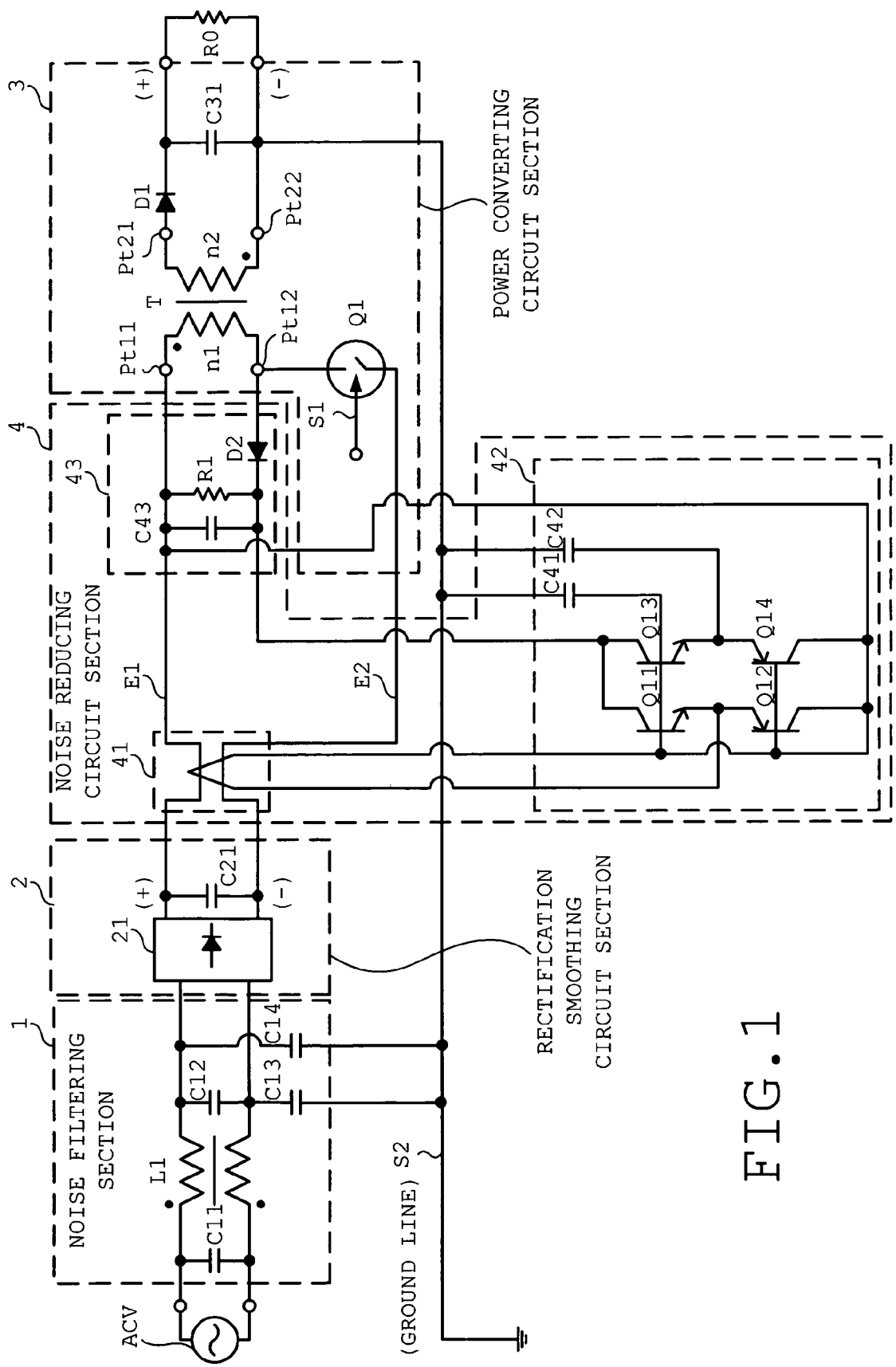
FIG. 1 is a block diagram illustrating the structure of a power converting apparatus according to a first embodiment of the present invention.

FIG. 1 is a block diagram illustrating the structure of a power converting apparatus according to a first embodiment of the present invention.

As illustrated in the figure, the power converting apparatus includes a noise filter section 1, a rectification smoothing circuit section 2, a power converting circuit section 3, and a noise reducing circuit section 4.

The noise filter section 1 includes capacitors C11, C12, C13 and C14, and a choke coil L1.

The choke coil L1 has a pair of common mode choke coils that attenuate common mode noise. The pair of common mode choke coils is connected to a pair of power lines of an alternating current source ACV in series one by one such that their winding directions are the same as each other seeing from the alternating current source ACV.

The capacitors C11 and C12 are across-the-line capacitors that attenuate normal mode noise. The capacitor C11 is connected between the pair of power lines of the alternating current source ACV. The capacitor C12 is connected between the pair of power lines where the common mode choke coil L1 is inserted (namely, a portion between a pair of ends of the common mode choke coils that form the choke coil L1, which are not connected to the alternating current source ACV).

The capacitors C13 and C14 are capacitors to reduce common mode noise. The capacitor C13 is connected between one of the pair of power lines where the common mode choke coil L1 is inserted and a ground line. The capacitor C14 is connected between the other power line and the ground line.

The rectification smoothing circuit section 2 include a rectifying circuit 21 and a capacitor C21.

The rectifying circuit 21 is one that rectifies an AC voltage that was supplied from the alternating current source ACV and passed through the noise filter section 1. The rectifying circuit 21 includes, for example, a bridge rectifying circuit having four diodes. Moreover, the rectifying circuit 21 includes a pair of input terminals and an output terminal having a positive pole and a negative pole. The input terminals of the rectifying circuit 21 are connected between the pair of power lines where the common mode choke coil L1 is inserted. A rectifying voltage, which is obtained by rectifying the AC voltage applied between the input terminals of the rectifying circuit 21, is output between the positive and negative poles of the output terminal of the rectifying circuit 21. In this case, it is assumed that the positive voltage with reference to the negative pole of the output terminal has a positive value. In addition, a line E1 is connected to the positive pole of the output terminal and a line E2 is connected to the negative pole thereof.

The capacitor C21 is connected between both poles of the output terminal of the rectifying circuit 21, and smoothes a rectifying voltage output from between the poles.

The power converting circuit section 3 converts a predetermined DC power to a DC power with a predetermined voltage, and supplies a DC output voltage obtained by the conversion to an external load R0. As illustrated in the figure, the power converting circuit section 3 includes, for example, a flyback converter having a transformer T, a switching element Q1, a diode D1, and a capacitor C31, and a control section (not shown).

The transformer T includes a primary winding n1 and a secondary winding n2. The primary winding n 1 includes a pair of terminals Pt 11 and Pt 12, and the secondary winding n2 includes a pair of terminals Pt 21 and Pt 22. The primary n1 and the secondary winding n2 are wound such that the end Pt 11 and the end Pt 22 have polarities opposite to each other. The end Pt 11 is connected to the positive pole of the output terminal of the rectifying circuit 21 of the rectification smoothing circuit section 2 via the line E1.

The switching element Q1 is formed of FET (Field Effect Transistor) and includes a control terminal and a current path. One end of the current path of the switching element Q1 is connected to an end Pt 12 of the primary winding n1. The other end of the current path is connected to the negative pole of the output terminal of the rectifying circuit 21 via the line E2 as illustrated in the figure. When a pulse signal S1 is supplied to the control terminal of the switching element Q1, the switching element Q1 switches its current path according to the signal S1, thereby switching the current flowing between the other end of the current path and an end Pt 11 of the primary winding n1 via the primary winding n1. As a result, power is intermittently supplied to the primary winding n1, and AC voltage is excited. In this way, power is transmitted from the primary side of the transformer T to the secondary side.

An anode of the diode D1 is connected to, for example, the end Pt 21 of the secondary winding n2 as illustrated in the figure, and a cathode of the diode D1 is connected to, for example, a positive pole (+) of the output terminal of the power converting circuit section 3 as illustrated in the figure. In addition, a negative pole (−) of the output terminal of the power converting circuit section 3 is connected to the end Pt 22 of the secondary winding n2. The diode D1 is reversely biased during the time (on-period) when the current path of the switching element Q1 turns on, and is forward biased during the time (off-period) when the current path of the switching element Q1 turns off. As a result, the diode D1 rectifies the current flowing by voltage induced to the secondary winding n2.

The capacitor C31 is connected between the cathode of the diode D1 and the end Pt22 of the secondary winding n2 as illustrated in the figure. The capacitor C31 smoothes the current passed through the diode D1 and serves as a supply source of current to be supplied to the load R0 during the off period, thereby generating a DC output voltage.

The control section of the power converting circuit section 3 includes an oscillator, a PWM (Pulse Width Modulation) control circuit, and supplies the aforementioned pulse signal S1 to the control terminal of the switching element Q1. Then, the control section provides PWM control to the signal S1, thereby stabilizing the output voltage.

The noise reducing circuit section 4 is a circuit for reducing noise of the power converting apparatus. The noise reducing circuit 4 includes a zero phase current transformer 41, an amplifying circuit 42, and a diode snubber circuit 43.

The zero phase current transformer 41 is a transformer for detecting a leakage current. The zero phase current transformer 41 includes a structure illustrated in, for example, FIG. 2B. Namely, as illustrated in FIG. 2B, the zero phase current transformer 1 has the structure in which the lines E1 and E2 are respectively wound around a magnetic core 41A of the through type current transformer 41B having the magnetic core 41A and a secondary winding n21 illustrated in FIG. 2A.

As illustrated in the figure, the secondary winding n21 has terminals P3 and P4. One of the terminals P3 and P4 is connected to each base of transistors Q11 to Q14 (to be described later) of the amplifying circuit 42 and the other is connected to each emitter of transistors Q11 and Q12.

Figure 2A:
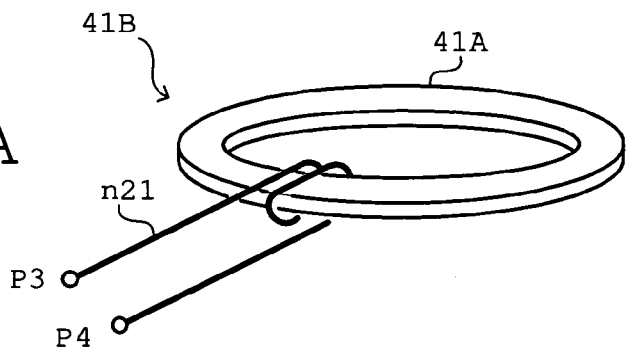
FIG. 2A is a perspective view of a through type current transformer.
Figure 2B:
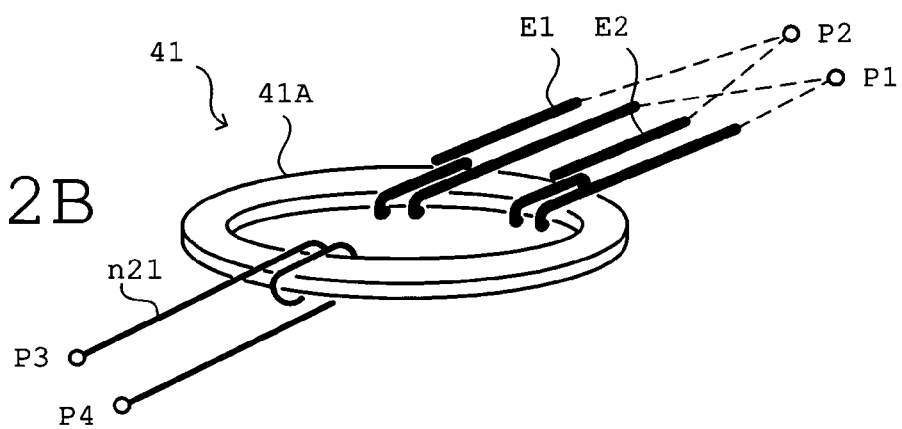
FIG. 2B is a perspective view of a zero phase current transformer.
Figure 2C:
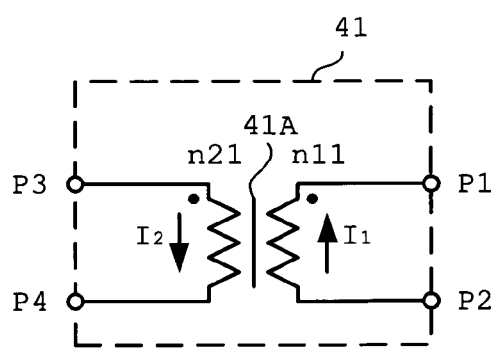
FIG. 2C is a circuit diagram illustrating an equivalent circuit of the zero phase current transformer of FIG. 1.

FIG. 2C is a view illustrating an equivalent circuit of the zero phase current transformer 41. It is assumed that a virtual primary winding n11 of the zero phase current transformer 41 shown in FIG. 2C has virtual terminals P1 and P2, and that current, which corresponds to a difference in current flowing into the lines E1 and E2, is made to flow.

When the leakage current flows into the lines E1 and E2, a current difference occurs between the lines E1 and E2. The zero phase current transformer 41 detects the current difference, thereby detecting the leakage current.

In other words, a primary current I1 flows into the virtual primary winding n11 of the zero phase current transformer 41 as the current difference between the lines E1 and E2, and current I2 is induced to a secondary winding n21 based on the primary current I1. The winding direction of the secondary wire n21 is set such that the induced current I2 flows into the ground line in the direction that cancels the leakage current.

The amplifying circuit 42 amplifies the current induced to the secondary winding n21 of the zero phase current transformer 41, and supplies the amplified current to the ground line in the direction that cancels the leakage current. The amplifying circuit 42 includes transistors Q11 to Q14 and capacitors C41 and C42 as illustrated in FIGS. 1 and 3.

Figure 3:
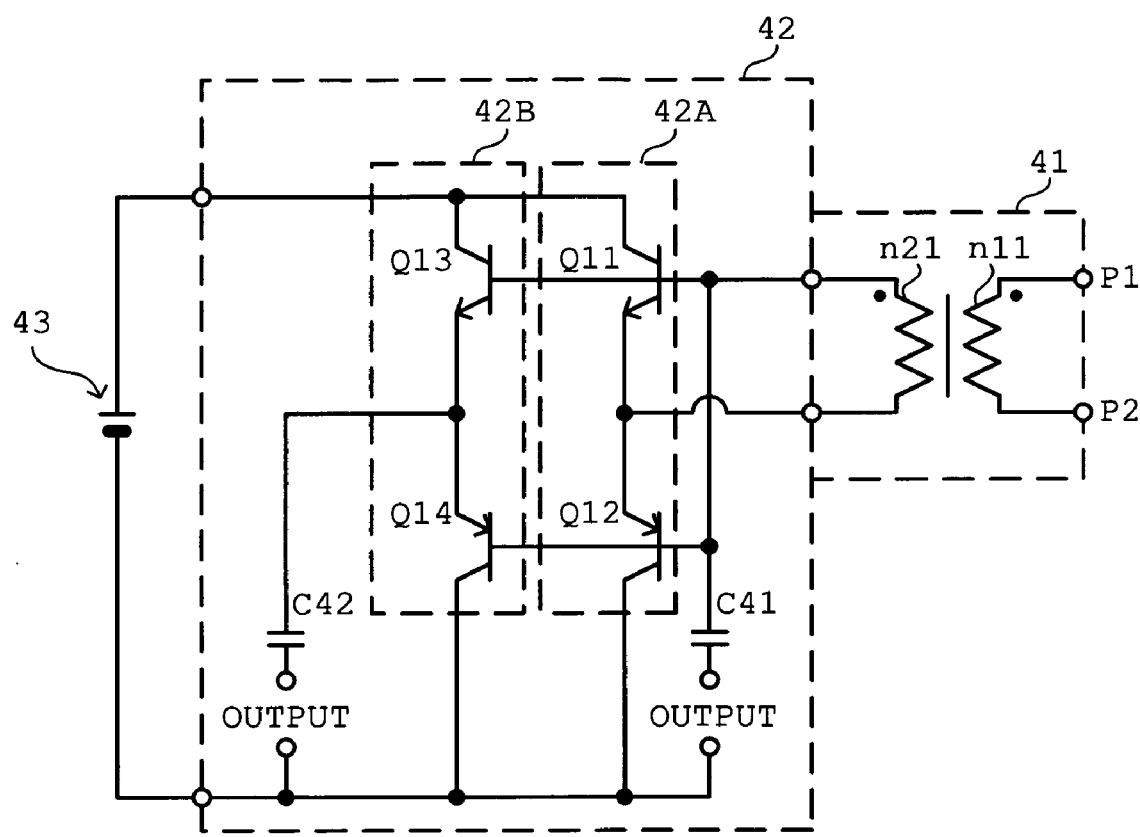
FIG. 3 is a circuit diagram illustrating the structure of the amplifying circuit of FIG. 1.

Among these, the transistors Q11 and Q12 form a main amplifier 42A as illustrated in FIG. 3. The main amplifier 42A functions as a current amplifier. Moreover, the transistors Q13 and Q14 form a correction amplifier 42B as illustrated in FIG. 3. The correction amplifier 42B functions as a voltage amplifier.

The transistors Q11 and Q13 are NPN-type bipolar transistors. Both collectors of the transistors Q11 and Q13 are connected to a cathode of a diode D2 (to be described later) of the diode snubber circuit 43.

The transistors Q12 and Q14 are PNP-type bipolar transistors. An emitter of the transistor Q12 is connected to an emitter of the transistor Q11, and an emitter of the transistor Q14 is connected to an emitter of the transistor Q13. Both collectors of the transistors Q12 and Q14 are connected to the end Pt11 of the transformer T.

The capacitor C41 is a capacitor for supplying a compensation current to the ground line, and is connected between each base of the transistors Q11 to Q14 and the ground line.

The capacitor C42 is a capacitor for adjusting an amplification factor of the amplifying circuit 42, and is connected between a node, which is between the emitter of the transistor Q13 and the emitter of the transistor Q14, and the ground line.

The diode snubber circuit 43 includes a capacitor C43, a resistor R1, and a diode D2. An anode of the diode D2 is connected to the end Pt12 of the transformer T of the power converting circuit section 3. The capacitor C43 and the resistor R1 are connected between a cathode of the diode D2 and the end Pt11 of the transformer, respectively.

An operation of the power converting apparatus of FIG. 1 will be next explained with reference to FIG. 4. In the explanation given below, it is assumed that the switching element Q1 turns on when a signal S1, which is supplied to the control end of the switching element Q1 by the control section of the power converting circuit section 3, becomes high level, and the switching element Q1 turns off when the signal S1 becomes low level.

In this case, it is assumed that the control section of the power converting circuit section 3 supplies the signal S1 shown in FIG. 4A to the control terminal of the switching element Q1. As a result, illustrated time t1 to time t1 become an on-period of the switching element Q1 and time t1 to time t2 become an off-period of the switching element Q1.

The switching element Q1 turns on/off, so that the current flowing into the primary winding n1 of the transformer T is switched and voltage is generated in the primary winding n1 of the transformer T according to this switching.

During the on-period, at the primary winding side of the transformer T, voltage Vq1 to be applied to the switching element Q1 becomes substantially 0 as illustrated in FIG. 4B, and current Iq1 having intensity as illustrated in FIG. 4C flows into the switching element Q1. On the other hand, the secondary winding n2 of the transformer T has the polarity opposite to the primary winding n1. For this reason, during the on-time, at the secondary winding side of the transformer T, the diode d1 prevents current from passing through the interior of the secondary winding n2. As a result, the secondary winding n2 is substantially opened. During the on-period, energy is stored in the transformer T. Voltage V1 as illustrated in FIG. 4D is applied to the primary winding n1 of the transformer T.

During the off-period, voltage Vq1 to be applied to the switching element Q1 becomes higher than charge voltage of the capacitor C21 as illustrated in FIG. 4B, and current Iq1 flowing into the switching element Q1 becomes substantially 0 as illustrated in FIG. 4C.

Moreover, during the off-period, the diode D1 conducts at the secondary winding side of the transformer T and the transformer T discharges stored energy. More specifically, because of this energy, current Id having intensity as illustrated in FIG. 4E flows into the capacitor C31 from the secondary winding n2 via the diode D1. An initial intensity value of current Id is set to a value, which is proportional to a maximum current value of current Iq1 and is reversely proportional to a turn ratio between the primary winding n1 and secondary winding n2 of the transformer T. Then, the intensity of current Id afterward decreases as the transformer T discharges energy, and the intensity of current Id becomes 0 at the time when the transformer T discharges all stored energy.

In addition, as illustrated in FIG. 4B and FIG. 4D, during the off-period, a spike voltage caused by inductance of the transformer T and inductance provided in the wiring is superimposed on the voltage Vq1 and the voltage Vt1. The diode snubber circuit 43 decreases the voltage level of the spike voltage.

More specifically, the diode D2 rectifies the current caused by the spike voltage, the capacitor C43 stores the rectified current as power, and the resistor R1 consumes power stored in the capacitor C43. The diode snubber circuit 43 having such the function supplies power stored in the capacitor C43 to the amplifying circuit 42.

The capacitor C31 smoothes the current Id rectified by the diode D1. This generates a DC voltage, and the power converting circuit section 3 supplies the generated DC voltage to the load R0.

Figure 4:
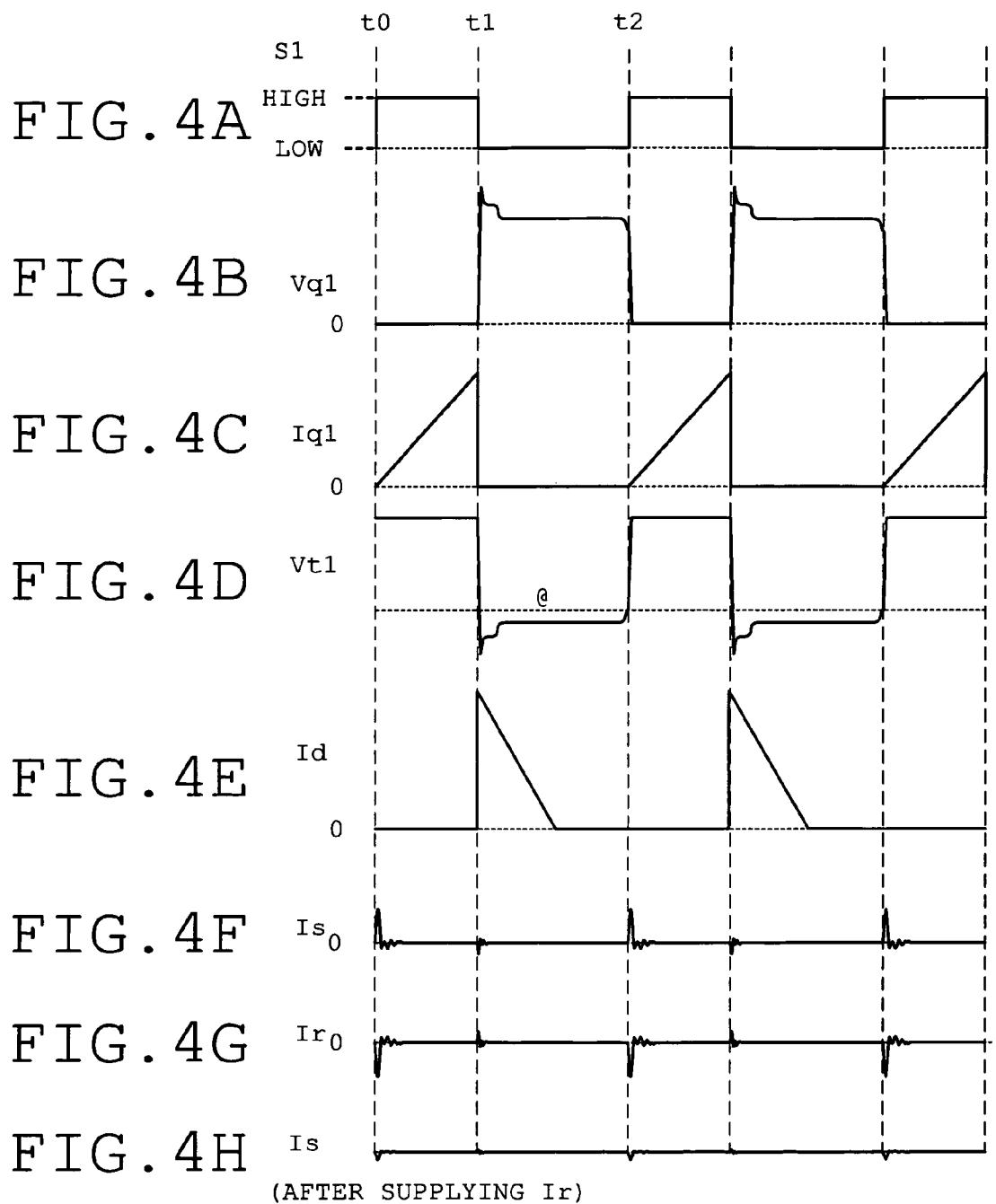
FIGS. 4A to 4H are timing charts each illustrating an operation of the power converting apparatus of FIG. 1.

While, the switching element Q1 is switched, so that a leakage current Is having intensity as illustrated in, for example, FIG. 4 flows into the ground line from the power converting apparatus via the capacitors C13 and C14. This phenomenon causes generation of common mode noise.

When imbalanced current flows into the lines E1 and E2, an induced current flows into the secondary winding n21 of the zero phase current transformer 41.

In a positive half cycle of the induced current, the induced current divides and flows into each base of the transistors Q11 and Q13 as a base current. The induced current flows, so that the potential of each emitter of the transistors Q11 and Q13 rises. Moreover, the induced current flows, so that the potential of each base of the transistors Q11 and Q13 rises. The amplification factors of the transistors Q11 and Q13 may be considered to be sufficiently larger than 1, with the result that current having the same current value as the leakage current Is is generated by the amplifying circuit 42.

On the other hand, in a negative half cycle of the induced current, the transistors Q12 and Q14 operate in the same way as the transistors Q11 and Q13 in the positive half cycle of the induced current to generate current having the same current value as the leakage current Is.

The operations of the transistors Q11 and Q13 and those of the transistors Q12 and Q14 are combined to generate a compensation current Ir having intensity as illustrated in, for example, FIG. 4G.

Then, the amplifying circuit 42 supplies the compensation current Ir to the ground line via the capacitors C41 and C43 in the direction opposite to the leakage current Is. As a result, for example, as illustrated in FIG. 4H, the leakage current Is decreases. Accordingly, the power converting apparatus can decrease common mode noise.

Figure 5:
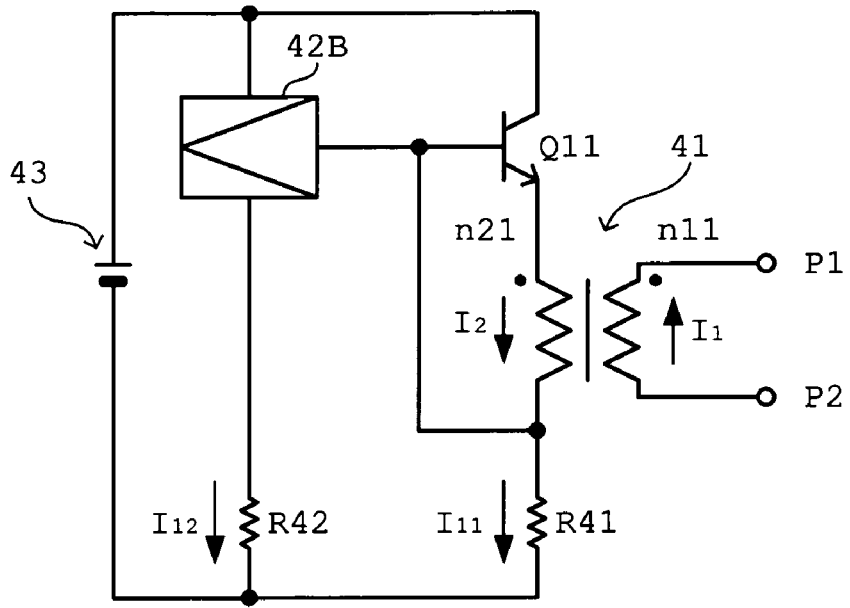
FIG. 5 is a view explaining an amplification principle of an amplifying circuit.

An operation of the amplifying circuit 42 will be next explained with reference to FIG. 5. The explanation is given in a state that the capacitors C41 and C42 of the amplifying circuit 42 are replaced with the resistors R41 and R42 having resistance values that are proportional to magnitude of impedances, respectively.

When the primary current I1 flows into the virtual primary winding n11 of the zero phase current transformer 41, current I2 is induced to the secondary winding n21 based on the primary current I1. In addition, the winding direction of the secondary winding n21 is set such that the current I2 is amplified and supplied to the ground line in a direction that cancels the leakage current.

Current I11 having substantially the same current value as the current I2 is supplied to the resistor R41. Moreover, voltage, which is equal to the voltage applied to the resistor R41, is applied to the resistor R42. Accordingly, a current value of current I12 flowing into the resistor R42 can be expressed by the following equation (5):

$$i12 = i2 \cdot (r41/r42) \tag{5}$$

(where i12 is a current value of the current I12 flowing into the resistor R42, i2 is a current value of the current I2, r41 is a resistance value of the resistor R41, and r42 is a resistance value of the resistor R42).

Moreover, a gain of the amplifying circuit 42 can be expressed by the following equation (6):

$$A42 = \{1 + (r41/r42)\} \tag{6}$$

(where A42 is a gain of the amplifying circuit 42).

As shown by the equation (6), the gain of the amplifying circuit 42 is decided according to the ratio between the resistance values of the resistor R41 and resistor R42. Accordingly, the gain of the amplifying circuit 42 can be arbitrarily decided by changing the ratio.

For example, when an error occurs in a detection ratio of the zero phase current transformer 41, the ratio between the resistance values of the resistor R41 and resistor R42 is changed to adjust the gain of the amplifying circuit 42, thereby making it possible to set the total gain of the zero phase current transformer 41 and the amplifying circuit 42 to 1.

As explained above, the power converting apparatus of the first embodiment is structured to provide the correction amplifier 42B in parallel with the main amplifier 42A of the amplifying circuit 42, so that the gain of the amplifying circuit 42 can be easily adjusted by the simple circuit. Accordingly, even when an error occurs in a detection ratio of the zero phase current transformer 41, the gain of the amplifying circuit 42 is adjusted, thereby making it easy to set the total gain of the zero phase current transformer 41 and the amplifying circuit 42 to 1.

Moreover, there is no need to adjust the number of windings of the zero phase current transformer 41 at the time of adjusting the amplification factor. This allows the zero phase current transformer 41 to be miniaturized without increasing the number of winding numbers of the zero phase current transformer 41. Furthermore, there is no need to use the amplifying circuit 42 with high accuracy in an unadjusted state, resulting in a cost reduction.

Moreover, it is possible to use a method in which the leakage current that propagates in the power converting apparatus and the compensation current is supplied to the ground line based on the detected current. This makes it possible to miniaturize the noise filter section 1 and structure a filter with a large attenuation quantity.

In addition, the structure of the power converting apparatus of the first embodiment is not limited to the aforementioned structure.

For example, the main amplifier 42A can be used as the correction amplifier 42B. The main amplifier 42A is used as the correction amplifier 42B, thereby enabling to adjust the gain of the amplifying circuit 42 without providing a new amplifier.

Figure 6:
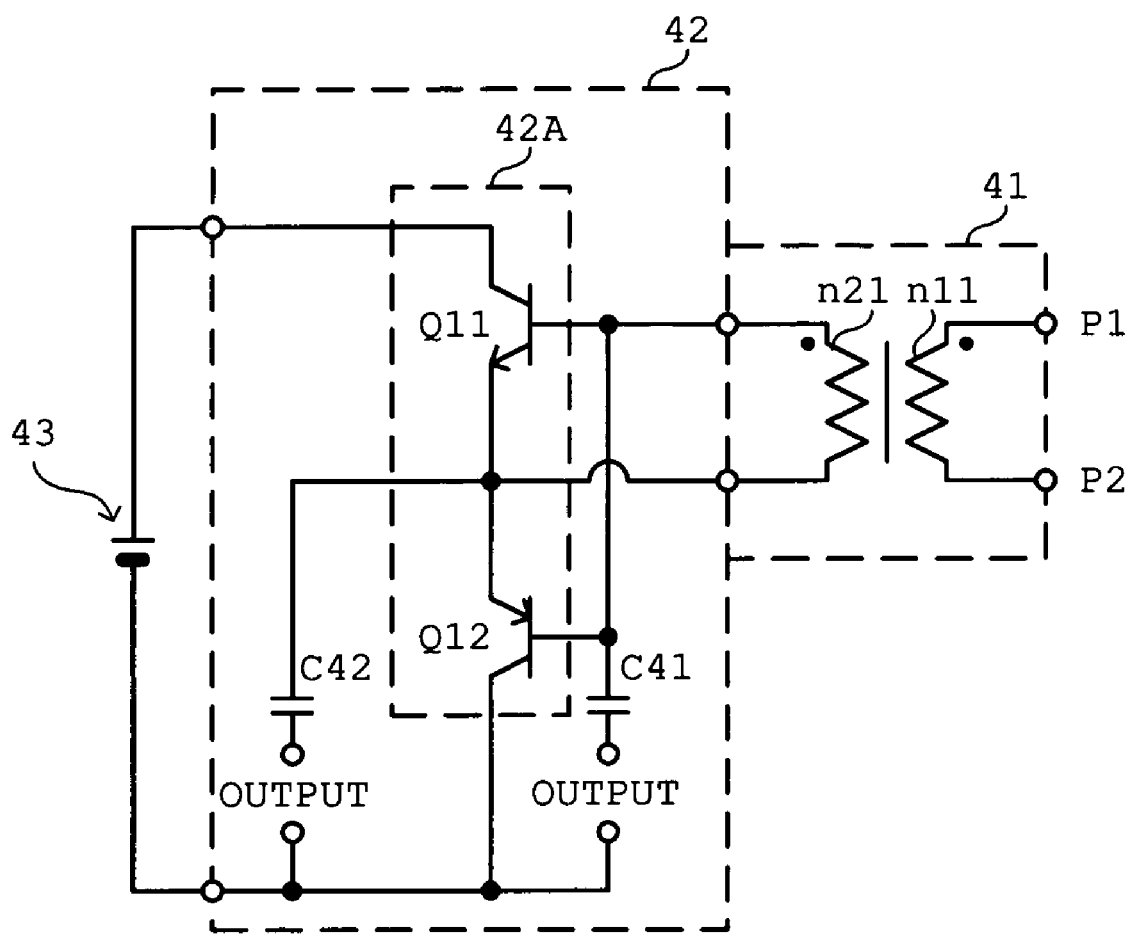
FIG. 6 is a circuit diagram illustrating the structure of an amplifying circuit in which a main amplifier is used as a correction amplifier.
Figure 7:
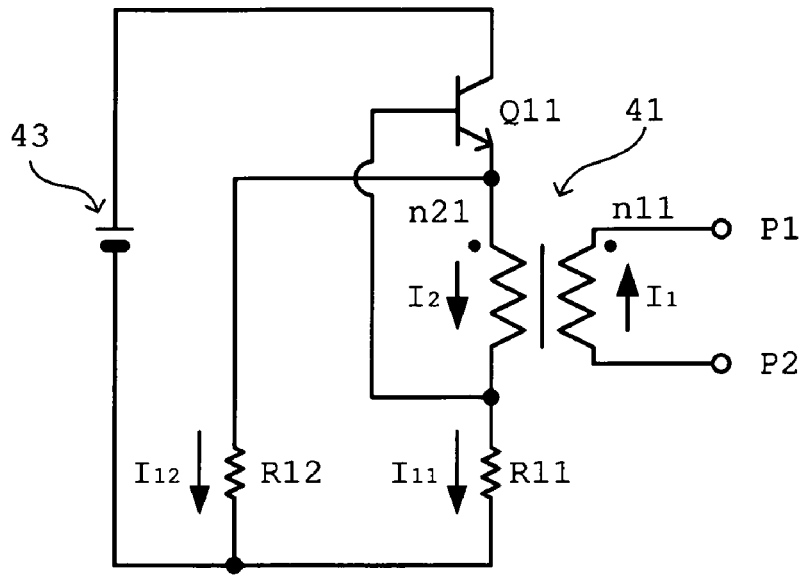
FIG. 7 is an explanatory view showing an amplification principle of the amplifying circuit of FIG. 6.

FIG. 6 is a circuit diagram illustrating the structure of the amplifying circuit 42 in which the main amplifier 42A is used as the correction amplifier 42B. FIG. 7 is a view explaining the operation principle of the main amplifier 42A of FIG. 6. In the main amplifier 42A of FIG. 6, the transistors Q11 and Q12 are used as the correction amplifier 42B.

In the main amplifier 42A of FIG. 6, the emitter potentials of the transistors Q11 and Q12 become substantially the same as the base voltage. Moreover, even if the current is supplied from the emitters of the transistors Q11 and Q12, substantially no influence is exerted onto the base side load. As paying attention to this point, it is shown from FIG. 7 that the relationship shown by the equation (6) is also satisfied in the amplifying circuit 42 of FIG. 6. Accordingly, it is possible to make the main amplifier 42A serve also as the correction amplifier 42B.

Figure 8:
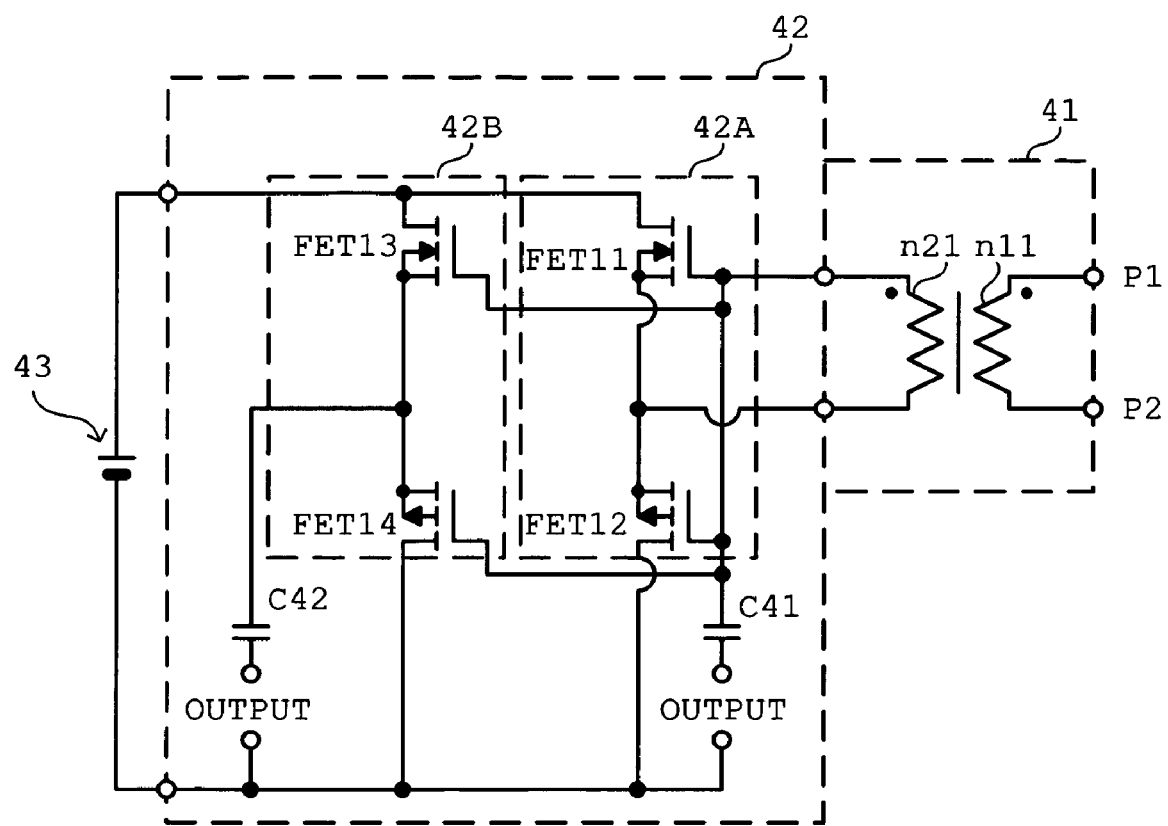
FIG. 8 is a circuit diagram illustrating the structure when FET is used in place of a transistor of the amplifying circuit shown in FIG. 3.
Figure 9:
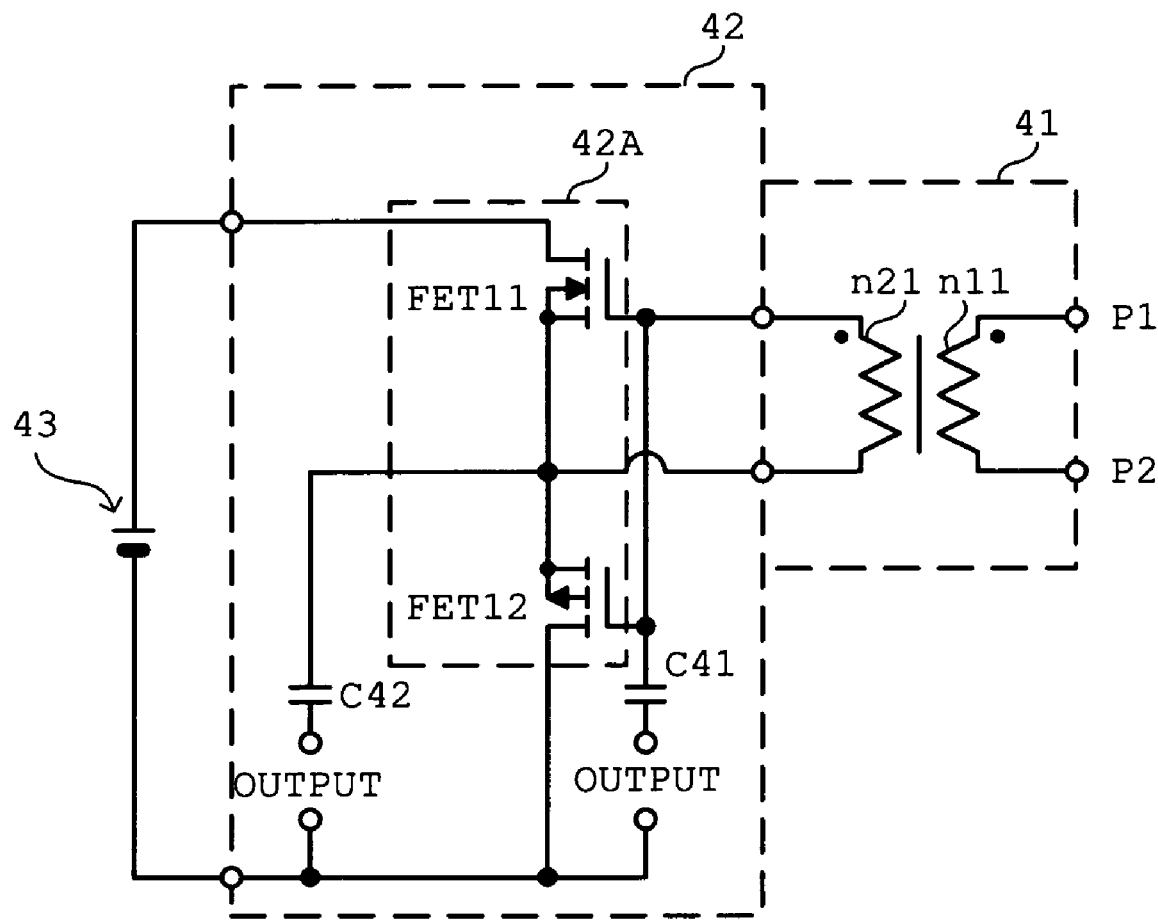
FIG. 9 is a circuit diagram illustrating the structure when FET is used in place of a transistor of the amplifying circuit shown in FIG. 6.

Moreover, as illustrated in FIG. 8, the amplifying circuit 42 can be structured by using field effect transistors FET 11, FET 12, FET 13 and FET 14 in place of the bipolar transistors Q11, Q12, Q13 and Q14 in the amplifying circuit 42 of FIG. 3, respectively. Furthermore, as illustrated in FIG. 9, the amplifying circuit 42 can be structured by using field effect transistors FET 11 and FET 12 in place of the bipolar transistors Q11 and Q12 in the amplifying circuit 42 of FIG. 6, respectively. When the field effect transistors are used, since the gate current becomes substantially zero, the amplifying circuit 42 with high performance can be structured as compared with the case that the bipolar transistors are used.

As explained above, according to the power converting apparatus of the first embodiment of the present invention, it is possible to easily adjust the amplification factor.

Second Embodiment

Figure 10:
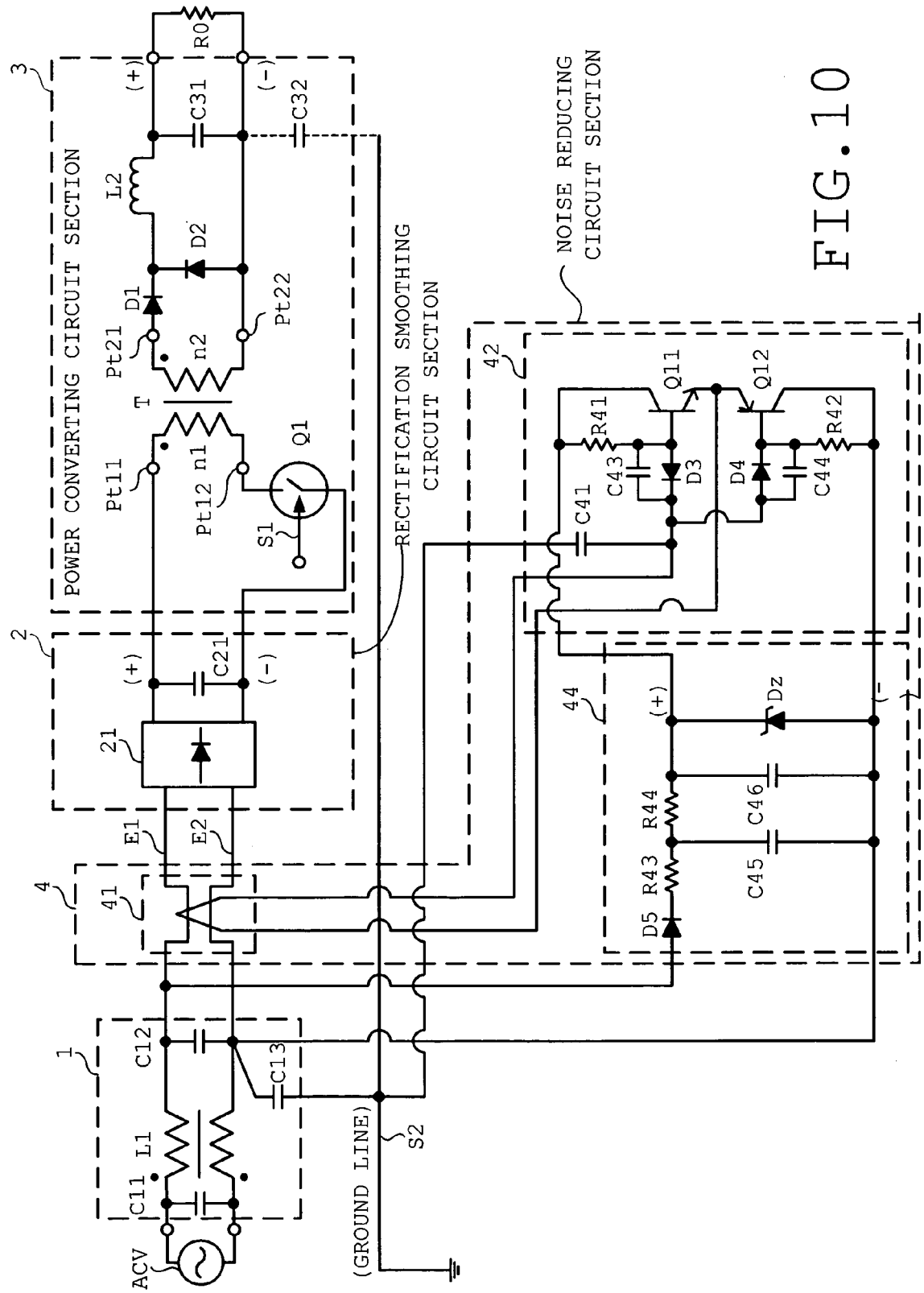
FIG. 10 is a circuit diagram of the structure of a power converting apparatus according to a second embodiment of the present invention.

An explanation will be next given of a power converting apparatus according to a second embodiment of the present invention. FIG. 10 is a block diagram illustrating the structure of a power converting apparatus according to the second embodiment of the present invention. As illustrated in the figure, the power converting apparatus includes the noise filter section 1, the rectification smoothing circuit section 2, the power converting circuit section 3, and the noise reducing circuit section 4.

The noise filter section 1 and the rectification smoothing circuit section 2 of FIG. 10 have substantially the same structure as the noise filter section 1 and the rectification smoothing circuit section 2 of FIG. 1 of the first embodiment. However, the noise filter section 1 of FIG. 10 is different from the structure of FIG. 1 in the point that no capacitor C14 is provided.

The power converting circuit section 3 of FIG. 10 forms a forward converter including a transformer T, a switching element Q1, diodes D1, D2, a choke coil L2, a capacitor C31, and a control section (not shown). The power converting circuit section 3 converts DC power generated by the rectification smoothing circuit section 2 into DC power with a predetermined voltage, and supplies the DC voltage to the load R0.

The transformer T has substantially the same structure as the structure of FIG. 1 except for the point that the primary winding n1 and the secondary winding n2 are wound such that the end Pt11 of the primary winding n1 and the end Pt21 of the secondary winding n2 have the same polarity as each other. The end Pt11 of the transformer T of FIG. 10 is connected to the positive pole of the output terminal of a rectifying circuit 21 of the rectification smoothing circuit section 2.

The switching element Q1 has substantially the same structure as the structure of FIG. 1. One end of the current path of the switching element Q1 is connected to the end Pt 12 of the primary winding n1, and the other end is connected to the negative pole of the output terminal of the rectifying circuit 21. Similar to the structure of FIG. 1, the switching element Q1 switches its current path according to a signal S1 supplied to its control terminal, thereby supplying power to the primary winding n1 intermittently to excite AC voltage to transmit power from the primary side of the transformer T to the secondary side.

The anode of the diode D1 of the structure of FIG. 10 is connected to one end Pt21 of the secondary winding n2, and the cathode is connected to one end of the choke coil L2. In the structure of FIG. 10, the diode D1 rectifies current flowing due to the voltage generated in the secondary winding n2 during the on-period of the switching element Q1.

The diode D2 is a diode that refluxes current, flowing due to the energy stored in the choke coil L2 during the on-period of the switching element Q1, to the capacitor C31 during the off-period. An anode of the diode D2 is connected to one end Pt22 of the secondary winding n2, and a cathode is connected to the cathode of the diode D1.

One end of the choke coil L2 is connected to each cathode of the diodes D1 and D2, and the other end is connected to the positive pole (+) of the output terminal of the power converting circuit section 3 as illustrated in the figure. In addition, the negative pole (−) of the output terminal of the power converting circuit section 3 is connected to one end Pt22 of the secondary winding n2.

The capacitor C31 is a capacitor that smoothes the current passed through the choke coil L2 to generate DC voltage, and is connected between the other end of the choke coil L2 and the end Pt22 of the secondary winding n2 of the transformer T. It should be noted that the choke coil L2 and the capacitor C31 form a low frequency LC filter.

Additionally, a stray capacity C32 is a stray capacity that exists between the negative pole (−) of the output terminal of the power converting circuit section 3 and the ground line.

The noise reducing circuit section 4 of FIG. 10 includes the zero phase current transformer 41, the amplifying circuit 42, and a constant voltage circuit 44.

The zero phase current transformer 41 in the structure of FIG. 10 has substantially the same structure shown in FIGS. 2A to 2C. However, the zero phase current transformer 41 in the structure of FIG. 10 is disposed between the noise filter section 1 and the rectification smoothing circuit section 2. Namely, the lines E1 and E2, which are respectively wound around a magnetic core 41A of the zero phase current transformer 41, form a pair of power lines where the common mode choke coil L1 is inserted. Namely, the lines E1 and E2 make one-to-one connection between a pair of ends of the common mode choke coils which form the choke coil L1 and which are not connected to the alternating current source ACV, and a pair of input terminals of the rectifying circuit 21.

In the structure of FIG. 10, when the leakage current flows into the lines E1 and E2, current imbalance occurs between the lines E1 and E2 to generate a current difference. The zero phase current transformer 41 detects the current difference to detect the leakage current.

The reason why the current difference between the lines E1 and E2 is generated by the leakage current is as follows. Specifically, when there is neither generation of noise nor presence of the stray capacity, current, each having an equal current value and an opposite direction, is supplied to each of the lines E1 and E2. However, when noise occurs, the generated noise is superimposed on the lines connected to the noise generating source and propagates in each line to cause current imbalance between the lines. Moreover, there is a case that the lines E1 and E2 have a stray capacity between the lines or between the lines and other conductor, and variations in the position of the stray capacity also causes the current imbalance between the lines. Then, the leakage current flows into the ground line via the capacitor C12 or C13, and current imbalance between the lines appears as the difference of current flowing into the lines E1 and E2.

The amplifying circuit 42 in the structure of FIG. 10 is one that amplifies an induced current 12 generated in the secondary winding n21 of the zero phase current transformer 41, and includes transistors Q11 and Q12, diodes D3 and D4, capacitors C41 and C42, and resistors R41 and R42. In addition, the amplifying circuit 42 is structured to obtain the amplification factor of 1 such that the current value of the compensation current becomes equal to the current value of the leakage current.

The transistor Q11 is formed of an NPN type bipolar transistor. The emitter of the transistor Q11 is connected to one end of the secondary winding n21 of the zero phase current transformer 41, and the collector of the transistor Q11 is connected to the positive pole (to be described later) of the constant voltage circuit 44.

The transistor Q12 is formed of a PNP-type bipolar transistor. The emitter of the transistor Q12 is connected to the emitter of the transistor Q11, and the collector of the transistor Q12 is connected to the negative pole of the constant voltage circuit 44 (and the line E2).

The diodes D3 and D4 are diodes that apply voltage, which corresponds to an emitter-base voltage of a bipolar transistor, between the emitter and the base of the transistor Q11 and between the emitter and the base of the transistor Q12, respectively. An anode of the diode D3 is connected to the base of the transistor Q11, and a cathode of the diode D3 is connected to the other end of the secondary winding n21 of the zero phase current transformer 41. An anode of the diode D4 is connected to the base of the transistor Q12, and a cathode of the diode D4 is connected to the other end of the secondary winding n21 of the zero phase current transformer 41.

The registers R41 and R42 are registers that restrict current flowing into the diodes D3 and D4. The register R41 is connected between the anode of the diode D3 and the positive pole of the constant voltage circuit 44. The register R42 is connected between the cathode of the diode D4 and the negative pole of the constant voltage circuit 44. In addition, the values of resistance of the registers R41 and R42 are set to be equal to each other in order to set a value of the neutral point of the amplifying circuit 42 to ½ of voltage applied to the amplifying circuit 42.

The capacitor C41 is a capacitor that supplies the compensation current to the ground line. The capacitor C41 is connected between a node, which is between the cathode of the diode D3 and the anode of the diode D4, and the ground line.

The capacitors C43 and C44 are capacitors that smooth noise components to suppress the influence of noise components. The capacitor C43 is connected between the base of the transistor Q11 and the other end of the secondary winding n22 of the zero phase current transformer 41, and the capacitor C44 is connected between the base of the transistor Q12 and the other end of the secondary winding n22 of the zero phase current transformer 41.

Additionally, in the power converting apparatus of FIG. 10, there is used a method in which the zero phase current transformer 41 is provided closer to the power converting circuit section 3 side than an injection point of a compensation current to detect a leakage current propagating in the power converting apparatus and supply the compensation current to the ground line based on the detected current. Accordingly, the injection point of the compensation current, namely, a node between the capacitor C41 and the ground line is provided closer to the alternating current source ACV side than the zero phase current transformer 41. More specifically, for example, as illustrated in the figure, one end of the capacitor C41 may be connected to a node between the capacitor C13 and the ground line.

The constant voltage circuit 44 is a DC power source circuit that supplies a constant voltage to the amplifying circuit 42. For example, as illustrated in the figure, the constant voltage circuit 44 includes a diode D5, capacitors C45 and C46, a Zener diode Dz, and resistors R43 and R44. Moreover, the constant voltage circuit 44 includes a positive pole (+) and a negative pole (−) of the output terminal.

The diode D5 is one that rectifies AC voltage supplied from the alternating current source ACV. An anode of the diode D5 is connected to the line E1, and a cathode of the diode D5 is connected to one end of the resistor R43.

The registers R43 and R44 are registers that restrict current flowing into the Zener diode. One end of the register R43 is connected to the cathode of the diode D5 as mentioned above, and the other end of the register R43 is connected to one end of the register R44. The other end of the register R44 is connected to the cathode of the Zener diode Dz.

The capacitors C45 and C46 are capacitors for smoothing. The capacitor C45 is connected between a node, which is between the registers R43 and R44, and the line E2. The capacitor C46 is connected between the cathode of the Zener diode Dz and the line E2.

The Zener diode Dz is a diode that generates DC constant voltage by clamping the voltage smoothed by the capacitor C46 by Zener voltage. An anode of the Zener diode Dz is connected to the line E2, and a cathode of the Zener diode Dz is connected to the other end of the register R44 as mentioned above. Moreover, the anode of the Zener diode Dz is connected to the negative pole of the output terminal of the constant voltage circuit 44, and the cathode of the Zener diode Dz is connected to the positive pole of the output terminal of the constant voltage circuit 44.

An operation of the power converting apparatus of FIG. 10 will be next explained with reference to FIGS. 11A to 11F. In the explanation given below, it is assumed that when the signal S1, which is applied to the control terminal of the switching element Q1 by the control section of the power converting circuit section 3, becomes high level, the switching element Q1 turns on and when the signal S1 becomes high level, the switching element Q1 turns off.

Figure 11:
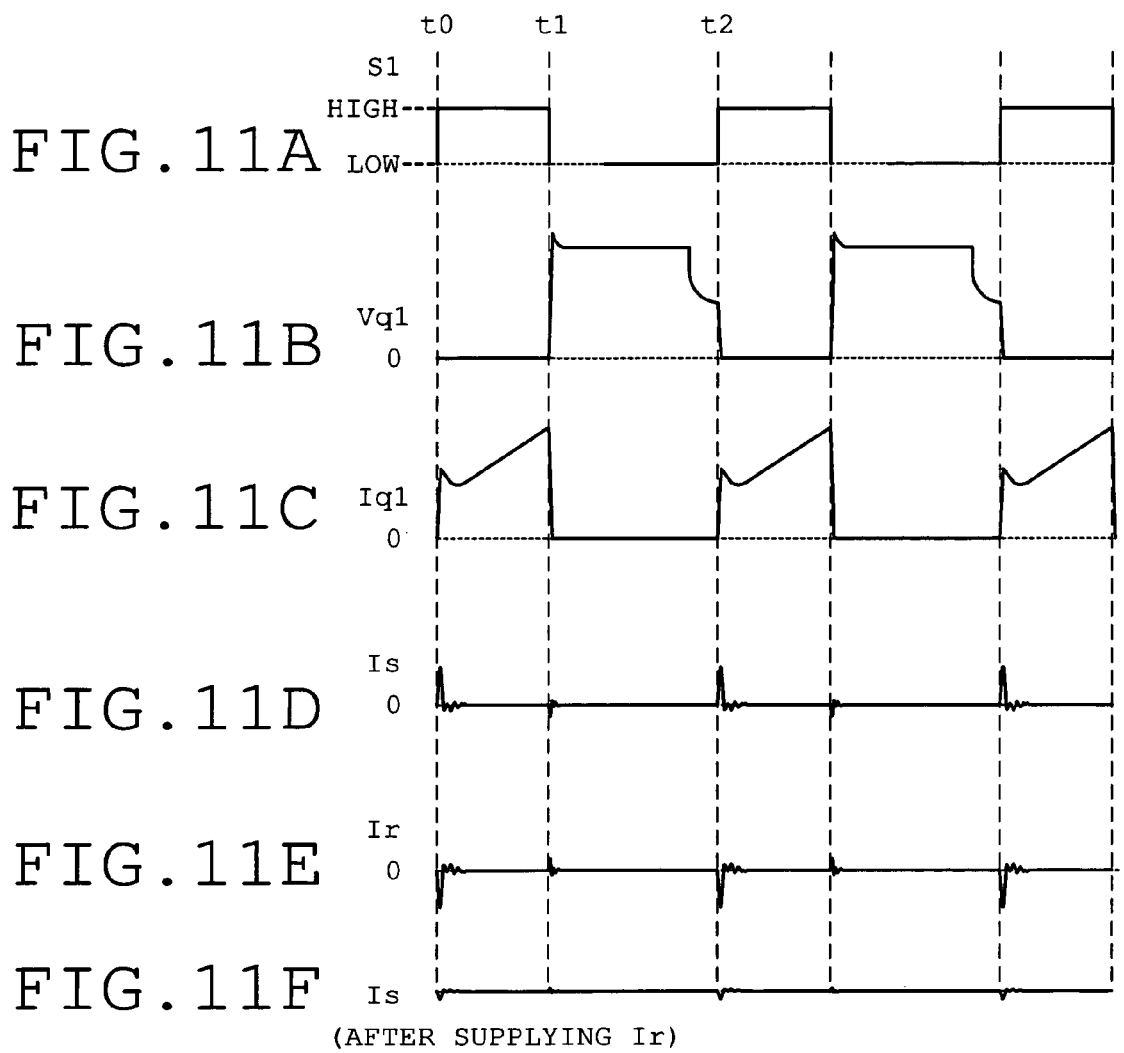
FIG. 11A to FIG. 11F are timing charts each illustrating an operation of the power converting apparatus of FIG. 10.

In this case, the control section of the power converting circuit section 3 supplies the signal S1 as illustrated in FIG. 11A to the control terminal of the switching element Q1, illustrated time to t0 time t1 become an on-period of the switching element Q1 and time t1 to time t2 become an off-period of the switching element Q1.

During the on-period, voltage Vq1 to be applied to the switching element Q1 becomes substantially 0 as illustrated in FIG. 11B, and current Iq1 having intensity as illustrated in FIG. 11C flows into the switching element Q1.

While, during the off-period, voltage Vq1 to be applied to the switching element Q1 becomes higher than charge voltage of the capacitor C21 as illustrated in FIG. 11B, and current Iq1 flowing into the switching element Q1 becomes substantially 0 as illustrated in FIG. 11C.

The diode D1 rectifies the current flowing due to the voltage generated in the secondary winding n2 during the on-period of switching element Q1. The diode D2 refluxes current, which flows into the choke coil L2, to the capacitor C31 and the load R0 during the off-period of the switching element Q1. Current flowing into the diode D1 or D2 is smoothed by the choke coil L2 and the capacitor C31 to generate DC voltage. The power converting circuit section 3 supplies the generated DC voltage to the load R0.

While, in the power converting apparatus of FIG. 10, a leakage current Is caused by switching the switching element Q1 flows into the ground line via the stray capacity C32 and so on. The leakage current Is has intensity, for example, as illustrated in FIG. 11D. Then, when imbalanced current flows into the lines E1 and E2, an induced current flows into the secondary winding n21 of the zero phase current transformer 41. Since the turn ratio between the primary winding n11 and the secondary winding n21 is 1, a current value of the induced current flowing into the secondary winding n21 becomes the same as the current value of the primary current.

In a positive half cycle of the induced current, the induced current divides and flows into the base of the transistors Q11 as a base current, so that the potentials of the emitter and base of the transistor Q11 increase. The amplification factor of the transistors Q11 is sufficiently larger than 1 and the amplification factor of the amplifying circuit 42 becomes 1, with the result that current having the same current value as the leakage current Is is generated by the amplifying circuit 42.

On the other hand, in a negative half cycle of the induced current, the transistor Q12 operates in the same way as the transistor Q11 in the positive half cycle to generate current having the same current value as the leakage current Is.

In the amplifying circuit 42 of FIG. 10, the operation of the transistors Q11 and that of the transistor Q12 are combined, so that a compensation current Ir having intensity as illustrated in, for example, FIG. 11E is generated.

Then, the amplifying circuit 42 of FIG. 10 supplies the compensation current Ir to the ground line via the capacitor C41 in the direction opposite to the leakage current Is. As a result, for example, as illustrated in FIG. 4F, the leakage current Is decreases. Accordingly, the power converting apparatus of FIG. 10 can decrease common mode noise.

Next, an operation of the amplifying circuit 42 of FIG. 10 will be specifically explained with reference to FIG. 12.

When the primary current I1 flows into the virtual primary winding n11 of the zero phase current transformer 41, current I2 is induced to the secondary winding n21 based on the primary current I1. In addition, the winding direction of the secondary winding n21 is set such that the current I2 is amplified and supplied to the ground line in a direction that cancels the leakage current.

By the constant voltage generated by the constant voltage circuit 44, current passes through the register R41, the diode D3, the diode D4, and the register R42 in order from the positive pole of the constant voltage circuit 44, and flows into the negative pole of the constant voltage circuit 44. The capacitor C43, which is connected to the diode D3 in parallel, and the capacitor C44, which is connected to the diode D4 in parallel, decrease the level of a high frequency noise component. For this reason, the current can be efficiently supplied to the bases of the transistors Q11 and Q12.

Then, the supply of the current generates a voltage drop, which corresponds to the base-emitter voltage of the transistor Q11, in the diodes D3 and D4. The voltage is applied to the base-emitter voltage of the transistor Q1 in the positive direction.

Moreover, output voltage Vct of the zero phase current transformer 41 can be expressed by the following equation (7):

$$Vct = Vbe - Vd \tag{7}$$

(where Vbe is a base-emitter voltage of the transistor Q11 and Vd is a forward voltage of the diode D3).

As is obvious from the equation (7), the output voltage Vct, which is induced to the secondary winding n21, may be substantially 0 in a state that voltage Vbe and voltage Vd are substantially equal to each other. For this reason, the number of the primary windings n11 and that of the second winding n21 of the zero phase current transformer 41 are reduced, and a core cross-sectional area of the magnetic core 41A is also reduced. Moreover, the capacitor C43 is connected to the diode D3 in parallel, so that loss of the base current to be supplied to the base of the transistor Q11 is small even if the frequency of the noise component is high.

Moreover, the registers R41 and R42 have resistance values equal to each other. For this reason, voltage at a neutral point of the amplifying circuit 42 becomes ½ of an input voltage to be applied to the amplifying circuit 42.

As explained above, the power converting apparatus of the second embodiment of the present invention generates voltage corresponding to the emitter-base voltages of the transistors Q11 and Q12 using the diodes D3, D4, and the like. Then, the power converting apparatus applies the generated voltage in a direction that cancels the emitter-base voltages of the transistors Q11 and Q12. For this reason, even if large voltage is not induced to the secondary winding n21 of the zero phase current transformer 41, a desired amount of compensation current can be generated. Accordingly, the number of the primary windings n11 and that of the second windings n21 can be reduced, and the core cross-sectional area of the magnetic core 41A can be also reduced. As a result, the zero phase current transformer 41 can be miniaturized.

Furthermore, the neutral point of the amplifying circuit 42 can be set to ½ of the input voltage to be applied to the amplifying circuit 42 by the resistors R41 and R42. For this reason, voltage at the neutral points of the transistors Q11 and Q12 is stabilized. Furthermore, the range of the input voltage by which the amplifying circuit 42 can normally control the compensation current is wide. Moreover, the amplification factor of the amplifying circuit 42 including the zero phase current transformer 41 can be easily set to 1. Furthermore, the zero phase current transformer 41 is provided closer to the power converting circuit section 3 than the injection point of the compensation current to detect the leakage current propagating in the power converting apparatus and supply the compensation current to the ground line based on the detected current. Accordingly, the leakage current can be efficiently reduced to eliminate the need of the large noise filter, making it possible to miniaturize the structure of the entire power converting apparatus. Moreover, since the amplification factor of the amplifying circuit 42 is small, the noise can be stably reduced.

In addition, the structure of the power converting apparatus of the second embodiment of the present invention is not limited to the above-mentioned structure.

Figure 12:
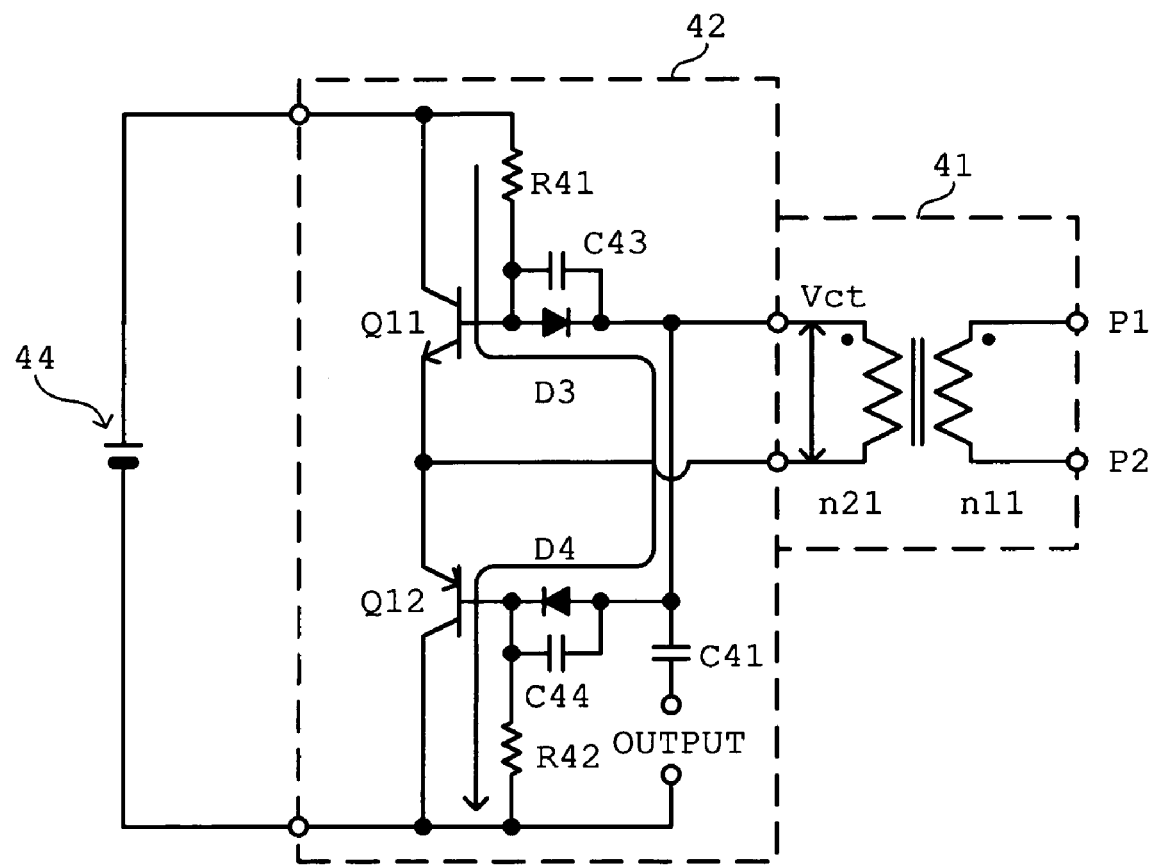
FIG. 12 is an explanatory view to explain an operation of a noise reducing circuit section of FIG. 10.
Figure 13:
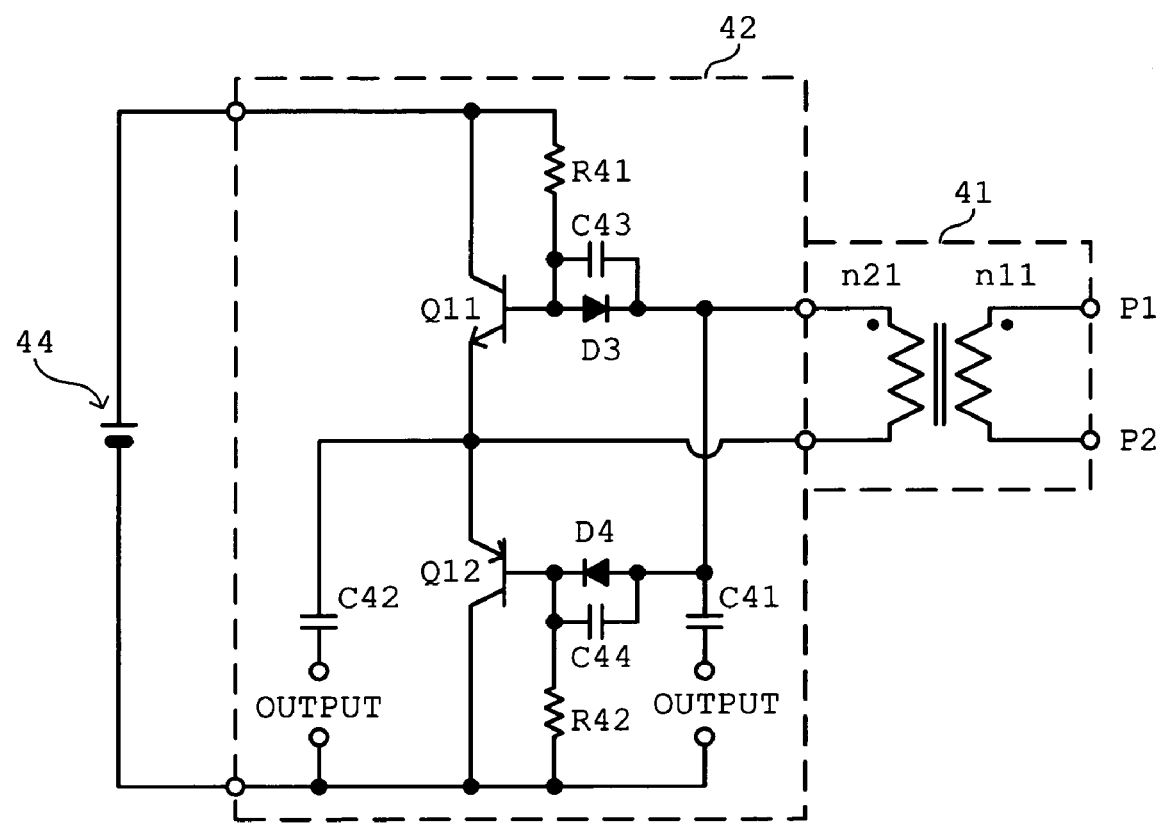
FIG. 13 is a circuit diagram illustrating an application circuit of a noise reducing circuit section.

For example, the amplifying circuit 42 of the power converting apparatus of FIG. 10 may have the structure illustrated in FIG. 13. The amplifying circuit 42 illustrated in FIG. 13 further includes the capacitor C42 in addition to the structure illustrated in FIGS. 10 and 12. One end of the capacitor C42 is connected to the node between the emitter of the transistor Q11 and the emitter of the transistor Q12.

The amplifying circuit 42 amplifies current flowing into the primary n1 of the zero phase current transformer 41 and outputs the obtained current to the capacitors C41 and C42 in parallel. A ratio between magnitude of the current output from the capacitor C41 and magnitude of the current output from the capacitor C42 is determined by an impedance ratio between the capacitors C41 and C42. When the impedance of the capacitor C41 and that of the capacitor C42 are set to r1 and r2, respectively, the gain of the amplifying circuit 42 results in {1+(r1/r2)}.

In the structure of FIG. 13, the impedance ratio between the capacitors C41 and C42 is adjusted, so that the magnification factor of the amplifying circuit 42 can be easily adjusted and the amplification factor of the entire system including the zero phase current transformer 41 can be easily set to 1 correctly.

Moreover, for example, the zero phase current transformer 41 may include two secondary windings. In this case, the amplifying circuit may have the structure as illustrated in, for example, FIG. 14.

Figure 14:
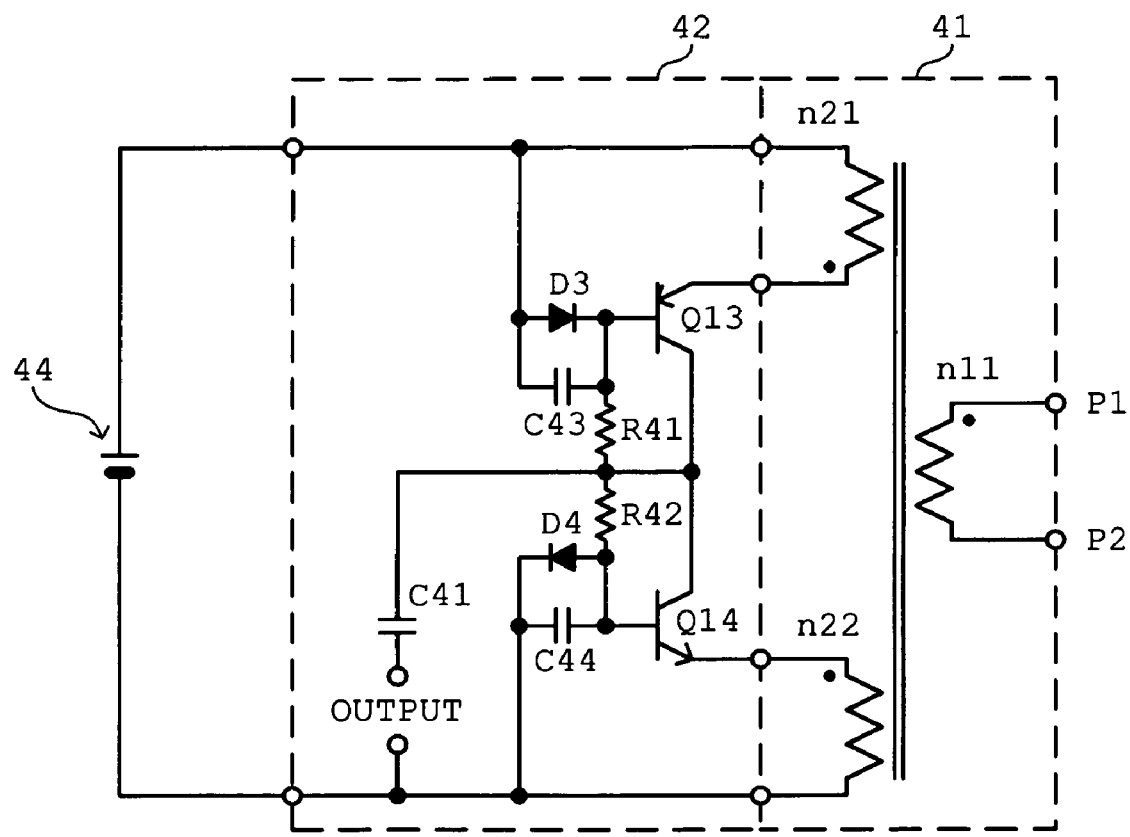
FIG. 14 is a circuit diagram illustrating an application circuit of the above noise reducing circuit section.

The amplifying circuit 42 of FIG. 14 includes a transistor Q13 having a PNP-type bipolar transistor and a transistor Q14 having an NPN-type bipolar transistor in place of the transistors Q11 and Q12, in addition to the diodes D3 and D4, the capacitors C41, C42 and C44, and the resistors R41 and R42. In addition, it is assumed that the zero phase current transformer 41 includes a secondary winding n22 in addition to the primary winding n21. The number of the primary windings n11, that of the secondary windings n21, and that of the secondary windings n22 are equal to one another.

In the structure illustrated in FIG. 14, one end of the secondary winding n21 of the zero phase current transformer 41 is connected to the positive pole of the constant voltage circuit 44, and one end of the secondary winding n22 is connected to the negative pole of the constant voltage circuit 44. However, it is assumed that when imbalanced current is supplied to the lines E1 and E2 (when it can be considered that current flows into the virtual primary winding n11), current having the same polarity is induced to one end of the secondary winding n21 and one end of the secondary winding n22, respectively. An emitter of the transistor Q13 is connected to the other end of the secondary winding n21, and an emitter of the transistor Q14 is connected to the other end of the secondary winding n22. A collector of the transistor Q13 and a collector of the transistor Q14 are connected to each other. A cathode of the diode D3 is connected to a base of the transistor Q13, and an anode of the diode D3 is connected to the positive pole of the constant voltage circuit 44. The resistor R41 is connected between the base and collector of the transistor Q13. The capacitor C41 is connected to a node between the collector of the transistor Q13 and the collector of the transistor Q14. The capacitor C43 is connected to the diode D3 in parallel. Moreover, an anode of the diode D4 is connected to a base of the transistor Q14, and a cathode of the diode D4 is connected to the negative pole of the constant voltage circuit 44. The resistor R42 is connected between the collector and base of the transistor Q14. The capacitor C44 is connected to the diode D4 in parallel.

When the amplifying circuit 42 has the structure illustrated in FIG. 14, potentials of the secondary windings n21 and n22 of the zero phase current transformer 41 are fixed. For this reason, even if the wiring between the zero phase current transformer 41 and the transistor Q13 or Q14 increases, influence of the stray capacity is small.

Figure 15:
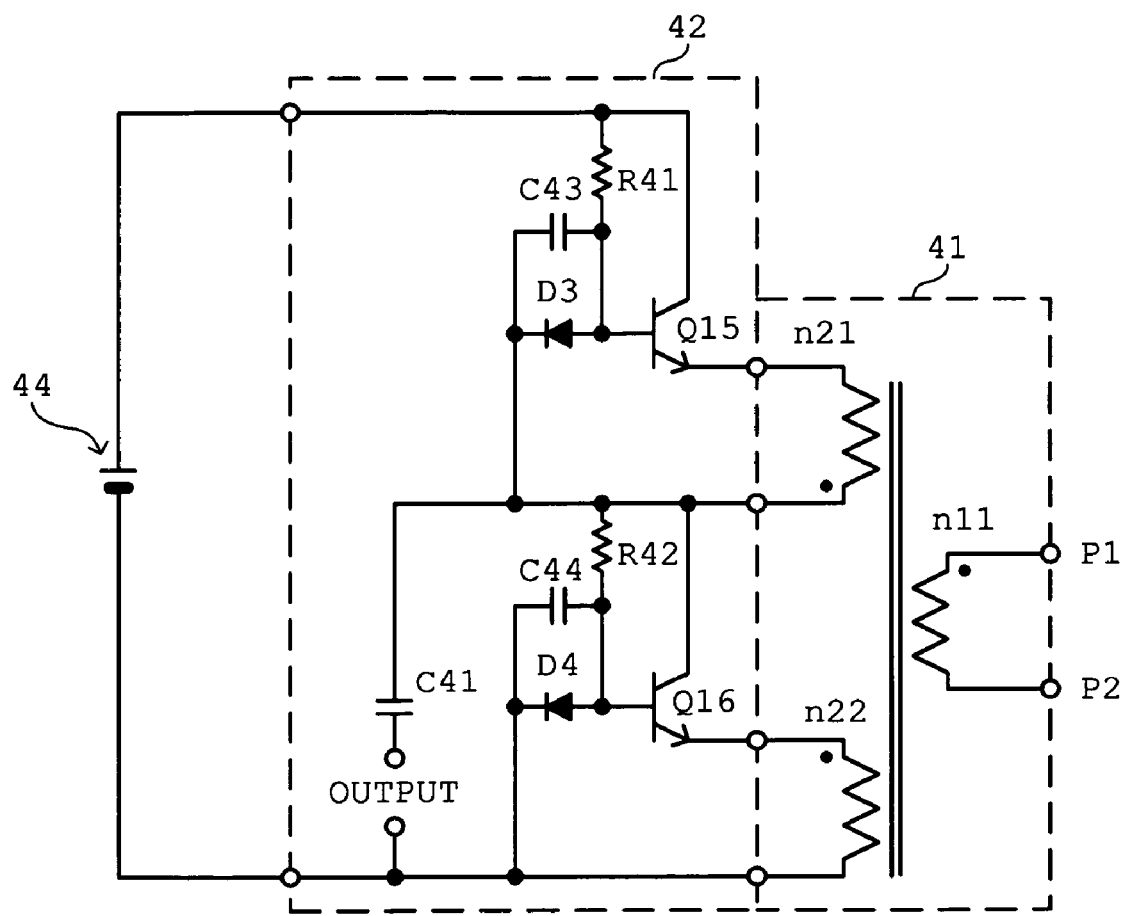
FIG. 15 is a circuit diagram illustrating an application circuit of the above noise reducing circuit section.

Moreover, when the zero phase current transformer 41 has two secondary windings, the amplifying circuit 42 may have the structure illustrated in, for example, FIG. 15 in place of the structure illustrated in FIG. 14.

The amplifying circuit 42 of FIG. 15 includes transistors Q15 and Q16 having NPN-type bipolar transistors in place of the transistors Q13 and Q14 in addition to the diodes D3 and D4, the capacitors C41, C43 and C44, and the resistors R41 and R42.

In the structure of FIG. 15, a collector of the transistor Q15 is connected to the positive pole of the constant voltage circuit 44. One end of the secondary winding n22 is connected to the negative pole of the constant voltage circuit 44. An emitter of the transistor Q15 is connected to one end of the secondary winding n21 of the zero phase current transformer 41, and a collector of the transistor Q16 is connected to the other end of the secondary winding n21 of the zero phase current transformer 41. An emitter of the transistor Q16 is connected to the other end of the secondary winding n22 of the zero phase current transformer 41. Additionally, even in the structure of FIG. 15, it is assumed that when imbalanced current is supplied to the lines E1 and E2, current having the same polarity is induced to one end of the secondary winding n21 and one end of the secondary winding n22. Moreover, in the structure of FIG. 15, an anode of the diode D3 is connected to a base of the transistor Q15, and the cathode of the diode D3 is connected to the other end of the secondary winding n21. The resistor R41 is connected between the base and collector of the transistor Q15. One end of the capacitor C41 is connected to the other end of the secondary winding n21. The capacitor C43 is connected to the diode D3 in parallel. Moreover, the anode of the diode D4 is connected to a base of the transistor Q16, and the cathode of the diode D4 is connected to the negative pole of the constant voltage circuit 44. The resistor R42 is connected between a collector and a base of the transistor Q16. The capacitor C44 is connected to the diode D4 in parallel.

The amplifying circuit 42 is structured as illustrated in FIG. 15, so that both two transistors that form the amplifying circuit 42 can use NPN-type bipolar transistors.

Figure 16:
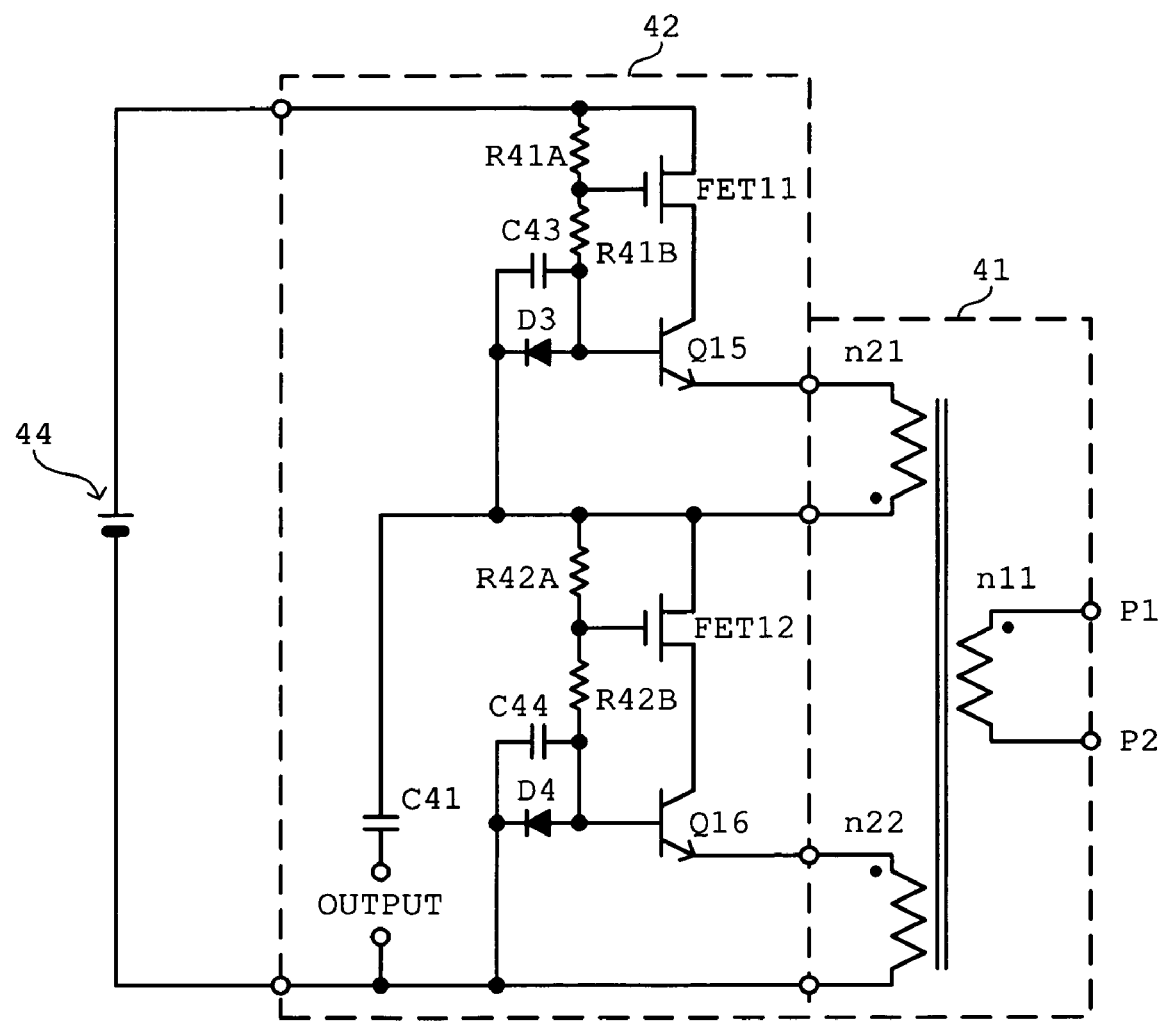
FIG. 16 is a circuit diagram illustrating an application circuit of the above noise reducing circuit section.

Moreover, the amplifying circuit 42 may have a structure illustrated in, for example, FIG. 16 in place of the structure illustrated in FIG. 15.

The structure of FIG. 16 is substantially the same as the structure of FIG. 15 except for the following points. Namely, FET 11 and FET 12 are further provided, the resistors R41A and R41B, which are connected to each other in cascade manner, are provided in place of the resistor R41, and the resistors R42A and R42B, which are connected to each other in cascade manner, are provided in place of the resistor R41A. It is assumed that each of FET 11 and FET 12 is formed of FET with high withstand voltage.

One end of the register R41A is connected to the positive pole of the constant voltage circuit 44, and the other end of the register R41A is connected to one end of the register R41B. The other end of the register R41B is connected to the base of the transistor Q15. One end of the resistor R42A is connected to the other end of the secondary winding n21, and the other end of the register R42A is connected to one end of the register R42B. The other end of the register R42B is connected to the base of the transistor Q16. The collector of the transistor Q15 is connected to one end of the current path having a source and a drain of FET 11 as both ends, instead of the point that the collector is connected to the positive pole of the constant voltage circuit 44. The other end of the current path of FET 11 is connected to the positive pole of the constant voltage circuit 44. The gate of FET 11 is connected to a node between the registers R41A and R41B. The collector of the transistor Q16 is connected to one end of the current path having a source and a drain of FET 12 as both ends, instead of the point that the collector is connected to the end of the secondary winding n21. The other end of the current path of FET 12 is connected to the other end of the secondary winding n21. The gate of FET 12 is connected to a node between the registers R42A and R42B. The relationship in connection among the capacitors C41, C43, C44 and the diodes D3 and D4 in the structure of FIG. 16 is the same as the relationship in connection in the structure of FIG. 15.

In a case where the amplifying circuit 42 is structured as illustrated in FIG. 16, if the amplifying circuit 42 uses the structure of FIG. 15, voltage to be applied to all of the transistors Q15 and Q16 is dispersed and applied to high-withstand-voltage FET 11 and FET 12. This protects the transistors Q15 and Q16 from overvoltage. Then, even if they are low-withstand-voltage transistors with a high amplification factor, they can be used as the transistors Q15 and Q16. Generally, since the amount of the gate current for FET is greatly small, the use of FET can be used under high voltage as maintaining the amplification factor to be substantially 1.

Figure 17:
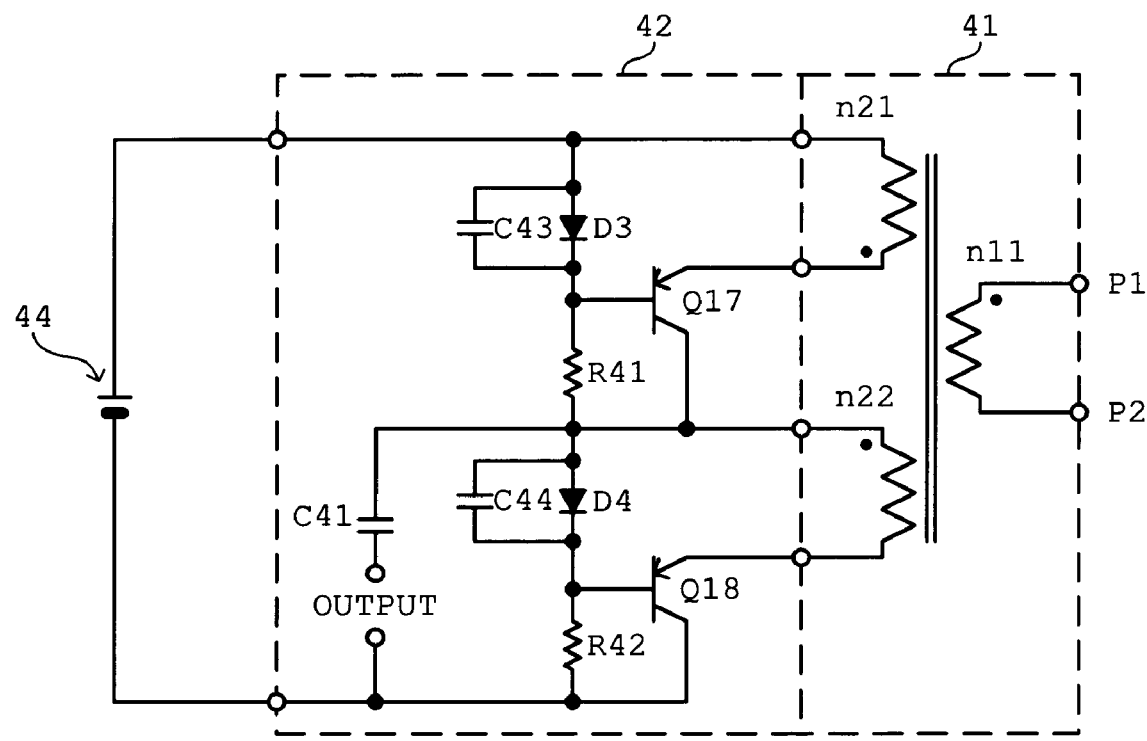
FIG. 17 is a circuit diagram illustrating an application circuit of the above noise reducing circuit section.

Moreover, when the zero phase current transformer 41 includes two secondary windings, the amplifying circuit 42 may have a structure illustrated in, for example, FIG. 17 in place of the structure illustrated in FIG. 15.

The amplifying circuit 42 of FIG. 17 includes transistors Q17 and Q18 comprising NPN-type bipolar transistors in place of the transistors Q15 and Q16 in addition to the diodes D3 and D4, the capacitors C41, C43 and C44, and the resistors R41 and R42.

In the structure of FIG. 17, one end of the secondary winding n21 is connected to the positive pole of the constant voltage circuit 44 and a collector of the transistor Q18 is connected to the negative pole of the constant voltage circuit 44. An emitter of the transistor Q18 is connected to one end of the secondary winding n22 of the zero phase current transformer 41, and a collector of the transistor Q17 is connected to the other end of the secondary winding n22 of the zero phase current transformer 41. An emitter of the transistor Q17 is connected to the other end of the secondary winding n21 of the zero phase current transformer 41. A cathode of the diode D3 is connected to a base of the transistor Q17, and an anode of the diode D3 is connected to the positive pole of the constant voltage circuit 44. The resistor R42 is connected between the base and collector of the transistor Q17. One end of the capacitor C41 is connected to the other end of the secondary winding n22. The capacitor C43 is connected to the diode D3 in parallel. Moreover, the cathode of the diode D4 is connected to a base of the transistor Q18, and the anode of the diode D4 is connected to the other end of the secondary winding n22. The resistor R42 is connected between a collector and a base of the transistor Q18. The capacitor C44 is connected to the diode D4 in parallel.

The amplifying circuit 42 is structured as illustrated in FIG. 17, so that both two transistors that form the amplifying circuit 42 can use PNP-type bipolar transistors.

Figure 18:
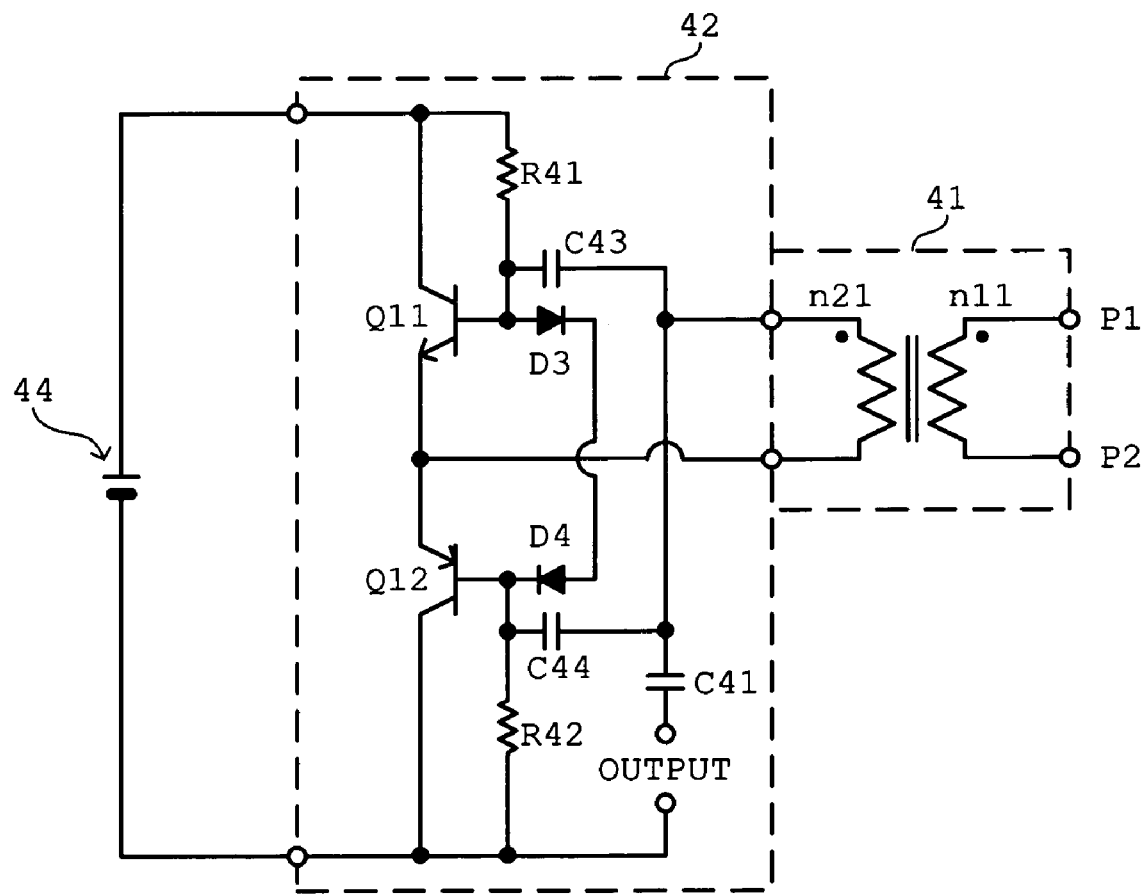
FIG. 18 is a circuit diagram illustrating an application circuit of the above noise reducing circuit section.

The structure of the amplifying circuit 42 of FIG. 10 or FIG. 12 is modified as illustrated in, for example, FIG. 18, so that shift of the neutral point of voltage caused by variations in the electrical characteristics of the transistors Q11 and Q12 may be reduced. The structure of the amplifying circuit 42 illustrated in FIG. 18 is substantially the same as the structure of FIG. 10 or FIG. 12 except for the following points. Namely, the cathode of the diode D3 and the anode of the diode D4 are connected to each other without being connected to the secondary winding n21 of the zero phase current transformer 41.

In the structure of FIG. 18, as long as the relationship shown in the following equation (8) is established between the emitter-base voltage of the transistor Q11 and the emitter-base voltage of the transistor Q12, the compensation current is normally generated.

$$Veb1 + Veb2 = 2 \cdot Vd \tag{8}$$

(where Veb1 is the emitter-base voltage of the transistor Q11 and Veb2 is the emitter-base voltage of the transistor Q12).

Accordingly, in the structure of FIG. 18, the emitter-base voltage of the transistor Q11 and the emitter-base voltage of the transistor Q12 are not always equal to Vd. Namely, it can be said that the conditions that the emitter-base voltage of the transistor Q11 and the emitter-base voltage of the transistor Q12 should satisfy are less severe than the conditions of the structure of FIG. 10 or FIG. 12. Generally, in the NPN transistors and PNP transistors, though the emitter-base voltage slightly differs, if the amplifying circuit 42 has the structure as illustrated in FIG. 18, influence that the difference between two emitter-base voltages exerts on the neutral point voltage can be reduced.

Figure 19:
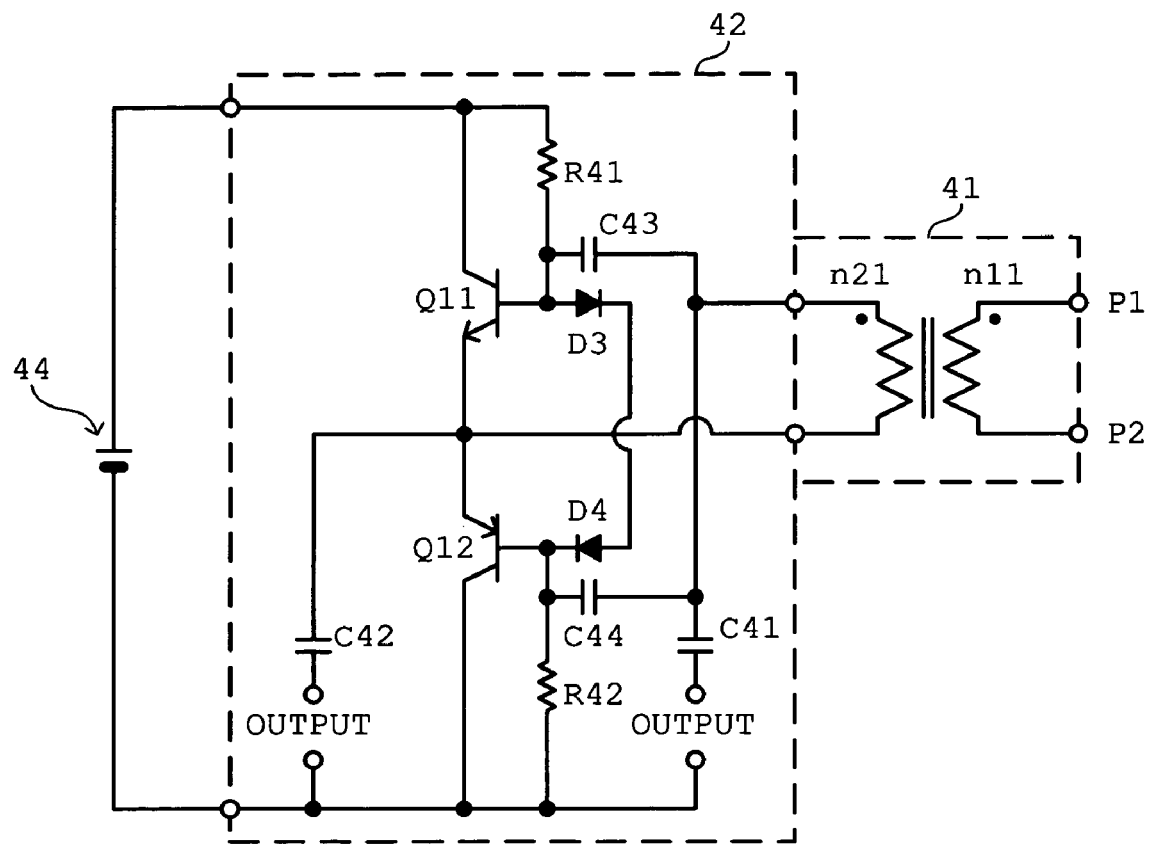
FIG. 19 is a circuit diagram illustrating an application circuit of the above noise reducing circuit section.

Additionally, the amplifying circuit 42 illustrated in FIG. 18 may further include the capacitor C42 as illustrated in FIG. 19, in addition to the structure illustrated in FIG. 18. One end of the capacitor C42 is connected to the node between the emitter of the transistor Q11 and the emitter of the transistor Q12, similar to the capacitor C42 in the structure of FIG. 13. In the structure of FIG. 19, similar to the structure of FIG. 13, the impedance ratio between the capacitors C41 and C42 is adjusted, so that the magnification factor of the amplifying circuit 42 can be easily adjusted and the amplification factor of the entire system including the zero phase current transformer 41 can be easily set to 1 correctly.

As explained above, according to the power converting apparatus of the second embodiment of the present invention, even if no voltage is induced to the secondary winding of the transformer, current can be made to flow. For this reason, the number of windings of the transformer can be reduced and the core cross-sectional area of the magnetic core of the transformer can be also reduced. As a result, the zero phase current transformer 41 can be miniaturized.

Third Embodiment

Figure 20:
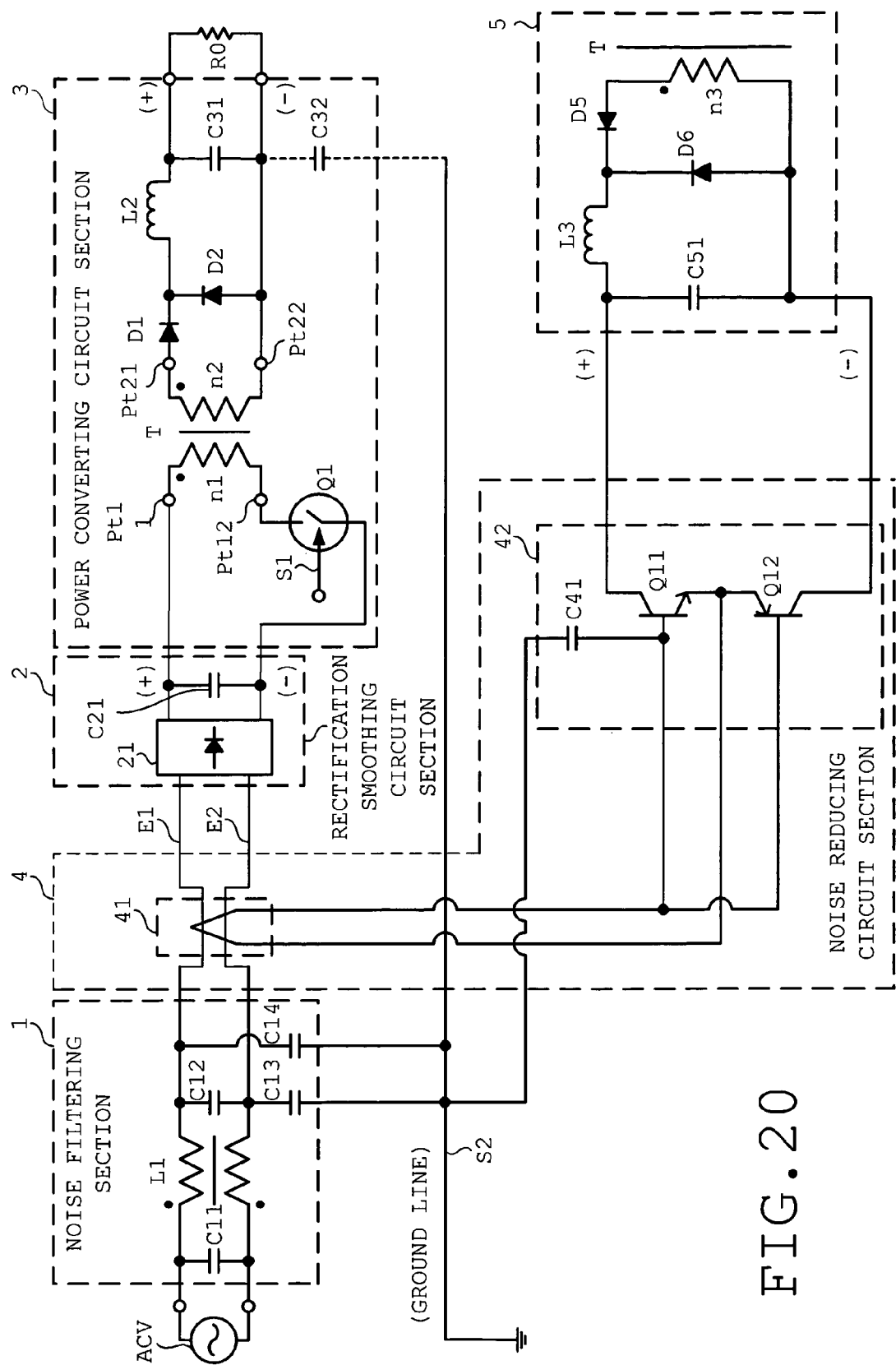
FIG. 20 is a circuit diagram of the structure of a power converting apparatus according to a third embodiment of the present invention.

An explanation will be next given of a power converting apparatus according to a third embodiment of the present invention. FIG. 20 is a block diagram illustrating the structure of a power converting apparatus according to the third embodiment of the present invention. As illustrated in the figure, the power converting apparatus includes the noise filter section 1, the rectification smoothing circuit section 2, the power converting circuit section 3, the noise reducing circuit section 4, and an auxiliary power source 5.

The noise filter section 1, the rectification smoothing circuit section 2 and the power converting circuit section 3 of FIG. 20 have substantially the same structure as the noise filter section 1, the rectification smoothing circuit section 2 and the power converting circuit section 3 of FIG. 10 of the second embodiment. However, similar to the noise filter section 1 of FIG. 1, the noise filter section 1 of FIG. 20 differs in the point that the capacitor C14 connected between the line E1 and the ground line is included. Moreover, the transformer T of the power converting circuit section 3 of FIG. 20 is different from the structure of FIG. 10 in the point that a third winding n3 is further included.

The noise reducing circuit section 4 in the structure of FIG. 20 includes the zero phase current transformer 41 and the amplifying circuit 42.

Figure 21:
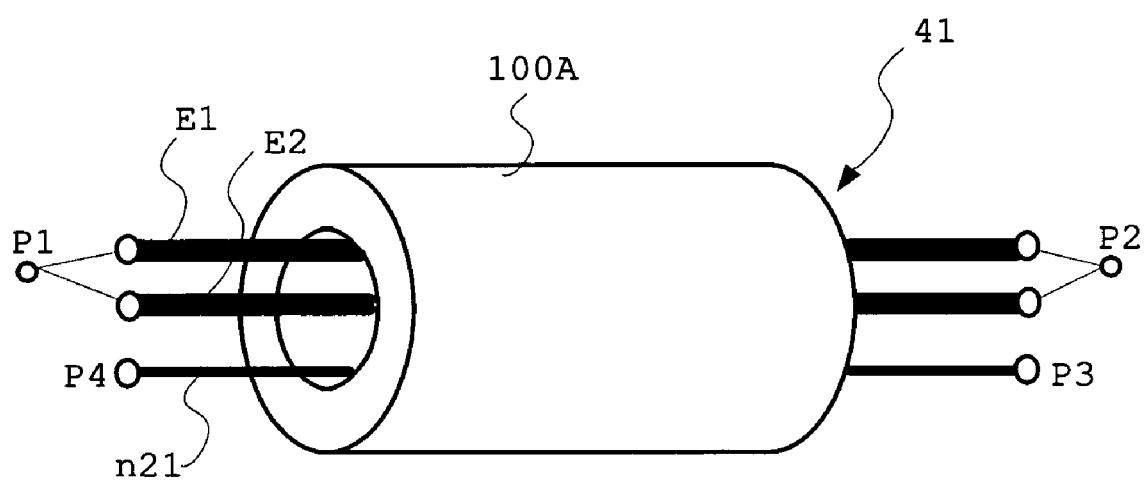
FIG. 21 is a view illustrating the structure of a zero phase current transformer of FIG. 20.

Among these, the zero phase current transformer 41 has the structure illustrated in, for example, FIG. 21. In other words, the zero phase current transformer 41 is structured by passing the lines E1 and E2 and the secondary winding n21 through a hole of a magnetic core 100A having a cylindrical shape as illustrated in the figure. Accordingly, the winding number of each of the lines E1 and E2 and the secondary winding n21 becomes 1. Moreover, the turn ratio between the virtual primary and secondary windings can be considered to be 1. The magnetic core 100A in the structure of FIG. 21 is desirably structured by material having magnetic permeability and a cross-sectional area to such an extent that no saturation occurs by a current difference between the lines E1 and E2 even if both the primary and secondary windings n11 and n21 have the winding number 1. The magnetic core 100A is structured by such material, thereby making it possible to use the zero phase current transformer 41 of FIG. 21 in the power converting apparatus for large power.

One end of the secondary winding n21 of the zero phase current transformer 41 of FIG. 21 is connected to each emitter of the transistors Q11 and Q12 (to be described later) of the amplifying circuit 42, and the other end of the secondary winding n21 is connected to each base of the transistors Q11 and Q12.

A principle in which the leakage current is cancelled by the compensation current will be next explained with reference to the equivalent circuit illustrated in FIG. 22.

Figure 22:
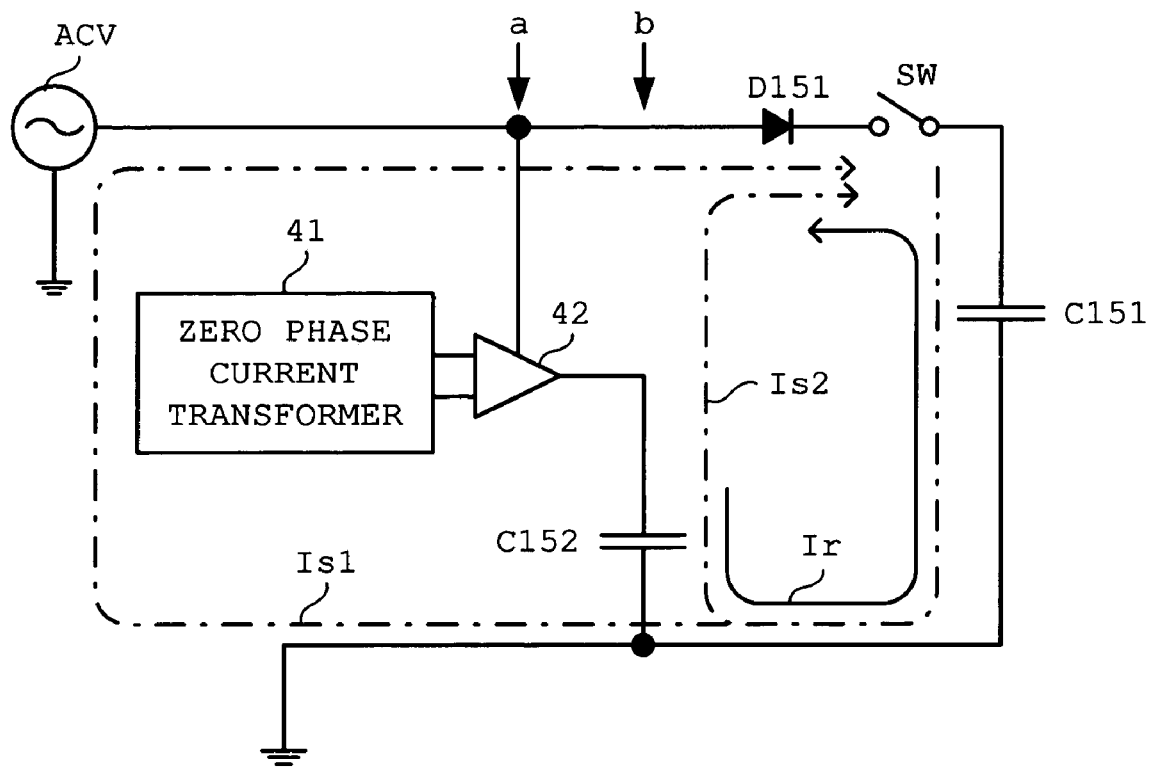
FIG. 22 is an explanatory view showing a principle of canceling a leakage current of FIG. 20.

In FIG. 22, a capacity C151 corresponds to a capacitance component of a load R0, and a capacity C152 corresponds to the capacitor C13 for common mode noise. Moreover, a diode D151 corresponds to the rectifying circuit 21, and a switch SW corresponds to a switching element Q1. An amplifier AMP corresponds to the amplifying circuit 42. Then, a leakage current Is1 indicates a leakage current flowing from the alternating current source ACV by switching the switch SW, and a leakage current Is2 indicates a leakage current propagating in the power converting apparatus.

The power converting apparatus supplies a compensation current Ir for canceling the leakage current detected by the zero phase current transformer 41 to the ground line at a point closer to the alternating current source ACV side than a point at which the zero phase current transformer 41 detects the leakage current. In other words, when the leakage current Is2 is detected at a detecting point b shown in FIG. 22 by the zero phase current transformer 41, the power converting apparatus injects the compensation current Ir to, for example, an injecting point a shown in FIG. 22.

When such a structure is made in order to cancel the leakage current Is1 by the compensation current Ir, it is assumed that an amplification factor A42 of the amplifying circuit AMP is set to satisfy the following equations (9) and (10):

$$is1-(A42 \cdot ir)=0 \quad (9)$$

$$ir=A42 \cdot is2 \quad (10)$$

As is shown by the above equations, the amplification factor A42 of the amplifying circuit AMP may be set to 1 in order to cancel the leakage current Is1 by the compensation current Ir, and the amplification factor A42 may be low, and such a disadvantage that the amplifying circuit oscillates does not occur. However, there is need to structure the amplifying circuit 42 such that the amplification factor reaches 1 correctly. When the amplifying circuit 42 is structured using an operational amplifier and the like such that the amplification factor reaches 1 correctly, the structure of the amplifying circuit 42 becomes complicated. According to the third embodiment of the present invention, the amplifying circuit 42 is structured such that the amplification factor reaches 1 with a simple structure.

The amplifying circuit 42 includes transistors Q11 and Q12 and capacitor C41.

The transistor Q11 includes an NPN-type bipolar transistor. The emitter of the transistor Q11 is connected to one end of the secondary n21 of the zero phase current transformer 41, and the collector of the transistor Q11 is connected to the positive pole (+) (to be described later) of the auxiliary power source 5. The transistor Q12 includes a PNP-type bipolar transistor. The emitter of the transistor Q12 is connected to the emitter of the transistor Q11, and the collector of the transistor Q12 is connected to the negative pole (−) of the auxiliary power source 5. Each of the emitters of the transistors Q11 and Q12 is connected to one end of the secondary winding n21 of the aforementioned zero phase current transformer 41, and each of the bases of the transistors Q11 and Q12 is connected to the other end of the secondary winding n21.

The capacitor C41 is a capacitor that supplies the compensation current to the ground line, and is connected between each of the bases of the transistors Q11 and Q12 and the ground line.

The auxiliary power source 5 is a DC power circuit that supplies a constant voltage to the amplifying circuit 42. The auxiliary power source 5 includes a third winding n3 of the transformer T, diodes D5 and D6, an inductor L3, and a capacitor C51, and further includes a positive pole (+) and a negative pole (−).

The diodes D5 and D6 are those that rectify current following due to voltage generated in the third winding n3. An anode of the diode D5 is connected to one end of the third winding n3, and a cathode of the diode D5 is connected to one end of an inductor L3. A cathode of the diode D6 is connected to the cathode of the diode D5 and an anode of the diode D6 is connected to the other end of the third winding n3.

The inductor L3 and the capacitor C51 smooth the current rectified by the diodes D5 and D6. One end of the inductor L3 is connected to each cathode of the diodes D5 and D6, and the other end of the inductor L3 is connected to the positive pole (+) of the auxiliary power source.

One end of the capacitor C51 is connected to the other end of the inductor L3, and the other end of the capacitor C51 is connected to the other end of the third winding n3. Then, the other end of the third winding n3 is connected to the negative pole (−) of the auxiliary power source 5.

In this way, the auxiliary power source 5 is structured to extract power, which is supplied to the amplifying circuit 42, from the section other than the rectification smoothing circuit section 2 in order to reduce influence from the rectification smoothing circuit section 2.

Next, an operation of the power converting apparatus of FIG. 20 will be next explained with reference to FIGS. 23A to 23F. Additionally, in the explanation given below, it is assumed that the switching element Q1 turns on when a signal S1, which the control section of the power converting circuit section 3 supplies to the control terminal of the switching element Q1, becomes high level, and the switching element Q1 turns off when the signal S1 becomes low level.

In this case, when the control section of the power converting circuit section 3 supplies the signal S1 shown in FIG. 23A to the control terminal of the switching element Q1, illustrated time t1 to time t1 become an on-period of the switching element Q1 and time t1 to time t2 become an off-period of the switching element Q1.

During the on-period, as illustrated in FIG. 23B, voltage Vq1 to be applied to the switching element Q1 becomes substantially 0, and current Iq1 having intensity as illustrated in FIG. 23C flows into the switching element Q1.

On the other hand, during the off-period, as illustrated in FIG. 23B, voltage Vq1 to be applied to the switching element Q1 becomes higher than charge voltage of the capacitor C21 and current Iq1 flowing into the switch element Q1 becomes substantially 0 as illustrated in FIG. 23C.

The diode D1 rectifies the current following due to voltage generated in the secondary winding n2 during the on-period of the switching element Q1. The diode D2 refluxes current flowing into the choke coil L2 to the capacitor C31 and the load R0 during the off-period of the switching element Q1. Current flowing into the diodes D1 or D2 is smoothed by the choke coil L2 and the capacitor C31, so that DC voltage is generated. The power converting circuit section 3 supplies the generated DC voltage to the load R0.

While, in the power converting apparatus of FIG. 20, a leakage current Is caused by switching the switching element Q1 flows into the ground line via the stray capacity C32 and so on. The leakage current Is has intensity, for example, as illustrated in FIG. 23D. Then, when imbalanced current flows into the lines E1 and E2, an induced current flows into the secondary winding n12 of the zero phase current transformer 41. Since the turn ratio between the primary winding n11 and the secondary winding n21 is 1, a current value of the induced current flowing into the secondary winding n21 becomes the same as the current value of the primary current. Accordingly, for example, when a difference of current I1 flowing into the lines E1 and E2 (namely, current flowing into the virtual primary winding n11) has a waveform shown in FIG. 24A, the waveform of the induced current flowing into the secondary winding n12 becomes the waveform shown in FIG. 24B.

In a positive half cycle of the induced current, the induced current divides and flows into the base of the transistors Q11 as a base current, so that the potentials of the emitter and base of the transistor Q11 increase. The amplification factor of the transistors Q11 is sufficiently larger than 1 and the amplification factor of the amplifying circuit 42 is set to 1, with the result that the transistor Q11 generates current Iq11 having the same current value as the leakage current Is with the waveform shown in FIG. 24C.

Figures 24A, 24B, 24C, 24D, 24E:
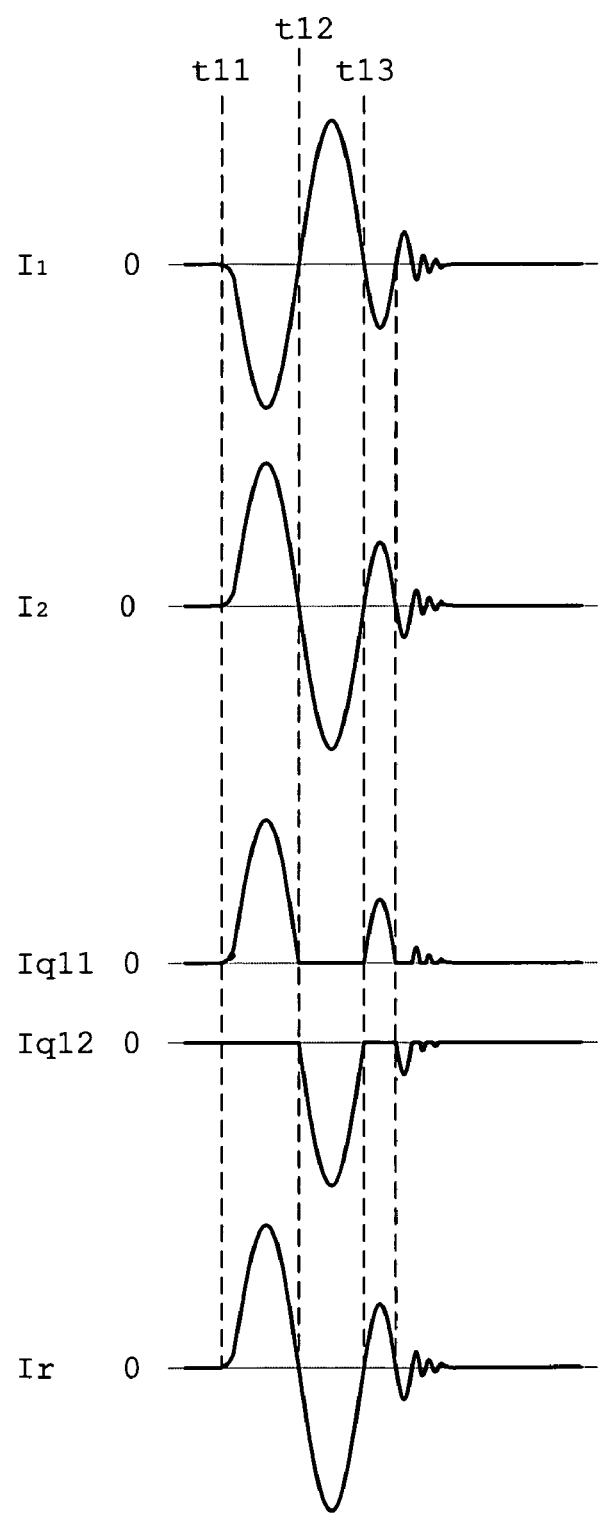

On the other hand, in the negative half cycle of the induced current, the transistor Q12 operates in the same way as the transistor Q11 in the positive half cycle and generates current Iq12 having the same current value as the leakage current Is with the waveform shown in FIG. 24D.

The amplifying circuit 42 of FIG. 20 generates a compensation current Ir having intensity as shown in, for example, FIG. 23E or FIG. 24E by combining the aforementioned operation of the transistor Q11 and the aforementioned operation of the transistor Q12.

Then, the amplifying circuit 42 of FIG. 20 supplies the compensation current Ir to the ground line via the capacitor C41 in the direction opposite to the leakage current Is. As a result, for example, as illustrated in FIG. 23F, the leakage current Is decreases.

Accordingly, the power converting apparatus of FIG. 20 can decrease common mode noise. In the structure of FIG. 20, the magnetic core 100A of the zero phase current transformer 41 was cylindrically shaped, and the lines E1 and E2 forming the pair of primary winding and the secondary winding n21 were passed through the hole of the magnetic core 100A. Accordingly, the structure of the zero phase current transformer 41 is simplified to make it possible to miniaturize the zero phase current transformer 41.

Moreover, the number of each of the windings of the zero phase current transformer 41 is 1 and is not wound around the magnetic core 100A. Even when a lead with a large diameter such as power line for large power is used as a winding of the zero phase current transformer 41, it is easy to pass the lead through the hole of the magnetic core 100A without being wound around the magnetic core 100A. Accordingly, this zero phase current transformer 41 can be used in the power converting apparatus that performs large current conversion.

Furthermore, even in this power converting apparatus, the zero phase current transformer 41 detects the leakage current propagating in the power converting apparatus and generates a compensation current for canceling the leakage current, and supplies the compensation current to a portion of the alternating current source ACV side instead of a point where the zero phase current transformer 41 detects the leakage current in connection with the ground lines. Accordingly, the gain of the amplifying circuit 42 can be decreased to lessen the danger of oscillation, so that noise is stably reduced. Moreover, the gain of the entire circuit including the amplifying circuit 42 is set to 1 to improve the frequency characteristic of the circuit, so that noise can be reduced up to the high frequency area and the amplifying circuit 42 can be easily structured with a simple circuit.

Furthermore, since the leakage current can be efficiently reduced, the noise filter section 1 does not have to have high performance. This eliminates the need for using the high performance noise filter, which generally has a tendency to increase in size, thereby making it possible to miniaturize the entire power converting apparatus.

Additionally, the structure of the power converting apparatus of the third embedment of the present invention is not limited to the above structure.

Figure 25:
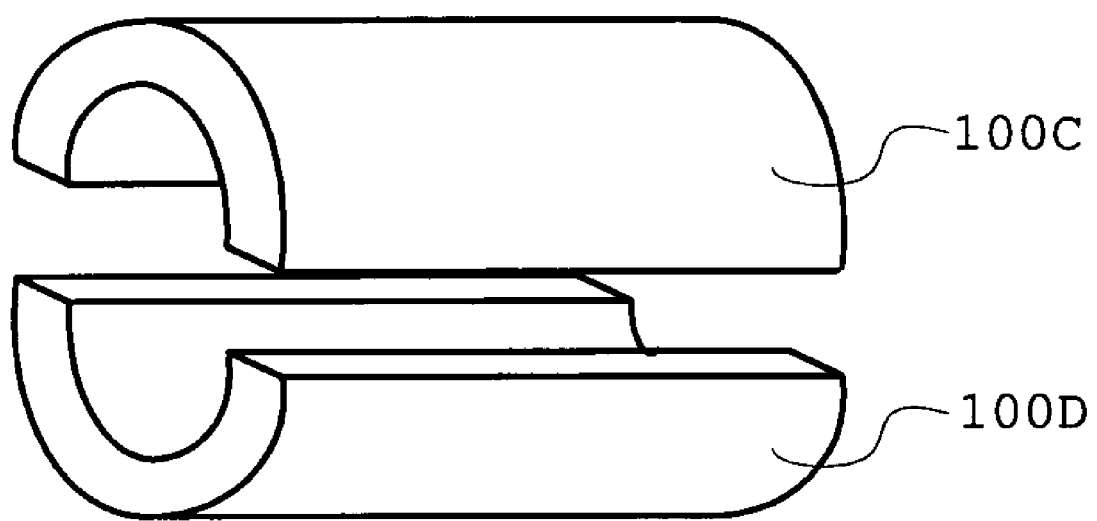
FIG. 25 is a view illustrating another structure of zero of a phase current transformer.

For example, the shape of the magnetic core 100A is not limited to the cylindrical shape. A can type with a cross-sectional shape, which is perpendicular to the axis, being an arbitrary polygon may be used. Moreover, for example, as illustrated in FIG. 25, the magnetic core 100A may be structured in such a way that two semi-cylindrical split cores 100C and 100D are used to establish contact between the ends of the split cores 100C and 100D. In a case where the magnetic core 100A has such a shape that can be divided into the split core 100C and 100D, the magnetic core 100A is divided into the split core 100C and 100D and recombined with each other, thereby making it possible to pass the lines E1, E2 and the secondary winding n21 through the magnetic core 100A without cutting the lines E1, E2 or the secondary winding n21.

Moreover, the zero phase current transformer 41 of the third embodiment of the present invention may have the structure as illustrated in FIG. 1 or FIGS. 2A to 2C.

Furthermore, in the power converting apparatus of the third embodiment of the present invention, the zero phase current transformer 41 may include two secondary windings. In this case, the amplifying circuit 42 may have the structure as illustrated in, for example, FIG. 26.

Figure 26:
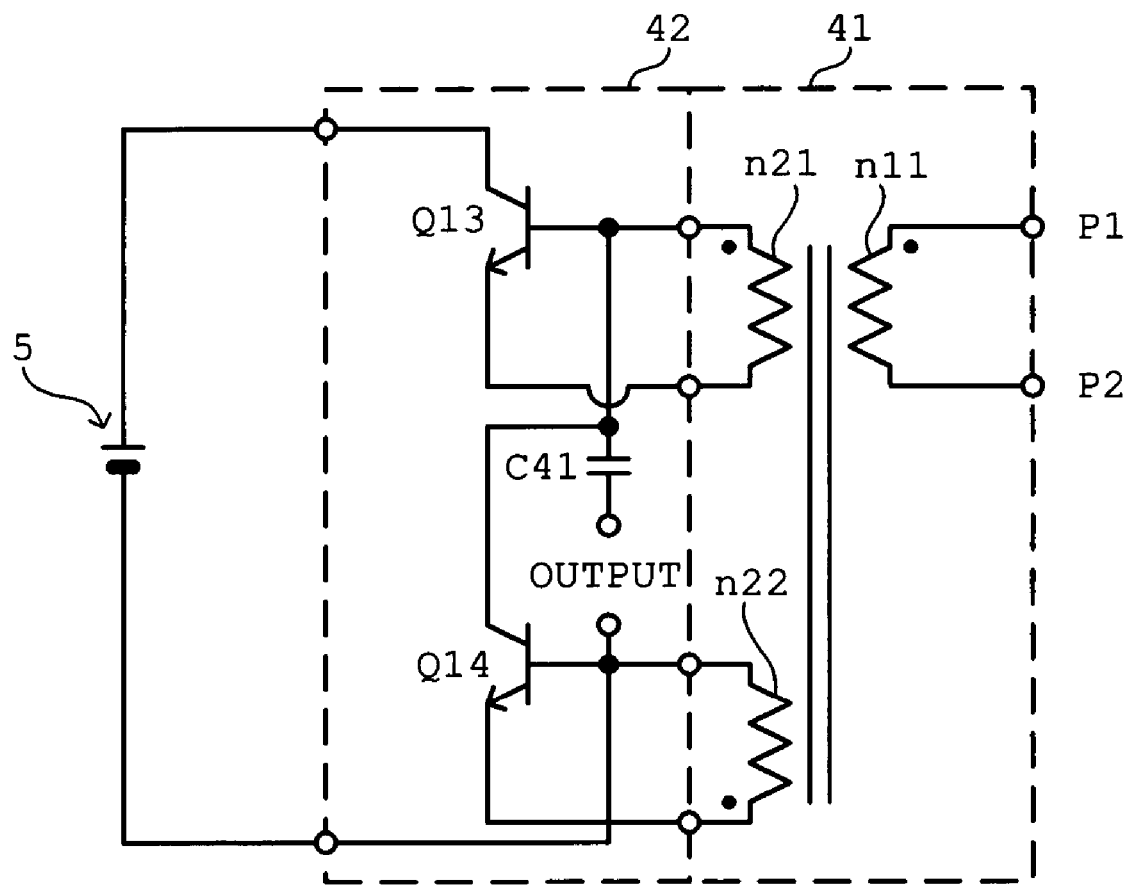
FIG. 26 is a circuit diagram illustrating an application example of an amplifying circuit having two secondary windings of a zero phase current transformer.

The amplifying circuit 42 of FIG. 26 includes transistors Q13 and Q14 having NPN-type bipolar transistors, in addition to the capacitor C41. In this case, it is assumed that the zero phase current transformer 41 includes the second secondary winding n22 in addition to the first secondary winding n21.

In the structure illustrated in FIG. 26, one end of the secondary winding n21 of the zero phase current transformer 41 is connected to the emitter of the transistor Q13, and the other end of the secondary winding n21 is connected to the base of the transistor Q13. Moreover, one end of the secondary winding n22 is connected to the base of the transistor Q14 and the other end of the secondary winding n22 is connected to the emitter of the transistor Q14. It should be noted that when an imbalance current flows into the lines E1 and E2 (namely, when it can be considered that current flows into the virtual primary winding n11), it is assumed that current having the same polarity is induced to one end of the secondary winding n21 and one end of the secondary winding n22. Furthermore, the collector of the transistor Q13 is connected to the positive pole of the auxiliary power source 5 and the base of the transistor Q14 is connected to the negative pole of the auxiliary power source 5. The base of the transistor Q13 is connected to the collector of the transistor Q14 and one end of the capacitor C41. In addition, the other end of the capacitor C41 is connected to the ground line S2 as illustrated in, for example, FIG. 20.

Figure 27:
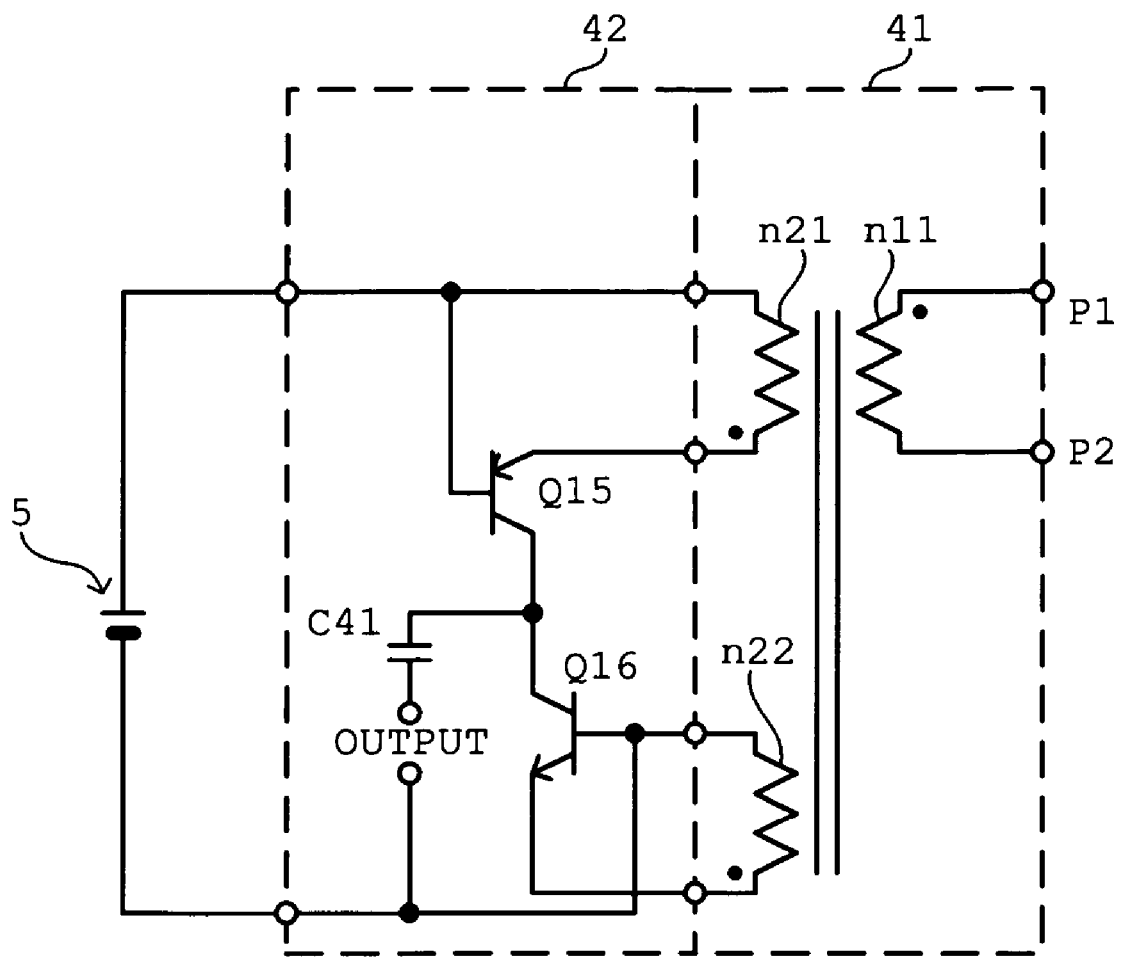
FIG. 27 is a circuit diagram illustrating another application example of an amplifying circuit having two secondary windings of a zero phase current transformer.

Moreover, when the zero phase current transformer 41 includes two secondary windings n21 and n22, the amplifying circuit 42 of the third embodiment may have the structure as illustrated in FIG. 27. The amplifying circuit 42 of FIG. 27 includes a transistor Q15 having a PNP-type bipolar transistor and a transistor Q16 having an NPN-type bipolar transistor in addition to the capacitor C41.

In the structure illustrated in FIG. 27, one end of the secondary winding n21 is connected to the base of the transistor Q15, and the other end of the secondary winding n21 is connected to the emitter of the transistor Q15. Moreover, one end of the secondary winding n22 is connected to the base of the transistor Q16, and the other end of the secondary winding n22 is connected to the emitter of the transistor Q16. It should be noted that when an imbalance current flows into the lines E1 and E2, it is assumed that current having the same polarity is induced to one end of the secondary winding n21 and one end of the secondary winding n22. Furthermore, the base of the transistor Q15 is connected to the positive pole of the auxiliary power source 5 and the base of the transistor Q16 is connected to the negative pole of the auxiliary power source 5. The collector of the transistor Q15 is connected to the collector of the transistor Q16 and one end of the capacitor C41. In addition, the other end of the capacitor C41 is connected to the ground line S2 as illustrated in, for example, FIG. 20.

Figure 28:
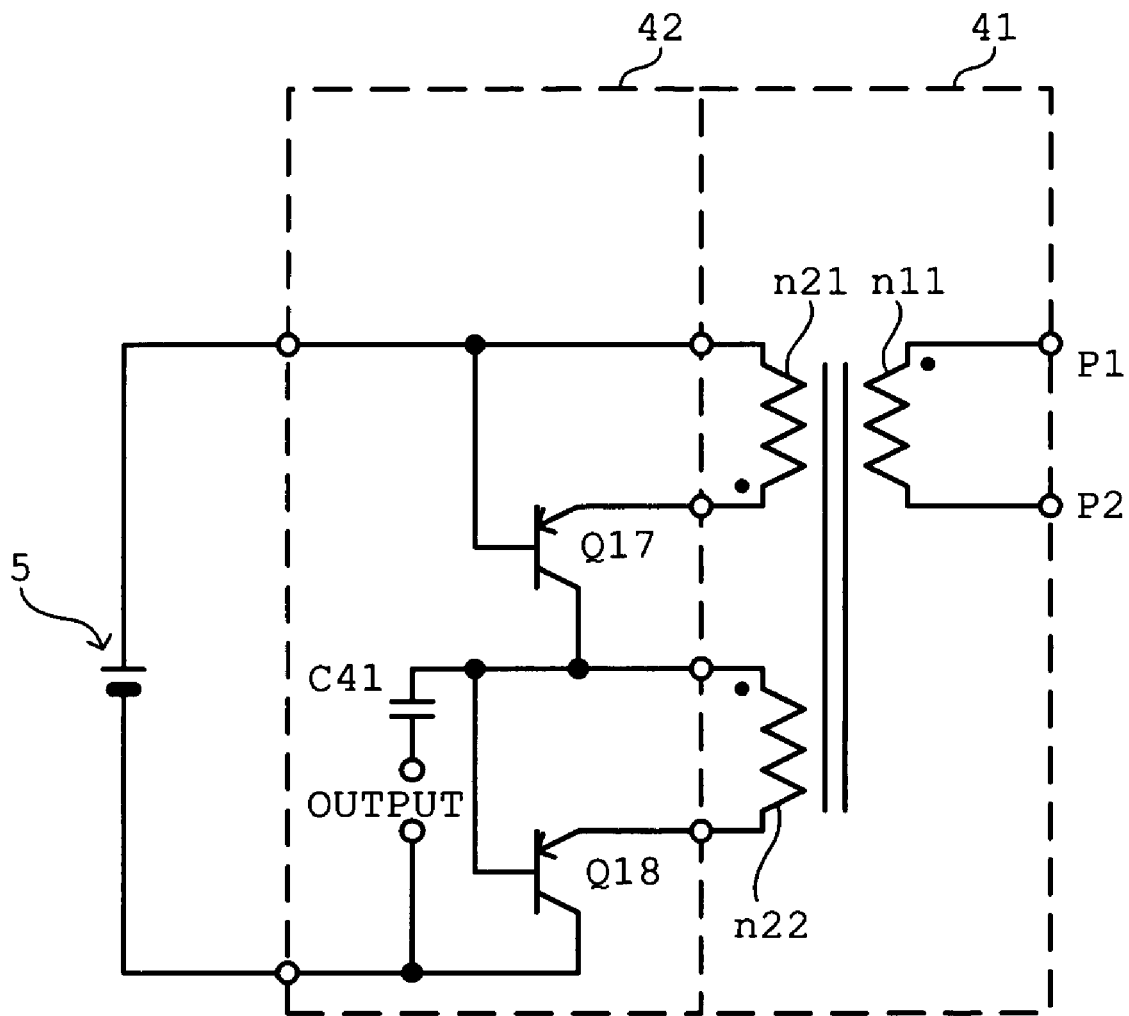
FIG. 28 is a circuit diagram illustrating another application example of an amplifying circuit having two secondary windings of a zero phase current transformer.

Moreover, when the zero phase current transformer 41 includes two secondary windings n21 and n22, the amplifying circuit 42 of the third embodiment may have the structure as illustrated in FIG. 28. The amplifying circuit 42 of FIG. 28 includes a transistors Q17 and 18 comprising PNP-type bipolar transistors in addition to the capacitor C41.

In the structure illustrated in FIG. 28, one end of the secondary winding n21 is connected to the base of the transistor Q17 and the other end of the secondary winding n21 is connected to the emitter of the transistor Q17. Moreover, one end of the secondary winding n22 is connected to the emitter of the transistor Q18 and the other end of the secondary winding n22 is connected to the base of the transistor Q18. However, when an imbalance current flows into the lines E1 and E2, it is assumed that current having the same polarity is induced to one end of the secondary winding n21 and one end of the secondary winding n22. Furthermore, the base of the transistor Q17 is connected to the positive pole of the auxiliary power source 5 and the collector of the transistor Q18 is connected to the negative pole of the auxiliary power source 5. The collector of the transistor Q17 is connected to the base of the transistor Q18 and one end of the capacitor C41. In addition, the other end of the capacitor C41 is connected to the ground line S2 as illustrated in, for example, FIG. 20.

Figure 29:
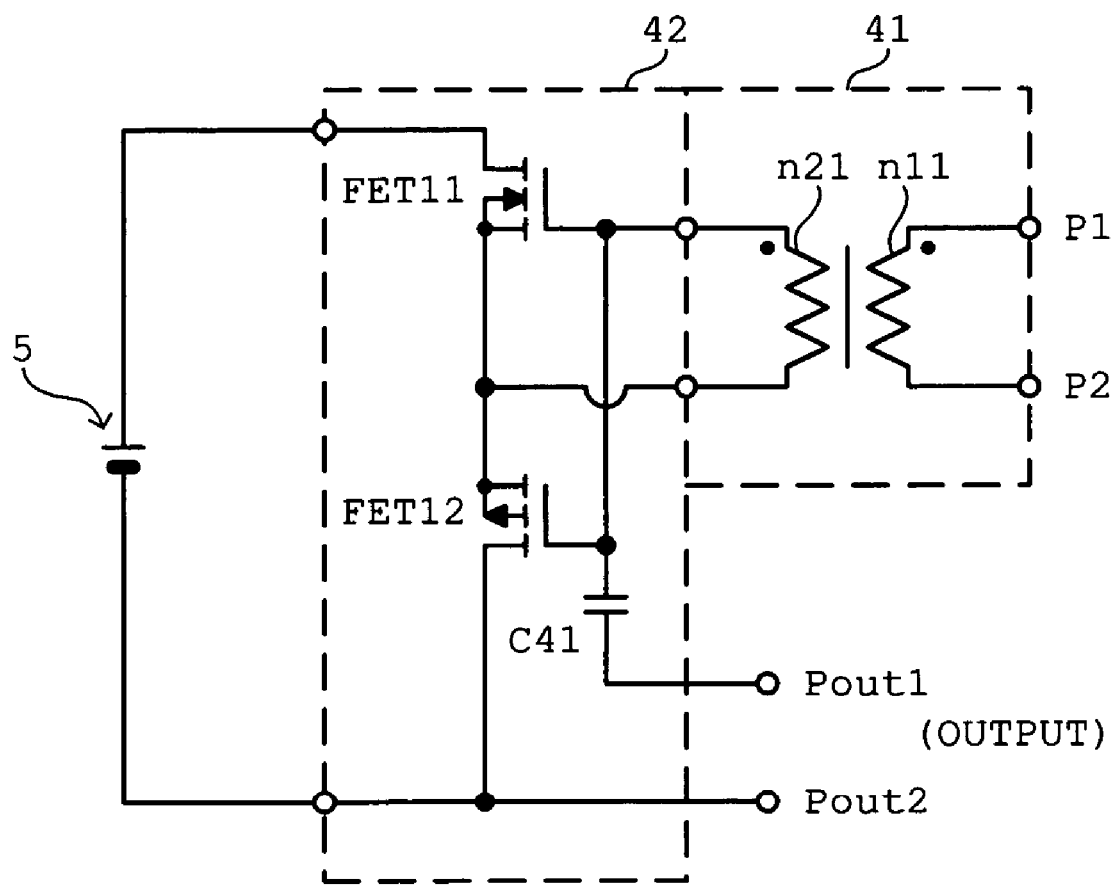
FIG. 29 is a circuit diagram illustrating an application example when FET is used in place of a transistor of an amplifying circuit.

The amplifying circuit 42 of FIG. 20 may include FET 11 comprising an n-channel MOS (Metal-Oxide-Semiconductor) FET and an FET 12 having p-channel MOSFET in place of the transistors Q11 and Q12 as illustrated in FIG. 29. In this case, in the structure of FIG. 20, a source of FET 11 may be connected to a point where an emitter of the transistor Q11 should be connected, a drain of FET 11 may be connected to a point where a collector of the transistor Q11 should be connected, and a gate of FET 11 may be connected to a point where a base of the transistor Q11 should be connected, respectively. Moreover, in the structure of FIG. 20, a source of FET 12 may be connected to a point where an emitter of the transistor Q12 should be connected, a drain of FET 12 may be connected to a point where a collector of the transistor Q12 should be connected, and a gate of FET 12 may be connected to a point where a base of the transistor Q12 should be connected, respectively.

Figure 30:
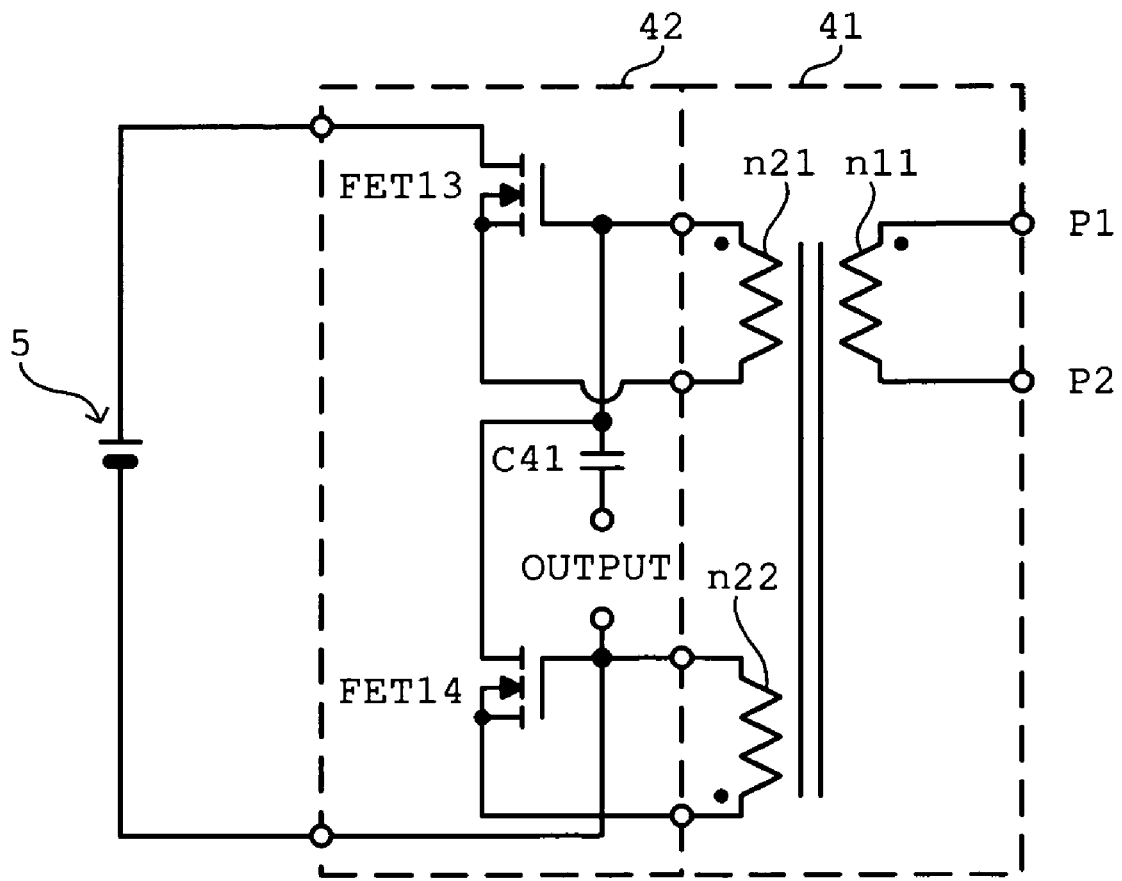
FIG. 30 is a circuit diagram illustrating another application example when FET is used in place of a transistor of an amplifying circuit.

Moreover, the amplifying circuit 42 of FIG. 26 may include FETs 13 and 14 comprising n-channel MOSFETs in place of the transistors Q13 and Q14 as illustrated in FIG. 30.

In this case, in the structure of FIG. 26, a source of FET 13 may be connected to a point where an emitter of the transistor Q13 should be connected, a drain of FET 13 may be connected to a point where a collector of the transistor Q13 should be connected, and a gate of FET 13 may be connected to a point where a base of the transistor Q13 should be connected, respectively. Moreover, in the structure of FIG. 26, a source of FET 14 may be connected to a point where an emitter of the transistor Q14 should be connected, a drain of FET 14 may be connected to a point where a collector of the transistor Q14 should be connected, and a gate of FET 14 may be connected to a point where a base of the transistor Q14 should be connected, respectively.

Figure 31:
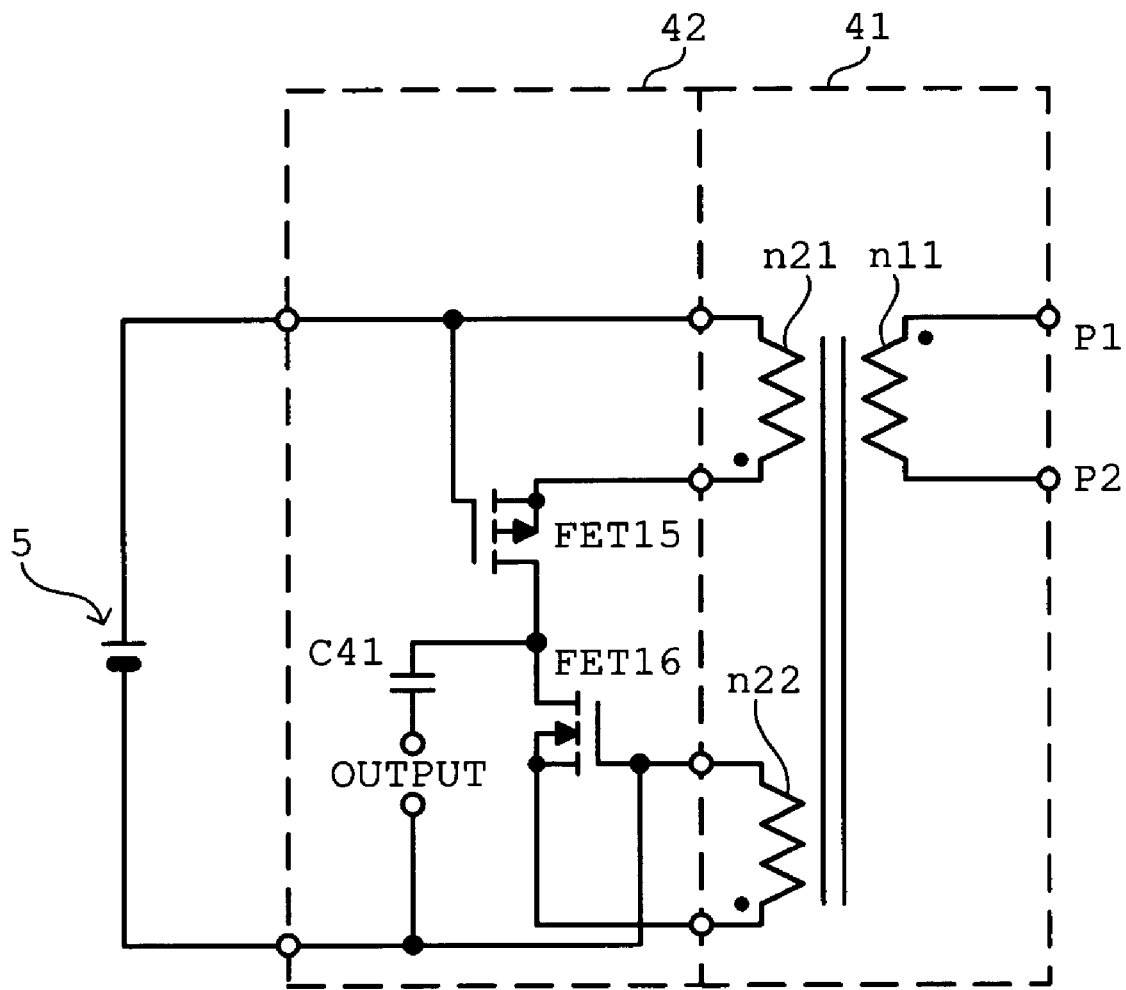
FIG. 31 is a circuit diagram illustrating another application example when FET is used in place of a transistor of an amplifying circuit.

Moreover, the amplifying circuit 42 of FIG. 27 may include FETs 15 and 16 comprising p-channel MOSFETs in place of the transistors Q15 and Q16 as illustrated in FIG. 31.

In this case, in the structure of FIG. 27, a source of FET 15 may be connected to a point where an emitter of the transistor Q15 should be connected, a drain of FET 15 may be connected to a point where a collector of the transistor Q15 should be connected, and a gate of FET 15 may be connected to a point where a base of the transistor Q15 should be connected, respectively. Moreover, in the structure of FIG. 27, a source of FET 16 may be connected to a point where an emitter of the transistor Q16 should be connected, a drain of FET 16 may be connected to a point where a collector of the transistor Q16 should be connected, and a gate of FET 16 may be connected to a point where a base of the transistor Q16 should be connected, respectively.

Figure 32:
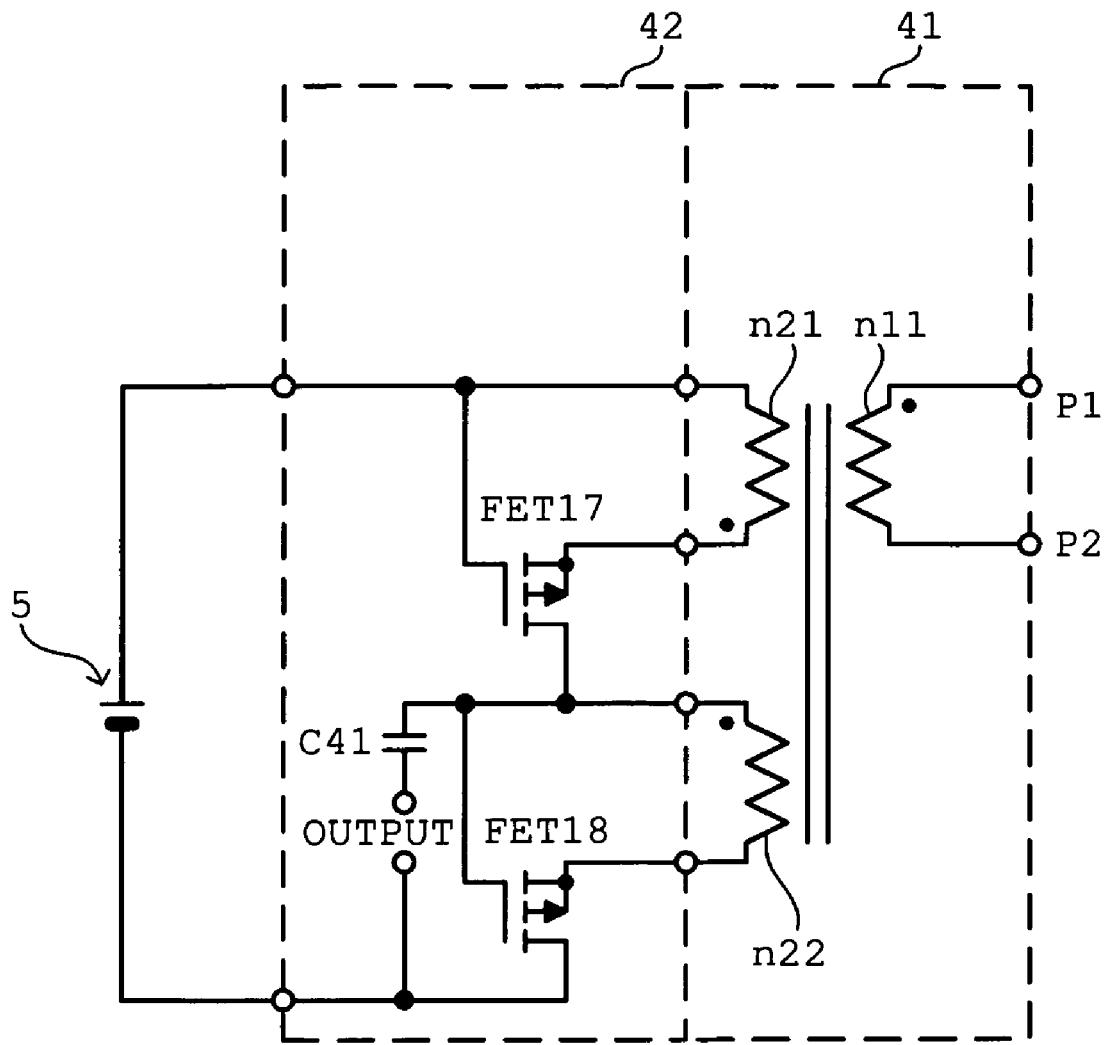
FIG. 32 is a circuit diagram illustrating another application example when FET is used in place of a transistor of an amplifying circuit.

Moreover, the amplifying circuit 42 of FIG. 28 may include FETs 17 and 18 comprising p-channel MOSFETs in place of the transistors Q17 and Q18 as illustrated in FIG. 32.

In this case, in the structure of FIG. 28, a source of FET 17 may be connected to a point where an emitter of the transistor Q17 should be connected, a drain of FET 17 may be connected to a point where a collector of the transistor Q17 should be connected, and a gate of FET 17 may be connected to a point where a base of the transistor Q17 should be connected, respectively. Moreover, in the structure of FIG. 28, a source of FET 18 may be connected to a point where an emitter of the transistor Q18 should be connected, a drain of FET 18 may be connected to a point where a collector of the transistor Q18 should be connected, and a gate of FET 18 may be connected to a point where a base of the transistor Q18 should be connected, respectively.

Figure 33:
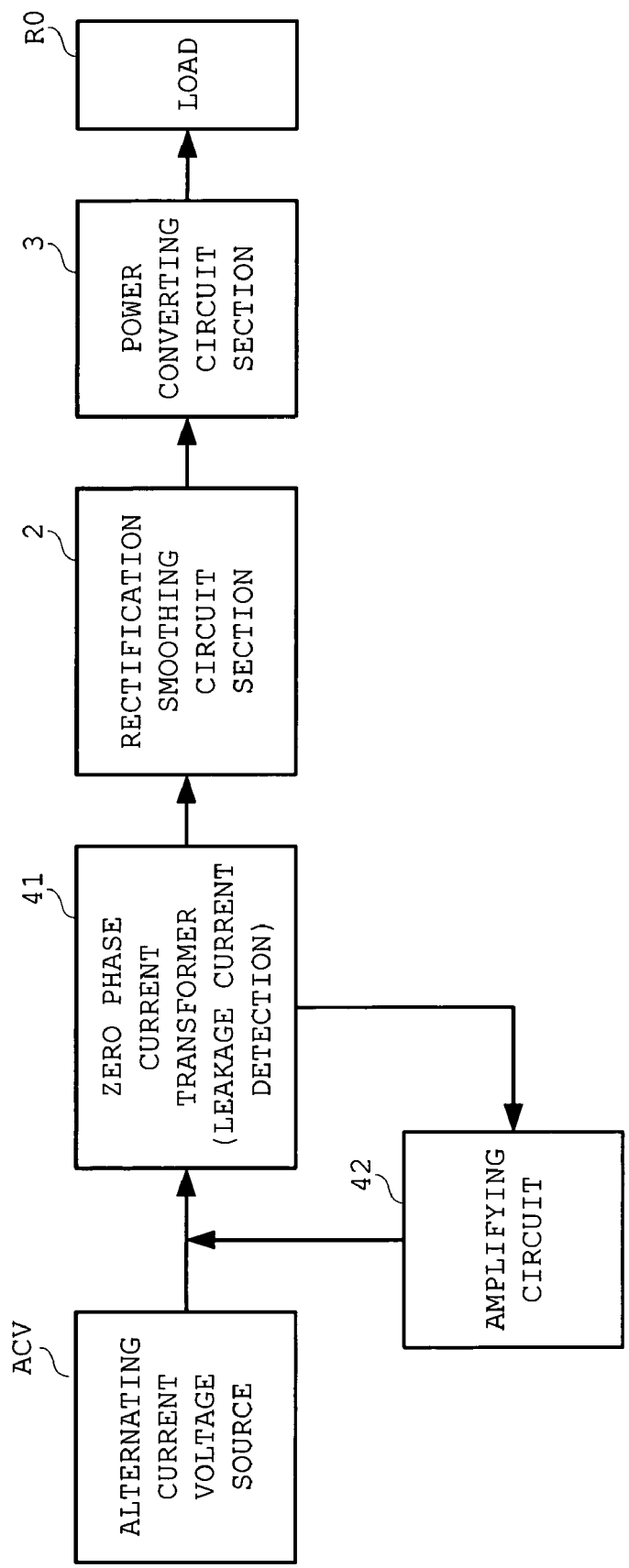
FIG. 33 is a block diagram illustrating a circuit structure that is designed to supply a compensation current to an alternating line from an AC power source.
Figure 34:
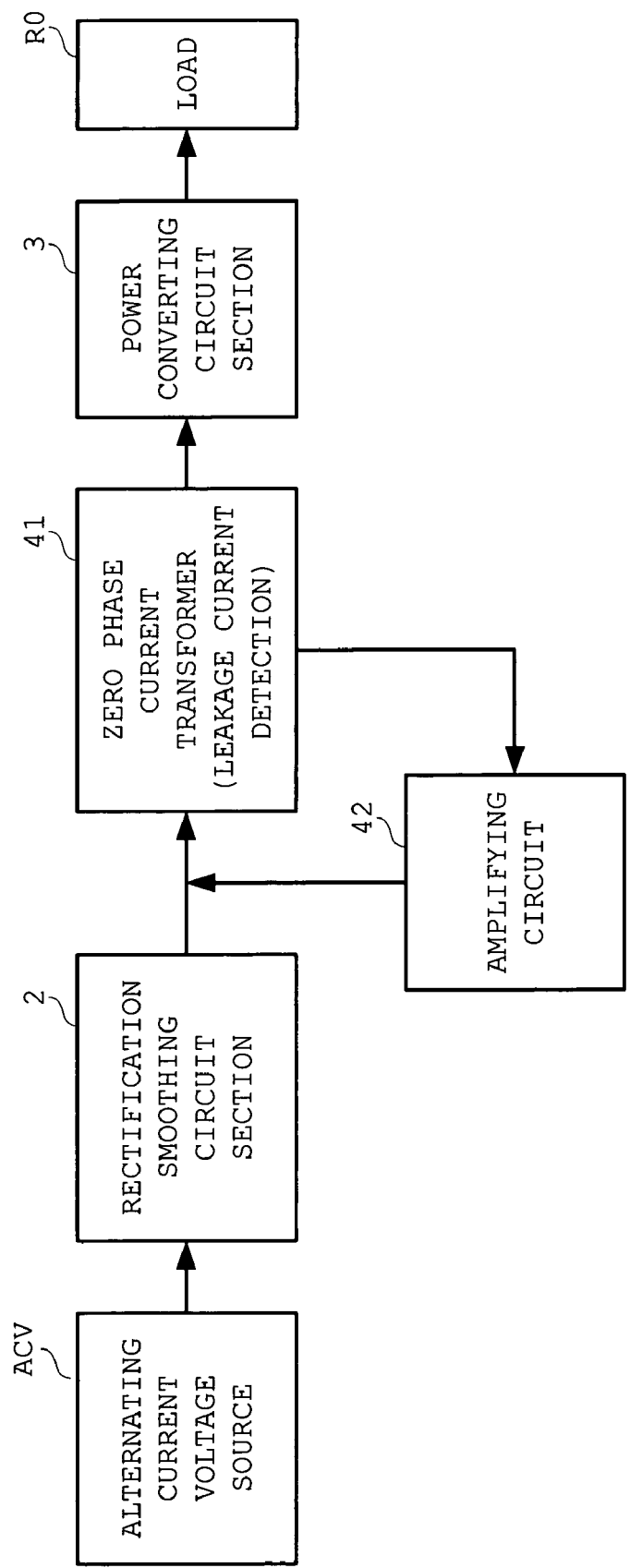
FIG. 34 is a block diagram illustrating a circuit structure that is designed to supply a compensation current to a direct current line.

Furthermore, in the power converting apparatus in the structure of FIG. 20, the amplifying circuit 42 supplies the compensation current to the alternating line where alternating current supplied from the alternating current source ACV flows as illustrated in the block diagram of FIG. 33. However, the amplifying circuit 42 may supply the compensation current to the DC line where the DC voltage supplied from the rectification smoothing circuit section 2 flows as illustrated in FIG. 34.

Moreover, the amplifying circuit 42 may supply the compensation current to the point of the output side (side close to the load R0) from the zero phase current transformer 41 among the DC lines.

Fourth Embodiment

Figure 35:
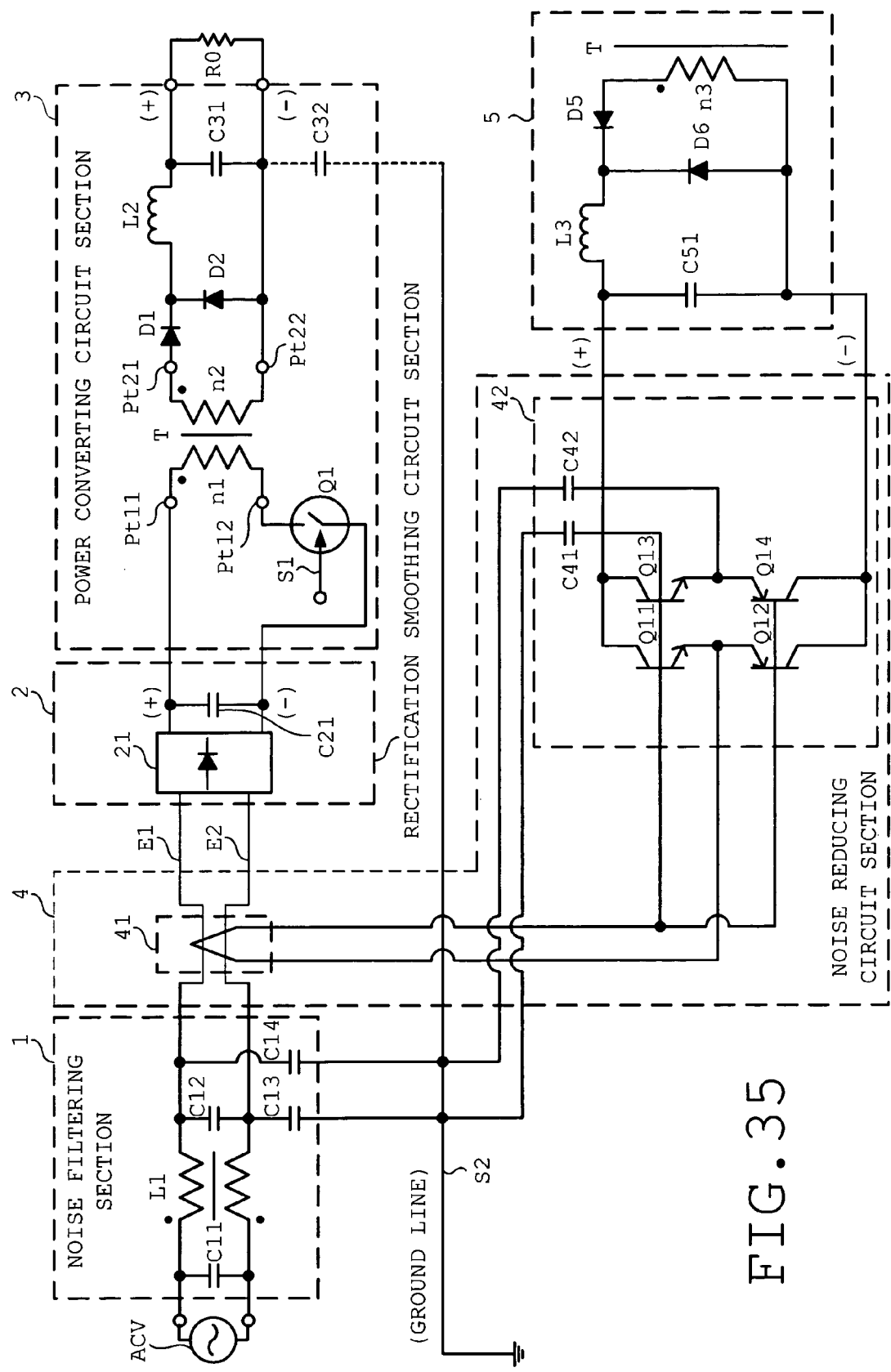
FIG. 35 is a circuit diagram of the structure of a power converting apparatus according to a fourth embodiment of the present invention.

An explanation will be next given of a power converting apparatus according to a fourth embodiment of the present invention. FIG. 35 is a block diagram illustrating the structure of a power converting apparatus according to the fourth embodiment of the resent invention. As illustrated in the figure, the structure of the power converting apparatus has substantially the same as that of the power converting apparatus of the third embodiment illustrated in FIG. 20 except for the point that the amplifying circuit 42 has substantially the same structure as the structure of the amplifying circuit 42 of the first embodiment illustrated in FIG. 1. However, it is assumed that the respective ends of the capacitors C41 and C42, which are to be connected to the ground line, are connected to the portion of the alternating current source ACV side of the ground line, instead of the oint at which the zero phase current transformer 41 detects the leakage current in connection with the ground lines. Then, it is assumed that the positive pole of the auxiliary power source 5 is connected to each of the collectors of the transistors Q11 and Q13 and the negative pole of the auxiliary power source 5 is connected to each of the collectors of the transistors Q12 and Q14. As mentioned in the explanation of the first embodiment with reference to FIG. 3, the transistors Q11 and Q12 form the main amplifier 42A and the transistors Q13 and Q14 form the correction amplifier 42B.

Even if variations in a detection ratio (sensitivity) of the zero phase current transformer 41 occur, the power converting apparatus according to the fourth embodiment is structured to adjust the gain to reduce influence caused by the variations.

In the structure of FIG. 35, when variations in a detection ratio (sensitivity) of the zero phase current transformer 41 occur, the impedance ratio between the capacitors C41 and C42 is changed to adjust the gain of the amplifying circuit 42, so that the total gains of the zero phase current transformer 41 and the amplifying circuit 42 can be set to 1.

The structure of the power converting apparatus according to the fourth embodiment of the present invention is not limited to the aforementioned structure.

For example, in the structure of FIG. 35, the amplifying circuit 42 may have substantially the same structure as the structure illustrated in FIG. 6. The use of such a structure allows the main amplifier 42A to be used as the correction amplifier 42B. Then, the main amplifier 42A is used as the correction amplifier 42B, thereby making it possible to adjust the gain of the amplifying circuit 42 without newly providing the amplifier.

Moreover, in the structure of FIG. 35, the amplifying circuit 42 may have substantially the same structure as the structure illustrated in FIG. 8 or FIG. 9. If such a structure is used, since the amplifying circuit 42 is structured using the field effect transistor where the gate current becomes substantially zero, so that it is expected that performance of the amplifying circuit 42 will become high as compared with the case of using the bipolar transistor. Furthermore, when the amplifying circuit 42 has the structure illustrated in FIG. 9, the main amplifier 42A is used as the correction amplifier 42B, thereby making it possible to adjust the gain of the amplifying circuit 42 without newly providing the amplifier.

Fifth Embodiment

Figure 36:
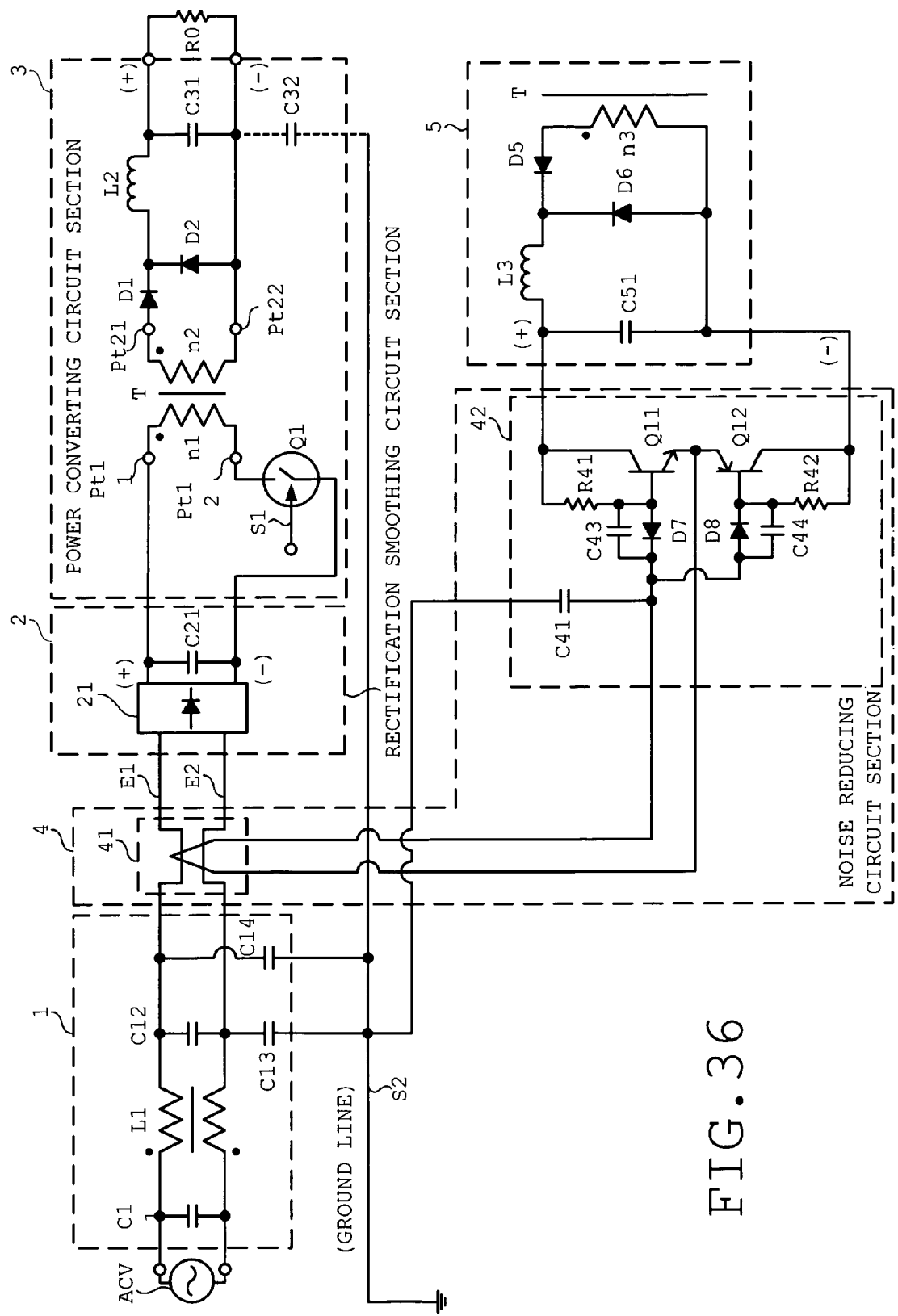
FIG. 36 is a circuit diagram of the structure of a power converting apparatus according to a fifth embodiment of the present invention.

An explanation will be next given of a power converting apparatus according to a fifth embodiment of the present invention. FIG. 36 is a block diagram illustrating the structure of a power converting apparatus according to the fifth embodiment of the present invention. As illustrated in the figure, the structure of the power converting apparatus has substantially the same as that of the power converting apparatus of the third embodiment illustrated in FIG. 20 except for the point that the amplifying circuit 42 has substantially the same structure as the structure of the amplifying circuit 42 of the second embodiment illustrated in FIG. 10. However, it is assumed that the ends of the capacitor C41, which are to be connected to the ground line, are connected to the portion of the alternating current source ACV side of the ground line, instead of the point at which the zero phase current transformer 41 detects the leakage current in connection with the ground lines. Then, it is assumed that the positive pole of the auxiliary power source 5 is connected to the collector of the transistor Q11 and the negative pole of the auxiliary power source 5 is connected to the collector of the transistor Q12.

The use of such a structure allows a desired amount of compensation currents to be generated without inducing a large voltage in the secondary winding n21 of the zero phase current transformer 41. For this reason, it is possible to reduce the winding umber of the primary windings n11 and that of the secondary windings n21. Moreover, it is possible to reduce the core area of the magnetic core 100A or 41A. As a result, the zero phase current transformer 41 can be miniaturized. Furthermore, the neutral point of the amplifying circuit 42 can be set to ½ of the input voltage to be applied to the amplifying circuit 42 by the registers R41 and R42. For this reason, voltage at the neutral point of the transistors Q11 and Q12 is stabilized. Furthermore, the range of the input voltage by which the amplifying circuit 42 can normally control the compensation current is wide. The amplification factor of the amplifying circuit 42 including the zero phase current transformer 41 can be easily set to 1.

The structure of the power converting apparatus according to the fifth embodiment of the present invention is not limited to the aforementioned structure.

For example, in the structure of FIG. 36, the amplifying circuit 42 may have substantially the same structure as the structure illustrated in FIG. 13. (Additionally, in the respective modifications of the fifth embodiment, the positive pole of the auxiliary power source 5 is connected to the point where the positive pole of the constant voltage circuit 44, and the negative pole of the auxiliary power source 5 is connected to the point where the negative pole of the constant voltage circuit 44.) The use of such a structure makes it possible to easily adjust the amplification factor of the amplifying circuit 42 by adjusting the impedance ratio between the capacitors C41 and C42. The use of such a structure also makes it easy to set the amplification factor of the entire system including the zero phase current transformer 41 to 1 correctly.

Moreover, even in the power converting apparatus of the fifth embodiment of the present invention, the zero phase current transformer 41 may include two secondary windings. In this case, the power converting apparatus may have the structure in which the amplifying circuit 42 shown in the structure of FIG. 36 is replaced with the amplifying circuit 42 shown in the structure of FIG. 14. If such a structure is used, since the potentials of the secondary windings n21 and n22 of the zero phase current transformer 41 are fixed, influence of the stray capacity is small even if the wiring between the zero phase current transformer 41 and the transistor Q13 or Q14 increases.

When the zero phase current transformer 41 includes two secondary windings, the power converting apparatus of the fifth embodiment of the present invention may have the structure in which the amplifying circuit 42 shown in the structure of FIG. 36 is replaced with the amplifying circuit 42 shown in the structure of FIG. 15. If such a structure is used, both of two transistors that forms the amplifying circuit 42 can use NPN-type bipolar transistors even in the fifth embodiment of the present invention.

Moreover, when the zero phase current transformer 41 includes two secondary windings, the power converting apparatus of the fifth embodiment of the present invention may have the structure in which the amplifying circuit 42 shown in the structure of FIG. 36 is replaced with the amplifying circuit 42 shown in the structure of FIG. 16. Since the use of such a structure protects the transistors Q15 and Q16 from overvoltage, even if they are low-voltage transistors with a high amplification factor, they can be used as the transistors Q15 and Q16. In addition, they can be used under high voltage.

Furthermore, when the zero phase current transformer 41 includes two secondary windings, the power converting apparatus of the fifth embodiment of the present invention may have the structure in which the amplifying circuit 42 shown in the structure of FIG. 36 is replaced with the amplifying circuit 42 shown in the structure of FIG. 17. If such a structure is used, both of two transistors that forms the amplifying circuit 42 can use PNP-type bipolar transistors even in the fifth embodiment of the present invention.

Moreover, in the structure of FIG. 36, the amplifying circuit 42 may have substantially the same structure as the structure illustrated in FIG. 18. The use of such a structure reduces the influence of the difference between the emitter-base voltage of the transistor Q11 of the amplifying circuit 42 and the emitter-base voltage of the transistor Q12 thereof.

Still moreover, in the structure of FIG. 36, the amplifying circuit 42 may have substantially the same structure as the structure illustrated in FIG. 19. The power converting apparatus with such a structure has the following advantage in addition to the aforementioned advantage obtained when the amplifying circuit 42 is replaced with one illustrated in FIG. 18 in the structure of FIG. 36. Namely, the amplification factor of the amplifying circuit 42 can be easily adjusted by adjusting the impedance ratio between the capacitors C41 and C42, thereby making it easy to set the amplification factor of the entire system including the zero phase current transformer 41 to 1 correctly.

Sixth Embodiment

Figure 37:
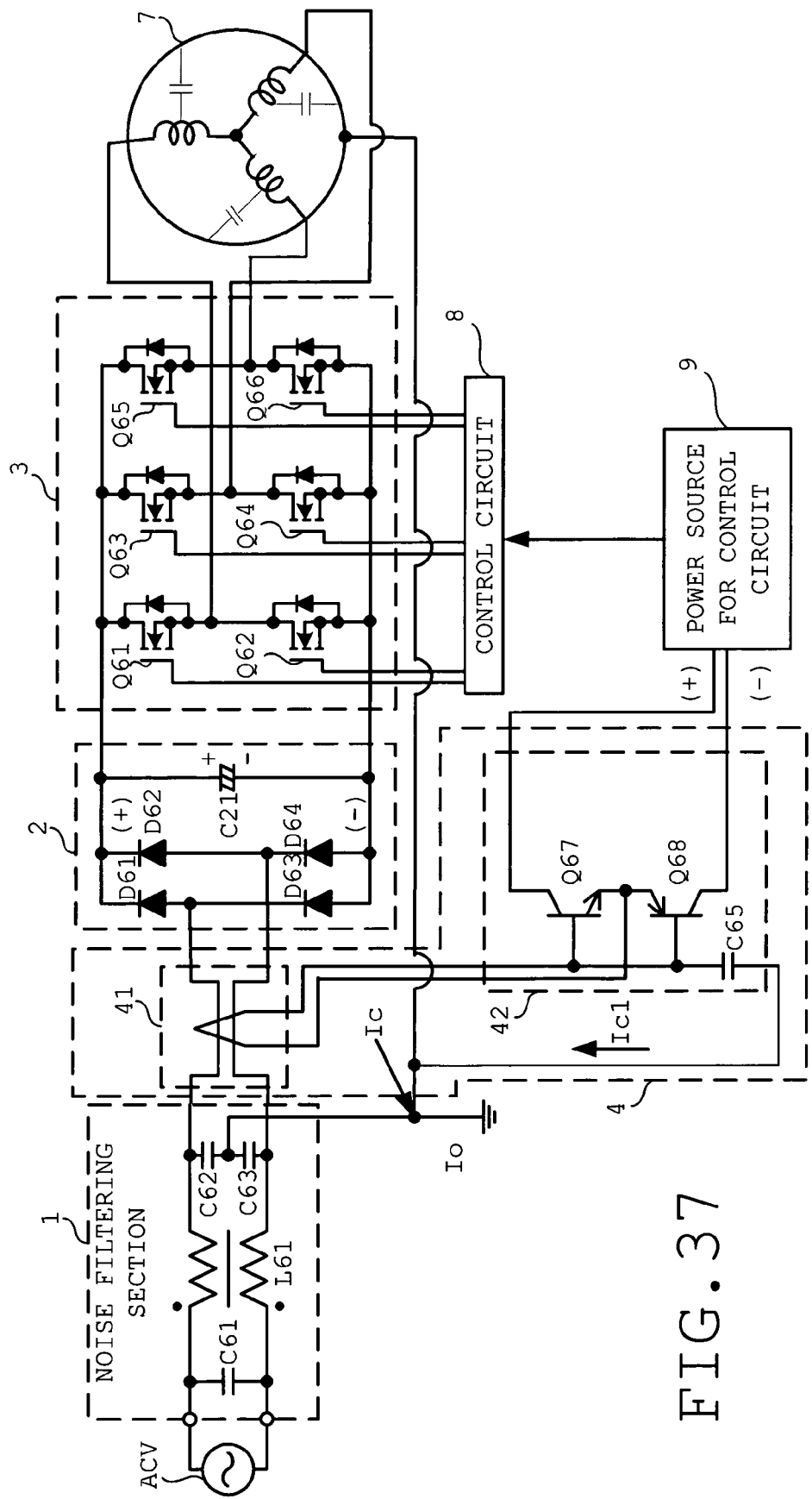
FIG. 37 is a circuit diagram of the structure of a power converting apparatus according to a sixth embodiment of the present invention.
Figure 38A:
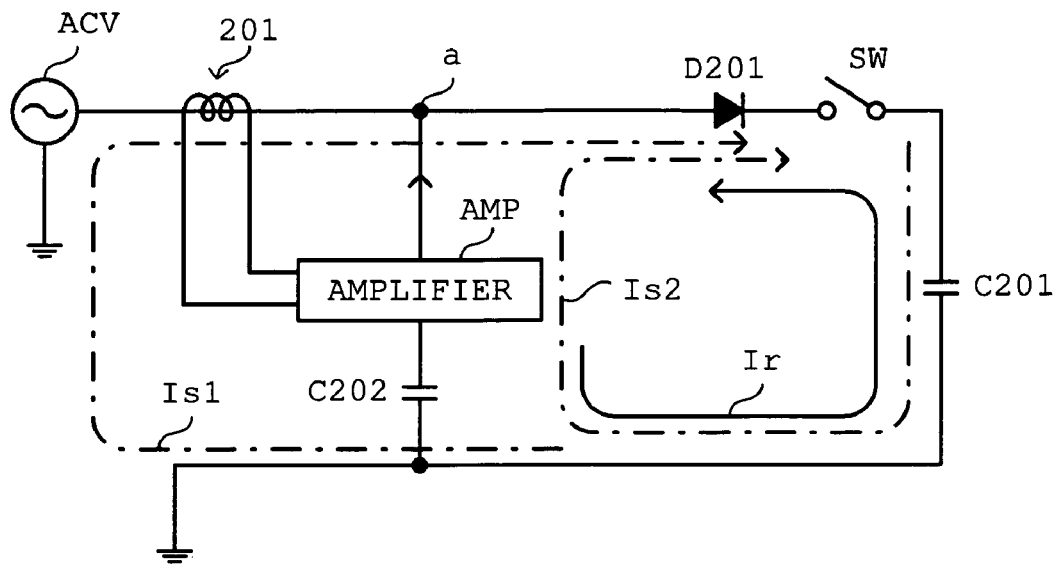
FIGS. 38A and 38B are views each illustrating a principle of a noise reduction.
Figure 38B:
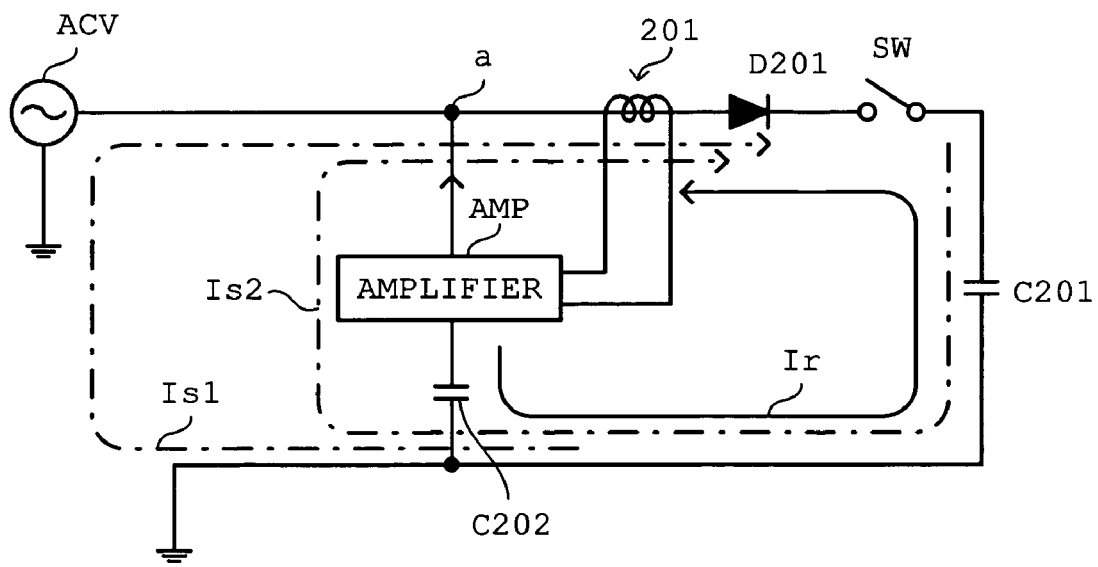

An explanation will be next given of a power converting apparatus according to a sixth embodiment of the present invention. FIG. 37 is a block diagram illustrating the structure of a power converting apparatus according to the sixth embodiment of the present invention. As illustrated in the figure, the power converting apparatus includes the noise filter section 1, the rectification smoothing circuit section 2, the power converting circuit section 3, the noise reducing circuit section 4, a control circuit 8, and a power source 9 for a control circuit, and supplies power to a three-phase motor 7.

The noise filter section 1 of the power converting apparatus may have substantially the same structure as the structure illustrated in, for example, FIG. 20. Or, as illustrated in FIG. 37, this may have the structure that removes the capacitor C12 from the structure illustrated in FIG. 20.

The rectification smoothing circuit section 2 may have substantially the same structure as the structure illustrated in FIG. 20, and may include a bridge rectifying circuit having four diodes D61 to D64 as illustrated in, for example, FIG. 37, and a capacitor C21 for smoothing. Additionally, in the structure of FIG. 37, the respective cathodes of the diodes D61 and D62 are connected to each other to form a positive pole (+) of the a rectifying circuit 21. The respective anodes of the diodes D63 and D64 are connected to each other to form a negative pole (−) of the a rectifying circuit 21.

The power converting circuit section 3 includes, for example, transistors Q61 to Q66. The transistors Q61 to Q66 are formed of, for example, n-channel FETs. The respective drains of the transistors Q61, Q63, and Q65 are connected to the positive pole of the rectification smoothing circuit section 2 and the respective sources of the transistors Q62, Q64, and Q66 are connected to the negative pole of the rectification smoothing circuit section 2. The source of the transistor Q61 and the drain of the transistor Q62 are connected to each other. The source of the transistor Q63 and the drain of the transistor Q64 are connected to each other. The source of the transistor Q65 and the drain of the transistor Q66 are connected to each other. The respective gates of the transistors Q61 to Q66 are connected to the control section 8 including a microcomputer or the like.

The power converting circuit section 3 supplies three-phase alternating current power to a three-phase motor 7 from three pairs of nodes, namely, a node between the source of the transistor Q61 and the transistor Q62, a node between the source of the transistor Q63 and the transistor Q64, and a node between the source of the transistor Q65 and the transistor Q66 according to a control signal that the control circuit 8 supplies to the respective gates of the transistors Q61 to Q66.

The noise reducing circuit section 4 may have substantially the same structure as the structure of FIG. 20 as illustrated in, for example, FIG. 37. Or, any one of the structures of the third to fifth embodiments of the present invention may be used. However, it is assumed that driving power supplied from the auxiliary power source 5 in the third to fifth embodiments of the present invention is supplied to the noise reducing circuit section of the sixth embodiment of the present invention from the power source 9 for a control circuit.

It is assumed that the power source 9 for a control circuit supplies driving power to the noise reducing circuit section 4 and the control circuit 8. In addition, it is assumed that the power source 9 for a control circuit receives no supply of power from the rectification smoothing circuit section 2.

In the above-explained embodiments of the present invention, the transistors and the diodes, which form the amplifying circuit 42, may be arranged close to one another such that the temperatures of the transistors and diodes become substantially the same. According to such an arrangement, even if the base-emitter voltage of the relevant transistor varies by a change in the temperature of the transistor, the forward voltage of the diode varies in the same way, so that the operation of the amplifying circuit 42 is stabilized. Moreover, these transistors and diodes may be formed in the same chip, and this makes it possible to strictly adjust the temperatures of these transistors and diodes to the same values as one another.

Furthermore, in the above-explained embodiments, the transistors forming each power converting apparatus were explained as a single element. However, these transistors may be structured by, for example, a transistor circuit of Darlington connection.

Moreover, in the above-explained embodiments, the alternating current source ACV was explained as a single-phase power source. However, the alternating current source ACV may be, for example, a three-phase alternating current source ACV instead of the single-phase alternating current source ACV. When the alternating current source ACV is a three-phase alternating current source ACV, three power lines may be wound around the magnetic core 21A as a primary winding or three power lines may be passed through the hole of the magnetic core 100A as a primary winding.

Thus, the embodiments of the present invention were explained. However, the present invention is not limited to the above-mentioned embodiments and various embodiments may be considered in order to implement the present invention.

This application is based on Japanese Patent Application Nos. 2002-49302, 2002-49307, 2003-358462 filed on Feb. 26, 2002, Feb. 26, 2002, and Oct. 17, 2003, respectively and including specification, claims, drawings and summary. The disclosures of the above Japanese Patent Applications are incorporated herein by reference in their entirety.

What is claimed is:

1. A noise reducing apparatus that reduces noise propagating to a pair of power lines for power supply, comprising:
   a leakage current detecting section that detects current induced by an output winding of a transformer having the output winding passing through a magnetic core with the power lines, thereby detecting a leakage current caused by noise flowing into a ground line from the power lines; and
   a current supplying section that supplies a compensation current for canceling the leakage current to the injection point which is on the ground line closer to an input of the power lines than a leakage current detecting point, wherein the current supplying section uses the leakage current detected by said leakage current detecting section as the compensation current;
   wherein said current supplying section includes an amplifying circuit that amplifies the leakage current detected by said leakage current detecting section, and said amplifying circuit amplifies current to be supplied to the ground line with an amplitude set to 1, when power is supplied from a predetermined DC power source; and
   said amplifying circuit includes an NPN transistor, a PNP transistor and a capacitor, a collector of said NPN transistor is connected to a positive pole of the DC power source, an emitter of said PNP transistor is connected to an emitter of said NPN transistor, a collector of said PNP transistor is connected to a negative pole of the DC power source, one end of the outout winding of the transformer is connected to a base of said NPN transistor and a base of said PNP transistor, the other end of the output winding of the transformer is connected to the emitter of said NPN transistor and the emitter of said PNP transistor, and said capacitor is connected between the ground line and the bases of said NPN transistor and said PNP transistor.

2. A noise reducing apparatus that reduces noise propagating to a pair of power lines for power supply, comprising:
   a leakage current detecting section that detects current induced by an output winding of a transformer having the output winding passing through a magnetic core with the power lines, thereby detecting a leakage current caused by noise flowing into a ground line from the power lines; and
   a current supplying section that supplies a compensation current for canceling the leakage current to the injection point which is on the ground line closer to an input of the power lines than a leakage current detecting point, wherein the current supplying section uses the leakage current detected by said leakage current detecting section as the compensation current;
   wherein said current supplying section includes an amplifying circuit that amplifies the leakage current detected by said leakage current detecting section, and said amplifying circuit amplifies current to be supplied to the ground line with an amplitude set to 1, when power is supplied from a predetermined DC power source; and
   said amplifying circuit includes a current amplifying section that amplifies current flowing into the output winding of the transformer to output via a first impedance element; and a buffer amplifying section that applies voltage corresponding to voltage applied to the first impedance element by said current amplifying section to a second impedance element to output current from the second impedance element current corresponding to current obtained by amplifying current flowing into the output winding of the transformer is output from each of the first impedance element and the second impedance element at a ratio determined by an impedance ratio between the first impedance element and the second impedance element.

3. A noise reducing apparatus that reduces noise propagating to a pair of power lines for power supply, comprising:
   a leakage current detecting section that detects current induced by an output winding of a transformer having the output winding passing through a magnetic core with the power lines, thereby detecting leakage current caused by noise flowing into a ground line from the power lines; and
   a current supplying section that supplies a compensation current for canceling the leakage current to the injection point which is on the ground line closer to an input of the power lines than a leakage current detecting point, wherein the current supplying section uses the leakage current detected by said leakage current detecting section as the compensation current;

wherein said current supplying section includes an amplifying circuit that amplifies the leakage current detected by said leakage current detecting section, and said amplifying circuit amplifies current to be supplied to the ground line with an amplitude set to 1, when power is supplied from a predetermined DC power source; and said amplifying circuit includes an NPN-type bipolar transistor having an emitter connected to one end of the output winding of the transformer, a collector connected to a positive pole of the DC power source, a first resistor connected between the collector of the NPN-type bipolar transistor and a base of the NPN-type bipolar transistor, a first voltage drop element connected between the base of said NPN-type bipolar transistor and the other end of the output winding of the transformer to generate a voltage drop corresponding to a base-emitter voltage of said NPN-type bipolar transistor, a PNP-type bipolar transistor having an emitter connected to one end of the output winding of the transformer, a collector connected to a negative pole of the DC power source, and a second resistor connected between the collector of the PNP-type bipolar transistor and the base of the PNP-type bipolar transistor; a second voltage drop element connected between the base of said PNP-type bipolar transistor and the other end of the output winding of the transformer to generate a voltage drop corresponding to a base-emitter voltage of said PNP-type bipolar transistor; and a current supply capacitor having one end connected to a node between said first voltage drop element and said second voltage drop element, and the other end connected to the ground line.

4. A power converting apparatus comprising:

a power converting section that converts power supplied from a power source into power with a predetermined voltage to supply to a load; and the noise reducing apparatus that reduces noise propagating to a pair of power lines for power supply from the power source to said power converting section;

wherein the noise reducing apparatus comprises:

a leakage current detecting section that detects current induced by an output winding of a transformer having the output winding passing through a magnetic core with the power lines, thereby detecting a leakage current caused by noise flowing into a ground line from the power lines; and a current supplying section that supplies a compensation current for canceling the leakage current to the injection point which is on the ground line closer to an input of the power lines than a leakage current detecting point, wherein the current supplying section uses the leakage current detected by said leakage current detecting section as the compensation current; and said power converting section includes a transfonner, and the transformer further includes an auxiliary winding that forms a DC power source for supplying power to the current supplying section that said noise reducing apparatus includes.

5. A power converting apparatus comprising:

a power converting section that converts power supplied from a power source into vower with a predetermined voltage to supply to a load; and the noise reducing apparatus that reduces noise propagating to a pair of power lines for power supply from the power source to said power converting section;

wherein the noise reducing apparatus comprises:

a leakage current detecting section that detects current induced by an output winding of a transformer having the output winding passing through a magnetic core with the power lines, thereby detecting a leakage current caused by noise flowing into a ground line from the power lines; and a current supplying section that supplies a compensation current for canceling the leakage current to the injection point which is on the ground line closer to an input of the power lines than a leakage current detecting point, wherein the current supplying section uses the leakage current detected by said leakage current detecting section as the compensation current; and wherein said power converting section includes an inverter circuit and a control circuit that controls the inverter circuit, and an operating power source for said control circuit, and the operating power source is used as a DC power source for supplying power to the current supplying section that said noise reducing apparatus includes.

* * * * *

UNITED STATES PATENT AND TRADEMARK OFFICE
CERTIFICATE OF CORRECTION

PATENT NO.       : 7,053,505 B2
APPLICATION NO.  : 10/713140
DATED            : May 30, 2006
INVENTOR(S)      : Mamoru Tsuruya It is certified that error appears in the above-identified patent and that said Letters Patent is hereby corrected as shown below:

IN THE BRIEF DESCRIPTION OF THE DRAWINGS:
In column 12, line 42, please change "FIG. 24F" to --FIG. 24E--

IN THE CLAIMS:
In claim 4, column 41, line 43, please change "transfonner" to --transformer--.
In claim 4, column 42, line 11, please change "transfonner" to --transformer--.
In claim 5, column 42, line 18, please change "vower" to --power--.

Signed and Sealed this

Fifteenth Day of August, 2006

JON W. DUDAS
*Director of the United States Patent and Trademark Office*